United States Patent
Kanda et al.

(10) Patent No.: US 11,422,410 B2
(45) Date of Patent: Aug. 23, 2022

(54) SUBSTRATE AND LIQUID CRYSTAL DISPLAY DEVICE

(71) Applicant: DIC Corporation, Tokyo (JP)

(72) Inventors: Ryo Kanda, Kitaadachi-gun (JP); Hirokazu Sugiyama, Kitaadachi-gun (JP); Shinichi Hirata, Kitaadachi-gun (JP)

(73) Assignee: DIC CORPORATION, Tokyo (JP)

(*) Notice: Subject to any disclaimer, the term of this patent is extended or adjusted under 35 U.S.C. 154(b) by 17 days.

(21) Appl. No.: 15/734,307

(22) PCT Filed: Jun. 20, 2019

(86) PCT No.: PCT/JP2019/024461
§ 371 (c)(1),
(2) Date: Jun. 8, 2021

(87) PCT Pub. No.: WO2020/008897
PCT Pub. Date: Jan. 9, 2020

(65) Prior Publication Data
US 2022/0128867 A1    Apr. 28, 2022

(30) Foreign Application Priority Data
Jul. 3, 2018 (JP) .............................. JP2018-126961

(51) Int. Cl.
*G02F 1/1337*     (2006.01)
*G02F 1/1335*     (2006.01)

(52) U.S. Cl.
CPC .. *G02F 1/133711* (2013.01); *G02F 1/133514* (2013.01); *G02F 1/133788* (2013.01)

(58) Field of Classification Search
CPC ......... G02F 1/133711; G02F 1/133514; G02F 1/133788
See application file for complete search history.

(56) References Cited

U.S. PATENT DOCUMENTS

2014/0138581 A1    5/2014 Archetti et al.
2014/0347585 A1    11/2014 Imanishi et al.
(Continued)

FOREIGN PATENT DOCUMENTS

JP    2010-191450 A    9/2010
JP    2014-524951 A    9/2014
(Continued)

OTHER PUBLICATIONS

International Search Report dated Sep. 17, 2019, issued in counterpart International Application No. PCT/JP2019/024461 (2 pages).
(Continued)

*Primary Examiner* — Lucy P Chien
(74) *Attorney, Agent, or Firm* — WHDA, LLP

(57) ABSTRACT

Provided are a substrate that can exert an anchoring force causing liquid crystal molecules to be vertically aligned and a liquid crystal display device. The substrate of the present invention is to be used in contact with a liquid crystal composition containing liquid crystal molecules and an alignment aid having a polar group and having the function of causing the liquid crystal molecules to be aligned spontaneously. The substrate includes an insulating film having a contact surface to be in contact with the liquid crystal composition. The static contact angle of water on the contact surface at 25° C. is 70° or less and/or the surface free energy of the contact surface is 50 mN/m or more. The substrate is preferably a substrate in direct contact with the liquid crystal composition with no alignment film therebetween.

9 Claims, 3 Drawing Sheets

(56) References Cited

U.S. PATENT DOCUMENTS

| | | | |
|---|---|---|---|
| 2014/0362129 A1* | 12/2014 | Tanaka | G09G 3/3406 |
| | | | 345/98 |
| 2018/0261355 A1* | 9/2018 | Russo | H01B 7/18 |
| 2019/0292455 A1* | 9/2019 | Yano | C07C 69/21 |

FOREIGN PATENT DOCUMENTS

| | | |
|---|---|---|
| JP | 2014-228841 A | 12/2014 |
| JP | 2017-203035 A | 11/2017 |
| WO | 2017/199513 A1 | 11/2017 |
| WO | 2018/084019 A1 | 5/2018 |

OTHER PUBLICATIONS

Notice of Reasons for Refusal dated Feb. 18, 2020, issued in counterpart JP Patent Application No. 2019-565480, w/English translation (8 pages).

* cited by examiner

SUBSTRATE AND LIQUID CRYSTAL DISPLAY DEVICE

TECHNICAL FIELD

The present invention relates to a substrate and to a liquid crystal display device.

BACKGROUND ART

In conventional VA mode liquid crystal displays (liquid crystal display devices), polyimide (PI) alignment films are disposed on electrodes. The alignment films function so as to induce vertical alignment of liquid crystal molecules when no voltage is applied and to allow the liquid crystal molecules to be aligned horizontally when a voltage is applied. However, the formation of the PI alignment films requires a large cost. Therefore, it has recently been contemplated to develop a method that allows liquid crystal molecules to be aligned while the PI alignment films are omitted.

For example, PTL 1 discloses a liquid crystal medium (liquid crystal composition) that is based on a mixture of polar compounds (liquid crystal molecules) having negative dielectric anisotropy and contains at least one self-alignment additive (alignment aid). In PTL 1, a specific compound having a hydroxy group is used as the self-alignment additive. However, depending on the surface state of substrates, the self-alignment additive does not easily stick to the surfaces of the substrate, and a sufficient anchoring force for aligning the liquid crystal molecules vertically is not obtained.

CITATION LIST

Patent Literature

PTL 1: Japanese Unexamined Patent Application Publication (Translation of PCT Application) No. 2014-524951

SUMMARY OF INVENTION

Technical Problem

The present invention provides a substrate that can sufficiently exert an anchoring force causing liquid crystal molecules to be vertically aligned and also provides a liquid crystal display device.

Solution to Problem

The above object is achieved by the following (1) to (9) in the present invention.

(1) A substrate to be used in contact with a liquid crystal composition containing liquid crystal molecules and an alignment aid having a polar group and having the function of causing the liquid crystal molecules to be aligned spontaneously, wherein the substrate includes an insulating film having a contact surface to be in contact with the liquid crystal composition, and wherein the static contact angle of water on the contact surface at 25° C. is 70° or less and/or the surface free energy of the contact surface is 50 mN/m or more.

(2) The substrate according to (1), wherein the substrate is a substrate in direct contact with the liquid crystal composition with no alignment film therebetween.

(3) The substrate according to (1) or (2), wherein the substrate is a substrate including a pixel electrode.

(4) The substrate according to (1) or (2), wherein the substrate is a substrate including a color filter.

(5) The substrate according to any one of (1) to (4), wherein the insulating film is an organic insulating film.

(6) A liquid crystal display device including two substrates and a liquid crystal layer that is sandwiched between the two substrates and formed of a liquid crystal composition containing liquid crystal molecules and an alignment aid having a polar group and having the function of causing the liquid crystal molecules to be aligned spontaneously, wherein at least one of the two substrates is the substrate according to any one of (1) to (5).

(7) The liquid crystal display device according to (6), wherein the alignment aid has a polymerizable group that can be polymerized by irradiation with active energy rays, and wherein the liquid crystal layer contains a polymerized product of the alignment aid.

(8) The liquid crystal display device according to (7), wherein the liquid crystal composition further contains a polymerizable compound that can be polymerized by irradiation with the active energy rays, and wherein the liquid crystal layer contains a polymerized product of the polymerizable compound and/or the polymerized product of the alignment aid.

(9) The liquid crystal display device according to any one of (6) to (8), wherein the liquid crystal display device is a PSA, PSVA, VA, IPS, FFS, or ECB mode liquid crystal display device.

Advantageous Effects of Invention

According to the present invention, a substrate that allows liquid crystal molecules to be easily aligned vertically and a liquid crystal display device in which the liquid crystal molecules are vertically aligned sufficiently are obtained.

DESCRIPTION OF EMBODIMENTS

Figure 1:
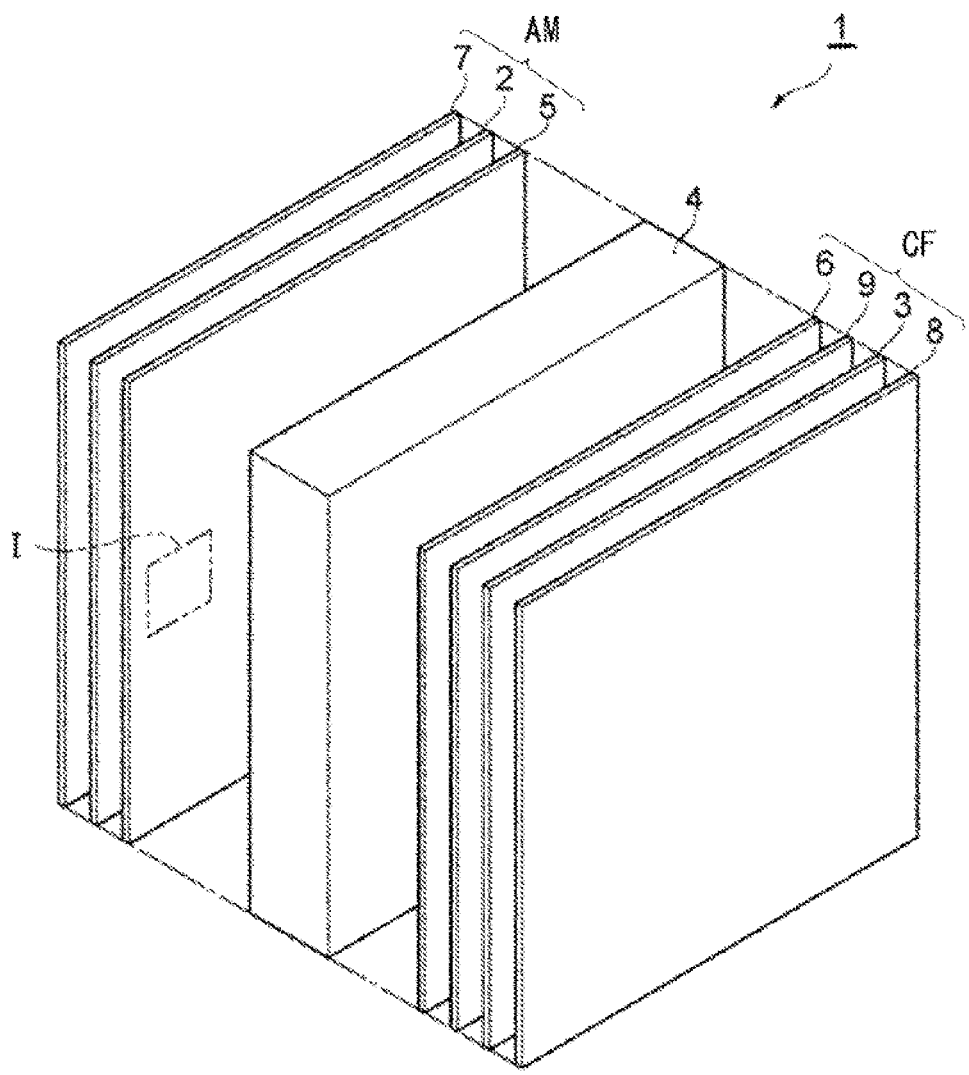
FIG. 1 is an exploded perspective view schematically showing one embodiment of a liquid crystal display device.

The substrate of the present invention and the liquid crystal display device of the present invention will be described in detail based on preferred embodiments.

First, a liquid crystal composition used in the present invention will be described.

(Liquid Crystal Composition)

The liquid crystal composition contains liquid crystal molecules and an alignment aid having a polar group and having the function of causing the liquid crystal molecules to be aligned spontaneously.

((Alignment Aid))

The alignment aid (self-alignment compound) interacts with members (electrodes (such as ITO electrodes), substrates (such as glass substrates, acrylic substrates, transparent substrates, or flexible substrates), resin layers (such as color filters, alignment films, or overcoat layers), or insulating films (such as inorganic material layers or SiNx layers)) that are to be in direct contact with a liquid crystal layer containing the liquid crystal composition and has the function of inducing homeotropic alignment or homogeneous alignment of the liquid crystal molecules contained in the liquid crystal layer.

Preferably, the alignment aid has a polymerizable group for polymerization, a mesogenic group similar to the liquid crystal molecules, an adsorptive group (polar group) that can interact with a member to be in direct contact with the liquid crystal layer, and an alignment inducing group that induces alignment of the liquid crystal molecules.

Preferably, the adsorptive group and the alignment inducing group are bonded to the mesogenic group, and the polymerizable group is substituted on the mesogenic group, the adsorptive group, or the alignment inducing group directly or, if necessary, through a spacer group. In particular, preferably, the polymerizable group introduced into the adsorptive group is substituted on the mesogenic group.

In the following description, * at the left end of a chemical formula and * at the right end each represent a bond.

"Alignment Inducing Group" The alignment inducing group has the function of inducing alignment of the liquid crystal molecules and is preferably a group represented by the following general formula (AK).

[Chem. 1]

$$R^{AK1}-* \quad (AK)$$

In formula (AK), $R^{AK1}$ represents a linear or branched alkyl group having 1 to 20 carbon atoms. One or two or more —$CH_2$— groups in the alkyl group may be each independently replaced with —CH=CH—, —C≡C—, —O—, —CO—, —COO—, or —OCO— in such a manner that oxygen atoms are not linked directly to one another, and one or two or more hydrogen atoms in the alkyl group may be each independently replaced with a halogeno group.

$R^{AK1}$ represents preferably a linear or branched alkyl group having 1 to 20 carbon atoms, more preferably a linear alkyl group having 1 to 20 carbon atoms, and still more preferably a linear alkyl group having 1 to 8 carbon atoms.

One —$CH_2$— group or two or more non-adjacent —$CH_2$— groups in the alkyl group may be each independently replaced with —CH=CH—, —C≡C—, —O—, —CO—, —COO—, or —OCO—.

Moreover, any hydrogen atom in the alkyl group may be replaced with a fluorine atom or a chlorine atom or may be replaced with a fluorine atom.

From the viewpoint of imparting so-called amphiphilicity to the alignment aid in the liquid crystal layer, it is preferable that the alignment inducing group is bonded to the mesogenic group.

"Polymerizable Group"

Preferably, the polymerizable group is represented by $P^{AP1}$-$Sp^{AP1}$-.

Preferably, $P^{AP1}$ is a group selected from the group consisting of groups represented by the following general formula (AP-1) to general formula (AP-9).

[Chem. 2]

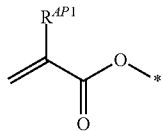
(AP-1)

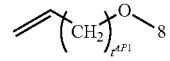
(AP-2)

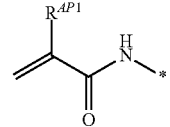
(AP-3)

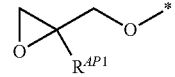
(AP-4)

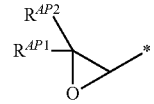
(AP-5)

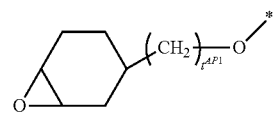
(AP-6)

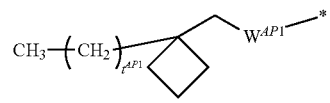
(AP-7)

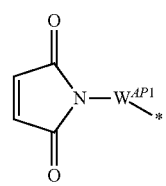
(AP-8)

HS—*
(AP-9)

In the above formulas, $R^{AP2}$ and $R^{AP2}$ each independently represent a hydrogen atom, an alkyl group having 1 to 5 carbon atoms, or a halogenated alkyl group having 1 to 10 carbon atoms. One or two or more —$CH_2$— groups in the alkyl group may each be replaced with —O— or —CO—, and one or two or more hydrogen atoms in the alkyl group may be each independently replaced with a halogen atom or a hydroxy group.

$W^{AP1}$ represents a single bond, —O—, —COO—, or —$CH_2$—.

$t^{AP1}$ represents 0, 1, or 2.

$P^{AP1}$ is preferably a group represented by any of general formula (AP-1) to general formula (AP-7), more preferably a group represented by general formula (AP-1) or general formula (AP-2), and still more preferably a group represented by general formula (AP-1).

$Sp^{AP1}$ represents preferably a single bond or a linear or branched alkylene group having 1 to 20 carbon atoms, more preferably a single bond or a linear alkylene group having 1 to 20 carbon atoms, and still more preferably a single bond or a linear alkylene group having 2 to 10 carbon atoms.

In $Sp^{AP1}$, one —$CH_2$— group or two or more non-adjacent —$CH_2$— groups in the alkylene group may be each independently replaced with —CH=CH—, —C≡C—, —O—, —CO—, —COO—, or —OCO—.

In the alignment aid, the number of polymerizable groups ($P^{AP1}$-$Sp^{AP1}$-) is preferably from 1 to 5 inclusive, more preferably from 1 to 4 inclusive, still more preferably from 2 to 4 inclusive, particularly preferably 2 or 3, and most preferably 2.

Any hydrogen atom in $P^{AP1}$-$Sp^{AP1}$- may be replaced with a polymerizable group, an adsorptive group, and/or an alignment inducing group.

Each polymerizable group ($P^{AP1}$-$Sp^{AP1}$-) may be bonded to another polymerizable group, the mesogenic group, the adsorptive group, and/or the alignment inducing group.

Each polymerizable group ($P^{AP1}$-$Sp^{AP1}$-) is bonded preferably to the mesogenic group, the adsorptive group, and/or the alignment inducing group and more preferably to the mesogenic group or the adsorptive group.

When a plurality of $P^{AP1}$ groups and/or a plurality of $Sp^{AP1}$- groups are present in one molecule, they may be the same or different.

"Mesogenic Group"

The mesogenic group is a group having a rigid portion, for example, a group having at least one cyclic group and is preferably a group having 2 to 4 cyclic groups and more preferably 3 or 4 cyclic groups. The cyclic groups may be optionally connected to each other through a linking group. Preferably, the mesogenic group has a skeleton similar to that of the liquid crystal molecules (liquid crystal compound) used in the liquid crystal layer.

In the present description, the term "cyclic group" means an atomic group including atoms linked so as to form a ring and is intended to include carbocycles, heterocycles, saturated and unsaturated cyclic structures, monocyclic structures, bicyclic structures, polycyclic structures, aromatic structures, and non-aromatic structures.

The cyclic group may contain at least one heteroatom and may be substituted with at least one substituent (a halogeno group, a polymerizable group, or an organic group (such as alkyl, alkoxy, or aryl). When the cyclic group is a monocycle, it is preferable that the mesogenic group contains at least two monocycles.

Preferably, the mesogenic group is represented by, for example, general formula (AL).

[Chem. 3]

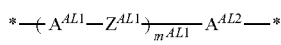

(AL)

In general formula (AL), $Z^{AL1}$ represents a single bond, —CH=CH—, —CF=CF—, —C≡C—, —COO—, —OCO—, —OCOO—, —CF$_2$O—, —OCF$_2$—, —CH=CHCOO—, —OCOCH=CH—, —CH$_2$CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, or an alkylene group having 1 to 20 carbon atoms. One —CH$_2$— group or two or more non-adjacent —CH$_2$— groups in the alkylene group may each be replaced with —O—, —COO—, or —OCO—.

$A^{AL1}$ and $A^{AL2}$ each independently represent a divalent cyclic group.

One or two or more hydrogen atoms in each of $Z^{AL1}$, $A^{AL1}$, and $A^{AL2}$ may be each independently replaced with a halogeno group, an adsorptive group, $P^{AP1}$-$Sp^{AP1}$-, or a monovalent organic group.

When a plurality of $Z^{AL1}$s and a plurality of $A^{AL1}$s are present in one molecule, they may be the same or different.

$m^{AL1}$ represents an integer of 1 to 5.

In general formula (AL), $Z^{AL1}$ is preferably a single bond or an alkylene group having 2 to 20 carbon atoms, more preferably a single bond or an alkylene group having 2 to 10 carbon atoms, and still more preferably a single bond, —(CH$_2$)$_2$—, or —(CH$_2$)$_4$—. One —CH$_2$— group or two or more non-adjacent —CH$_2$— groups in the alkylene group may each be replaced with —O—, —COO—, or —OCO—.

For the purpose of increasing the linearity of the rod-shaped molecules, $Z^{AL1}$ is preferably a single bond linking rings directly or a moiety including an even number of atoms connecting the rings directly. When, for example, $Z^{AL1}$ is —CH$_2$—CH$_2$COO—, the number of atoms directly linking the rings is 4.

In general formula (AL), $A^{AL1}$ and $A^{AL2}$ each independently represent a divalent cyclic group. The divalent cyclic group is preferably a group selected from the group consisting of a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a thiophene-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, and a fluorene-2,7-diyl group. The divalent cyclic group is more preferably a 1,4-phenylene group, a 1,4-cyclohexylene group, a 2,6-naphthylene group, or a phenanthrene-2,7-diyl group and still more preferably a 1,4-phenylene group or a 1,4-cyclohexylene group.

These groups may be unsubstituted or substituted with a substituent. The substituent is preferably a fluorine atom or an alkyl group having 1 to S carbon atoms. The alkyl group may be substituted with a fluorine atom or a hydroxy group.

One or two or more hydrogen atoms in the cyclic group may be replaced with a halogeno group, an adsorptive group, $P^{AP1}$—$Sp^{AP1}$, or a monovalent organic group.

In general formula (AL), the monovalent organic group is a group having the chemical structure of a monovalent group originating from an organic compound and is an atomic group obtained by removing one hydrogen atom from the organic compound.

Examples of the monovalent organic group include alkyl groups having 1 to 15 carbon atoms, alkenyl groups having 2 to 15 carbon atoms, alkoxy groups having 1 to 14 carbon atoms, and alkenyloxy groups having 2 to 15 carbon atoms. The monovalent organic group is preferably an alkyl group having 1 to 15 carbon atoms or an alkoxy group having 1 to 14 carbon atoms, more preferably an alkyl group having 1 to 8 carbon atoms or an alkoxy group having 1 to 8 carbon atoms, still more preferably an alkyl group having 1 to 5 carbon atoms or an alkoxy group having 1 to 4 carbon atoms, particularly preferably an alkyl group having 1 to 3 carbon atoms or an alkoxy group having 1 to 2 carbon atoms, and most preferably an alkyl group having 1 or 2 carbon atoms or an alkoxy group having 1 carbon atom.

One —CH$_2$— group or two or more non-adjacent —CH$_2$— groups in each of the above alkyl groups, alkenyl groups, alkoxy groups, and alkenyloxy groups may be replaced with —O—, —COO—, or —OCO—. Moreover, the monovalent organic group may serve as the alignment inducing group described later.

In general formula (AL) above, $m^{AL1}$ is preferably an integer of 1 to 4, more preferably an integer of 1 to 3, and still more preferably 2 or 3.
Preferred forms of the mesogenic group include the following formulas (me-1) to (me-45).
[Chem. 4]
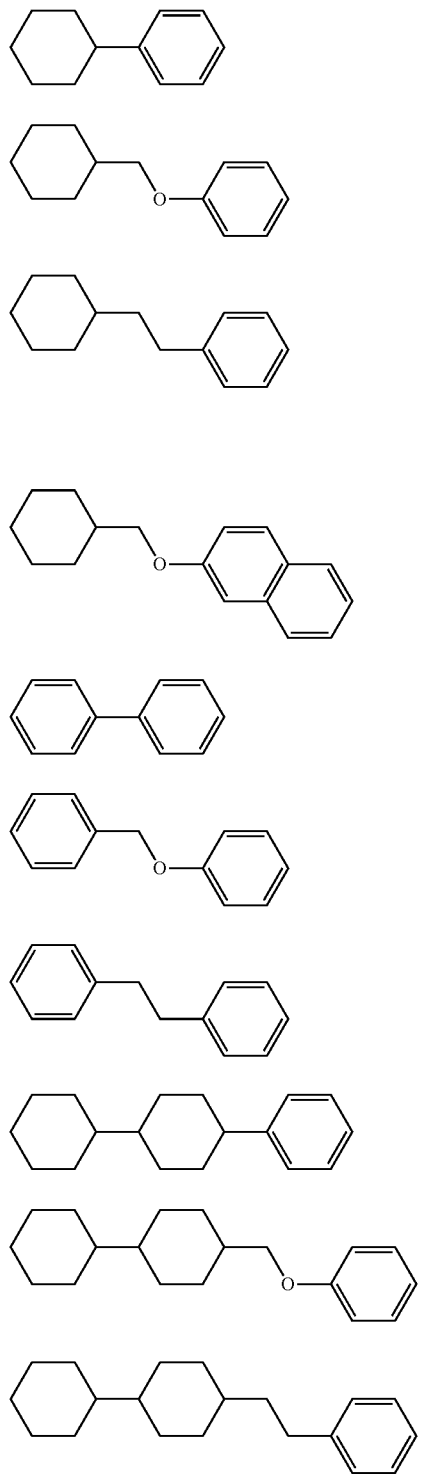
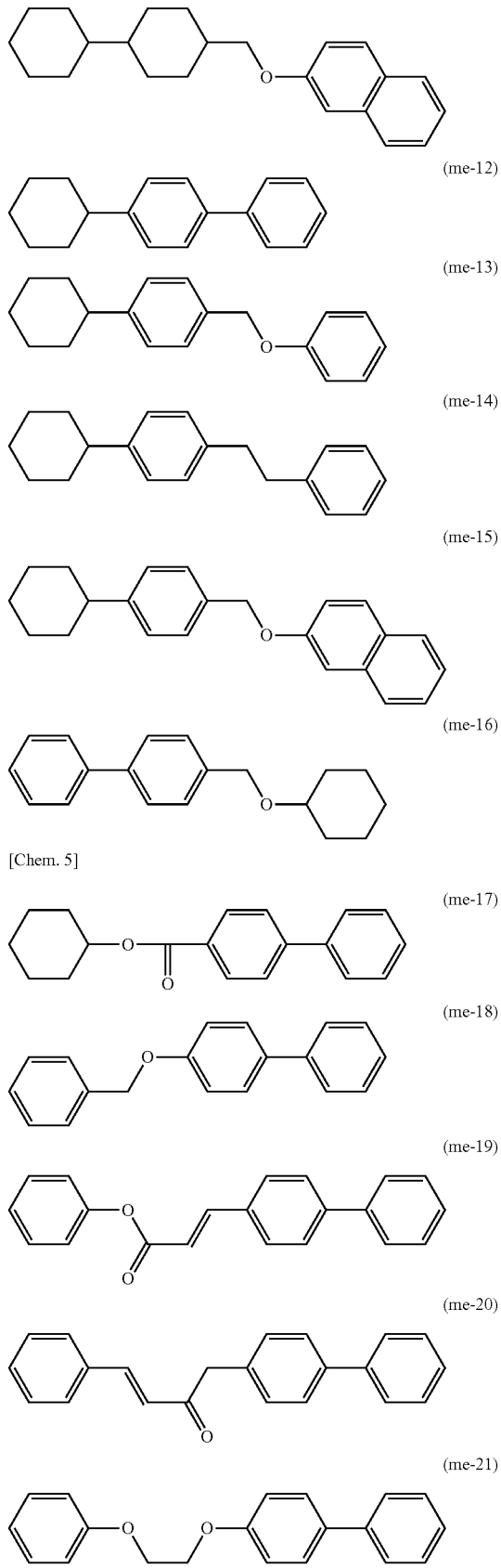
[Chem. 5]

(me-22) 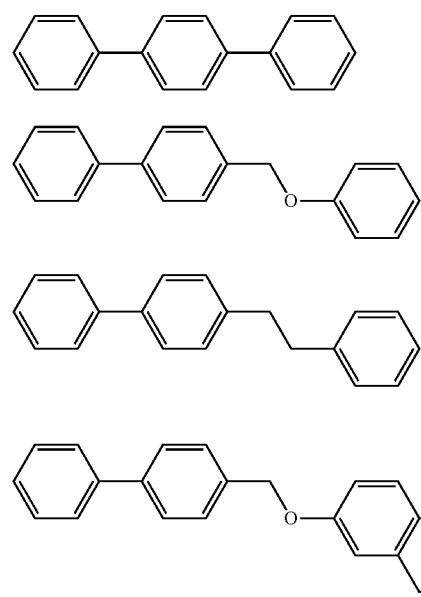
(me-23)
(me-24)
(me-25)
[Chem. 6]
(me-26) 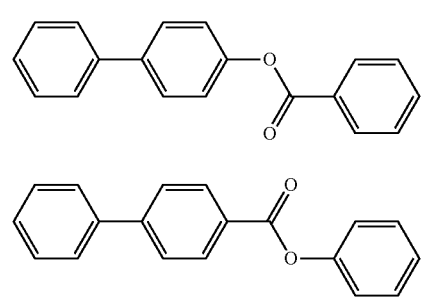
(me-27)
(me-28) 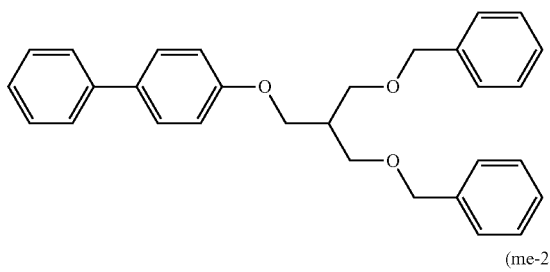
(me-29) 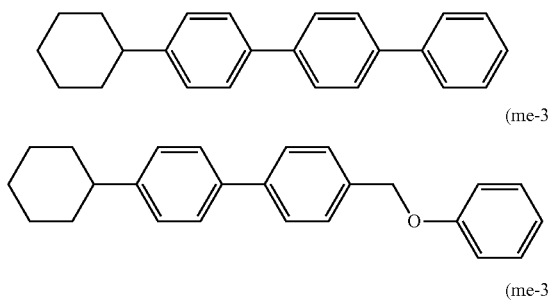
(me-30) 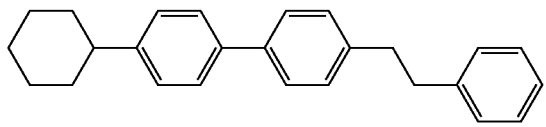
(me-31)
(me-32) 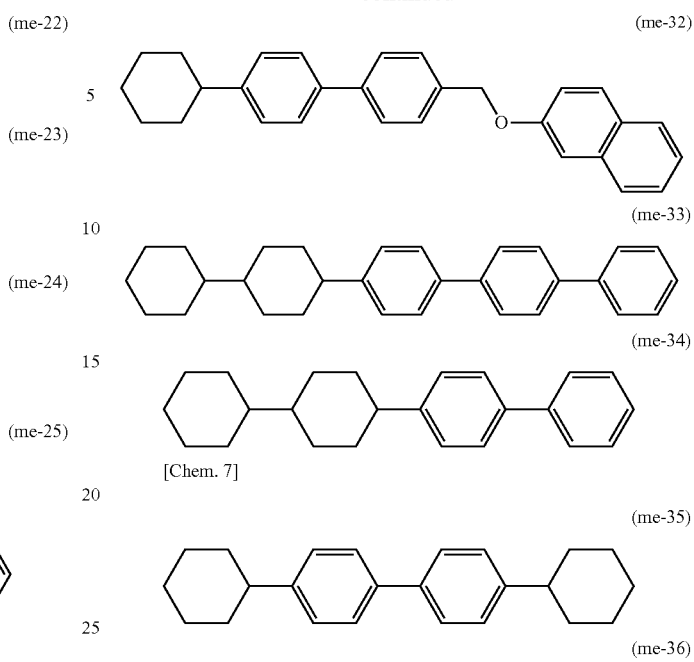
(me-33)
(me-34)
[Chem. 7]
(me-35) 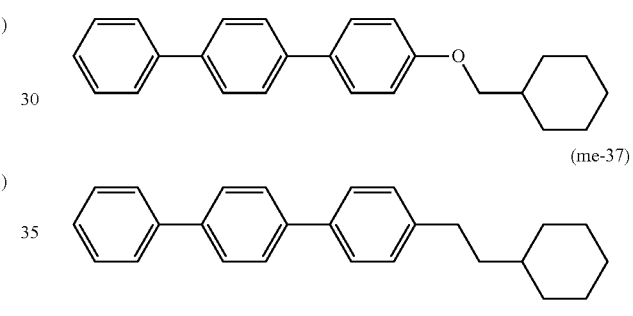
(me-36)
(me-37)
(me-38) 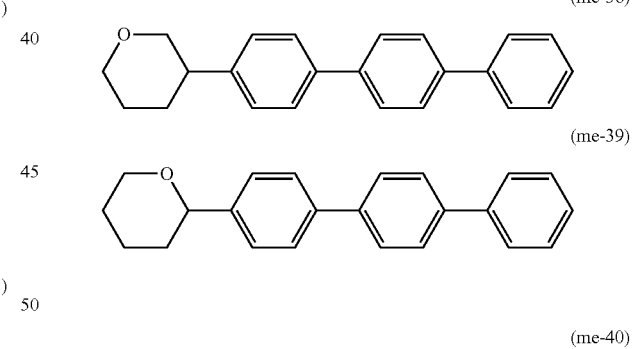
(me-39)
(me-40) 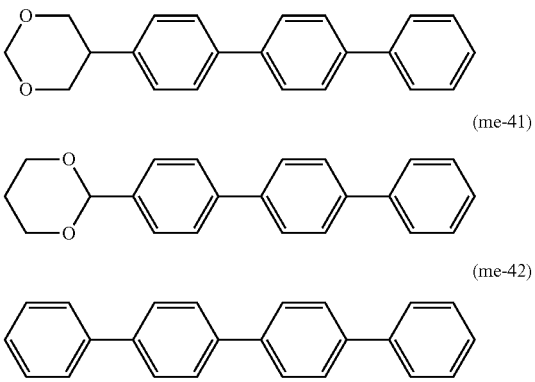
(me-41)
(me-42)

-continued

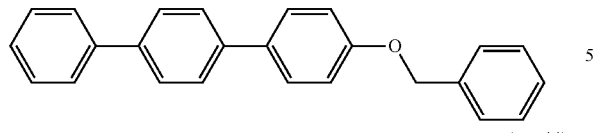
(me-43)

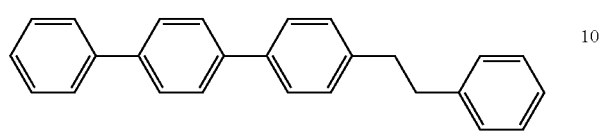
(me-44)

[Chem. 8]

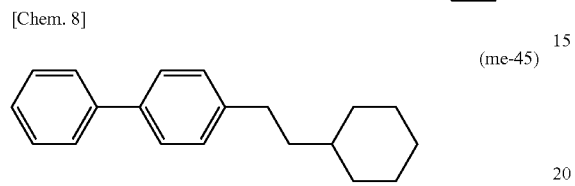
(me-45)

General formula (AL) represents a structure obtained by removing 2 hydrogen atoms from one of the above compounds.

In these formulas (me-1) to (me-45), one or two or more hydrogen atoms in each of the cyclohexane rings, the benzene rings, and the naphthalene rings may be each independently replaced with a halogeno group, $P^{AP1}$-$Sp^{AP1}$-, a monovalent organic group (such as an alkyl group having 1 to 15 carbon atoms or an alkoxy group having 1 to 14 carbon atoms), an adsorptive group, or an alignment inducing group.

Preferred forms of the mesogenic group include formulas (me-8) to (me-45), and more preferred forms include formulas (me-8) to (me-10), formulas (me-12) to (me-18), formulas (me-22) to (me-24), formulas (me-26) to (me-27), formulas (me-29) to (me-45). Still more preferred forms include formulas (me-12), (me-15) to (me-16), (me-22) to (me-24), (me-29), (me-34), (me-36) to (me-37), and (me-42) to (me-45).

Particularly preferred forms of the mesogenic group include the following general formulas (AL-1) and (AL-2), and the most preferred form is the following general formula (AL-1).

[Chem. 9]

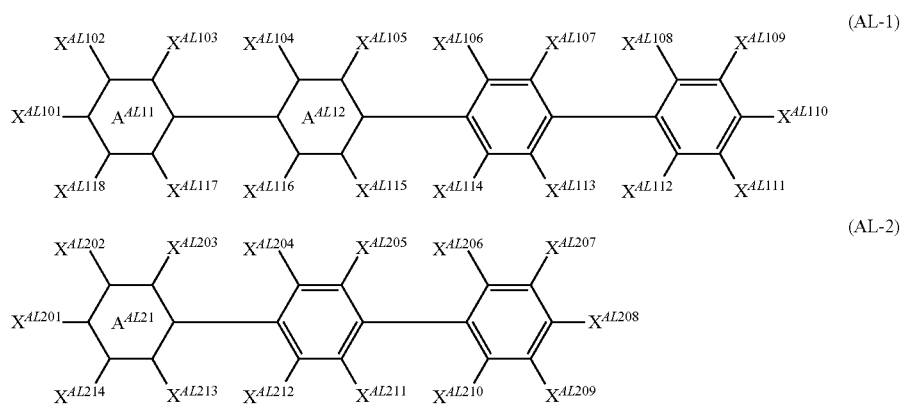

In these formulas, $X^{AL101}$ to $X^{AL118}$ and $X^{AL201}$ to $X^{AL214}$ each independently represent a hydrogen atom, a halogeno group, $P^{AP1}$-$Sp^{AP1}$-, an adsorptive group, or an alignment inducing group.

Ring $A^{AL11}$, ring $A^{AL12}$, and ring $A^{AL21}$ each independently represent a cyclohexane ring or a benzene ring.

One or two or more of $X^{AL101}$ to $X^{AL118}$ and $X^{AL201}$ to $X^{AL214}$ are each substituted with an adsorptive group.

One or two or more of $X^{AL101}$ to $X^{AL118}$ and $X^{AL201}$ to $X^{AL214}$ are each substituted with an alignment inducing group.

Each adsorptive group and each alignment inducing group may each be substituted with $P^{AP1}$-$Sp^{AP1}$-.

In general formula (AL-1) or general formula (AL-2), one or two or more $P^{AP1}$-$Sp^{AP1}$- groups are present in their molecule.

In general formula (AL-1), $X^{AL101}$ is preferably an alignment inducing group.

In general formula (AL-1), at least one of $X^{AL109}$, $X^{AL110}$, and $X^{AL111}$ is preferably an adsorptive group. More preferably, $X^{AL109}$ and $X^{AL110}$ are each an adsorptive group, or $X^{AL110}$ is an adsorptive group. Still more preferably, $X^{AL110}$ is an adsorptive group.

In general formula (AL-1), it is preferable that at least one of $X^{AL109}$, $X^{AL110}$ and $X^{AL111}$ is $P^{AP1}$-$Sp^{AP1}$- or an adsorptive group having a polymerizable moiety in its structure, and it is more preferable that both or one of $X^{AL109}$ and $X^{AL111}$ is $P^{AP1}$-$Sp^{AP1}$-.

In general formula (AL-1), one or two of $X^{AL104}$ to $X^{AL108}$ and $X^{AL112}$ to $X^{AL116}$ are each independently preferably an alkyl group having 1 to 5 carbon atoms, an alkoxy group having 1 to 5 carbon atoms, or a halogeno group and more preferably an alkyl group having 1 to 3 carbon atoms or a fluorine atom. Particularly preferably, $X^{AL105}$, $X^{AL106}$, and $X^{AL107}$ are each independently an alkyl group having 1 to 3 carbon atoms or a fluorine atom.

In general formula (AL-2), $X^{AL201}$ is preferably an alignment inducing group.

In general formula (AL-2), it is preferable that at least one of $X^{AL207}$, $X^{AL208}$, and $X^{AL209}$ is an adsorptive group, and it is more preferable that $X^{AL207}$ and $X^{AL208}$ are each an adsorptive group or $X^{AL208}$ is an adsorptive group. It is still more preferable that $X^{AL208}$ is an adsorptive group.

In general formula (AL-2), it is preferable that at least one of $X^{AL207}$, $X^{AL208}$, and $X^{AL209}$ is $P^{AP1}$-$Sp^{AP1}$- or an adsorptive group having a polymerizable moiety in its structure, and it is more preferable that both or one of $X^{AL207}$ and $X^{AL209}$ is $P^{AP1}$-$Sp^{AP1}$-.

In general formula (AL-2), one or two of $X^{AL202}$ to $X^{AL206}$ and $X^{AL210}$ to $X^{AL214}$ are each independently preferably an alkyl group having 1 to 5 carbon atoms, an alkoxy group having 1 to 5 carbon atoms, or a halogeno group and more preferably an alkyl group having 1 to 3 carbon atoms or a fluorine atom. It is particularly preferable that $X^{AL204}$, $X^{AL205}$, or $X^{AL156}$ is each independently an alkyl group having 1 to 3 carbon atoms or a fluorine atom.

"Adsorptive Group"

The adsorptive group is a group that plays a role in adsorbing on an adsorbent, i.e., a layer such as a substrate, a film, or an electrode that is in contact with the liquid crystal composition.

Adsorption is generally classified into chemical adsorption in which an adsorbate adsorbs on an adsorbent through a chemical bond (a covalent bond, an ionic bond, or a metallic bond) and physical adsorption other than the chemical adsorption. In the present description, adsorption may be chemical adsorption or may be physical adsorption, but physical adsorption is preferred. Therefore, the adsorptive group is preferably a group that is physically adsorbable on the adsorbent and more preferably a group that is bondable to the adsorbent through intermolecular force.

Examples of the form of bonding to the adsorbent through intermolecular force include a form of bonding through interaction such as permanent dipoles, permanent quadrupoles, dispersion force, charge transfer force, or hydrogen bonding.

One preferred form of the adsorptive group is a form in which the adsorptive group is bondable to the adsorbent through hydrogen bonding. In this case, the adsorptive group may serve as either a proton donor or acceptor for hydrogen bonding or may serve as both the donor and acceptor.

The adsorptive group is preferably a group containing a polar component having an atomic group including a carbon atom and a heteroatom linked thereto (hereinafter the "adsorptive group" may be referred to also as a "polar group"). In the present description, the polar component is an atomic group in which a carbon atom is linked directly to a heteroatom.

The heteroatom is preferably at least one selected from the group consisting of N, O, S, P, B, and Si, more preferably at least one selected from the group consisting of N, O, and S, still more preferably at least one selected from the group consisting of N and O, and particularly preferably O.

In the alignment aid, no particular limitation is imposed on the valence of the polar component, and the valence may be 1, 2, 3, etc. Moreover, no particular limitation is imposed on the number of polar components in the adsorptive group.

The alignment aid has, in its molecule, preferably 1 to 8 adsorptive groups, more preferably 1 to 4 adsorptive groups, and still more preferably 1 to 3 adsorptive groups. Polymerizable groups and alignment inducing groups are excluded from the adsorptive groups, but a structure in which a hydrogen atom in an adsorptive group is replaced with $P^{AP1}$-$Sp^{AP1}$- and a structure in which a hydrogen atom in $P^{AP1}$-$Sp^{AP1}$- is replaced with —OH are included in the above adsorptive groups.

The adsorptive groups each contain one or two or more polar components and are broadly classified into a cyclic group type and a chain group type.

An adsorptive group of the cyclic group type includes, in its structure, a cyclic group having a cyclic structure containing a polar component, and an adsorptive group of the chain group type includes, in its structure, no cyclic group having a cyclic structure containing a polar component.

An adsorptive group of the chain group type has a polar component in its linear or branched chain structure and may have a portion having a cyclic structure containing no polar component.

The adsorptive group of the cyclic group type means a form having a structure including at least one polar component in its cyclic atomic arrangement.

In the present description, the cyclic group is as described above. Therefore, it is only necessary that the adsorptive group of the cyclic group type contain a cyclic group including a polar component, and the adsorptive group as a whole may be branched or linear.

The adsorptive group of the linear group type means a form that has, in its molecule, no cyclic atomic arrangement containing a polar component and has a structure containing at least one polar component in a linear atomic arrangement (which may be branched).

In the present description, the chain group is an acyclic group and means an atomic group which contains no cyclic atomic arrangement in its structural formula and in which the atoms forming the atomic group are bonded linearly (may be branched). In other words, the chain group is a linear or branched aliphatic group and may contain either a saturated bond or an unsaturated bond.

Therefore, examples of the chain group include alkyls, alkenyls, alkoxys, esters, ethers, and ketones. Any hydrogen atom in these groups may be replaced with at least one substituent (a reactive functional group (such as a vinyl group, an acrylic group, or a methacrylic group) or a chain organic group (such as an alkyl or a cyano)). The chain group may be linear or branched.

The adsorptive group of the cyclic group type is preferably a heteroaromatic group (including a fused ring) having 3 to 20 carbon atoms or a heteroalicyclic group (including a fused ring) having 3 to 20 carbon atoms, more preferably a heteroaromatic group (including a fused ring) having 3 to 12 carbon atoms or a heteroalicyclic group (including a fused ring) having 3 to 12 carbon atoms, and still more preferably a five-membered heteroaromatic group, a five-membered heteroalicyclic group, a six-membered heteroaromatic group, or a six-membered heteroalicyclic group. Any hydrogen atom in these cyclic structures may be replaced with a halogeno group, a linear or branched alkyl group having 1 to 5 carbon atoms, or a linear or branched alkyloxy group having 1 to 5 carbon atoms.

Preferably, the adsorptive group of the linear group type is a linear or branched alkyl group which has 1 to 20 carbon atoms and in which any of the hydrogen atoms and the —$CH_2$— groups in its structure is replaced with a polar component. One —$CH_2$— group or two or more non-adjacent —$CH_2$— groups in the alkyl group may be replaced with —CH=CH—, —C≡C—, —O—, —CO—, —COO—, or —OCO—. Preferably, the adsorptive group of the linear group type has one or two or more polar components at its ends.

Any hydrogen atom in the adsorptive group may be replaced with a polymerizable group.

Specific examples of the polar component include polar components containing an oxygen atom (hereinafter referred to as oxygen-containing polar components), polar components containing a nitrogen atom (hereinafter referred to as nitrogen-containing polar components), polar components containing a phosphorus atom (hereinafter referred to as phosphorus-containing polar components), polar components containing a boron atom (hereinafter referred to as boron-containing polar components), polar components containing a silicon atom (hereinafter referred to as silicon-containing polar components), and polar components containing a sulfur atom (hereinafter referred to as sulfur-containing polar components). From the viewpoint of adsorbability, the polar component is preferably a nitrogen-containing polar component, or an oxygen-containing polar component and more preferably an oxygen-containing polar component.

The oxygen-containing polar component is preferably at least one group selected from the group consisting of a hydroxy group, alkylol groups, alkoxy groups, a formyl group, a carboxyl group, ether groups, a carbonyl group, carbonate groups, and ester groups or a group in which any of the above groups is linked to a carbon atom.

The nitrogen-containing polar component is preferably at least one group selected from the group consisting of a cyano group, primary amino groups, secondary amino groups, tertiary amino groups, a pyridyl group, a carbamoyl group, and ureide groups or a group in which any of the above groups is linked to a carbon atom.

The phosphorus-containing polar component is preferably at least one group selected from the group consisting of phosphinyl groups and phosphate groups or a group in which any of the above groups is linked to a carbon atom.

It is therefore preferable that one or two or more groups selected from the group consisting of cyclic groups having oxygen-containing polar components (hereinafter referred to as oxygen-containing cyclic groups), cyclic groups having nitrogen-containing polar components (hereinafter referred to as nitrogen-containing cyclic groups), cyclic groups having sulfur-containing polar components (hereinafter referred to as sulfur-containing cyclic groups), chain groups having oxygen-containing polar components (hereinafter referred to as oxygen-containing chain groups), and chain groups having nitrogen-containing polar components (hereinafter referred to as nitrogen-containing chain groups) are used as the adsorptive groups or each adsorptive group contains any of the above groups. From the viewpoint of adsorbability, it is preferable to contain one or two or more groups selected from the group consisting of oxygen-containing cyclic groups, sulfur-containing cyclic groups, oxygen-containing chain groups, and nitrogen-containing chain groups.

It is preferable to contain, as the oxygen-containing cyclic group, any of the following groups each having an oxygen atom as an ether group in the cyclic structure.

[Chem. 10]

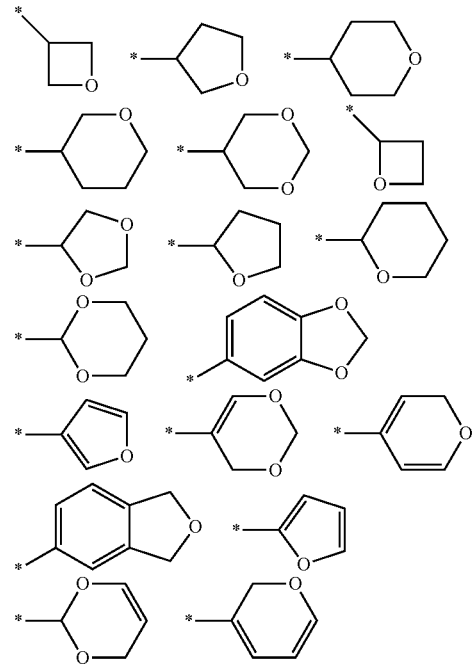

It is also preferable to contain, as the oxygen-containing cyclic group, any of the following groups each having an oxygen atom as a carbonyl group, a carbonate group, or an ester group in the cyclic structure.

[Chem. 11]

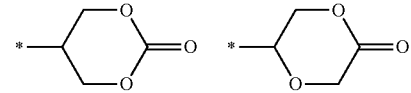

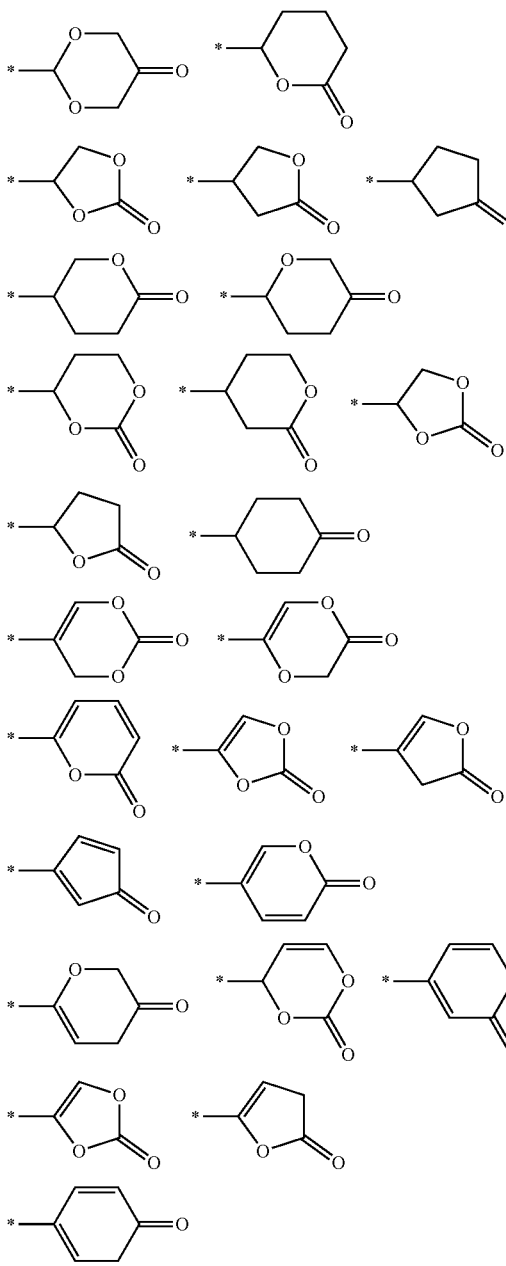

It is preferable to contain, as the nitrogen-containing cyclic group, any of the following groups.

[Chem. 12]

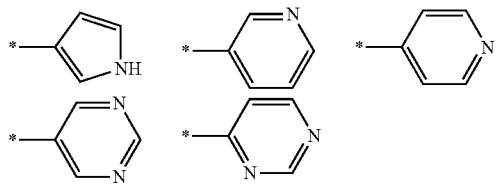

It is preferable to contain, as the oxygen-containing chain group, any of the following groups.

[Chem. 13]

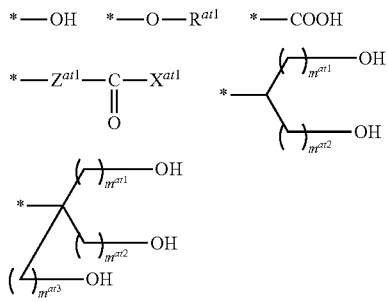

In the above formulas, $R^{at1}$ represents a hydrogen atom or an alkyl group having 1 to 5 carbon atoms.

$Z^{at1}$ represents a single bond, a linear or branched alkylene group having 1 to 15 carbon atoms, or a linear or branched alkenylene group having 2 to 18 carbon atoms. Any —CH$_2$— group in the alkylene group or the alkenylene group may be replaced with —O—, —COO—, —C(=O)—, or —OCO— in such a manner that oxygen atoms are not directly adjacent to each other.

$X^{at1}$ represents an alkyl group having 1 to 15 carbon atoms. Any —CH$_2$— group in the alkyl group may be replaced with —O—, —COO—, —C(=O)—, or —OCO— in such a manner that oxygen atoms are not directly adjacent to each other.

It is preferable to contain, as the nitrogen-containing chain group, any of the following groups.

[Chem. 14]

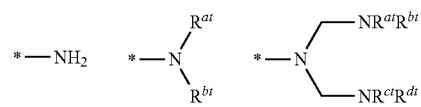

In the above formulas, $R^{at}$, $R^{bt}$, $R^{ct}$, and $R^{dt}$ each independently represent a hydrogen atom or an alkyl group having 1 to 5 carbon atoms.

The adsorptive group is preferably a group represented by the following general formula (AT).

[Chem. 15]

(AT)

In the above formula, $Sp^{AT1}$ represents a single bond or a linear or branched alkylene group having 1 to 25 carbon atoms. Any hydrogen atom in the alkylene group may be replaced with —OH, —CN, —$W^{AT1}$—$Z^{AT1}$ or $P^{AP1}$-$Sp^{AP1}$-, and any —CH$_2$— group in the alkylene group may be replaced with a cyclic group, —O—, —COO—, —C(=O)—, —OCO—, or —CH=CH— in such a manner that oxygen atoms are not linked directly to one another.

$W^{AT1}$ represents a single bond or the following general formula ($W^{AT1}$) or ($W^{AT2}$).

$Z^{AT1}$ represents a monovalent group containing a polar component. Any hydrogen atom in $Z^{AT1}$ may be replaced with —OH, —CN, -$Sp^{AT1}$-$W^{AT1}$—$Z^{AT1}$, or $P^{AP1}$-$Sp^{AP1}$-.

[Chem. 16]

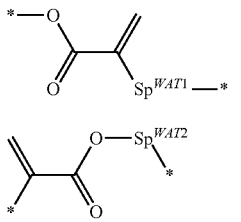

(In the above formulas, $Sp^{WAT1}$ and $Sp^{WAT2}$ each independently represent a single bond or a linear or branched alkylene group having 1 to 25 carbon atoms. Any hydrogen atom in the alkylene group may be replaced with —OH, —CN, -$Sp^{AT1}$-$W^{AT1}$—$Z^{AT1}$, or $P^{AP1}$-$Sp^{AP1}$-, and any —CH$_2$— group in the alkylene group may be replaced with a cyclic group, —O—, —COO—, —C(=O)—, —OCO—, or —CH=CH— in such a manner that oxygen atoms are not linked directly to one another.)

$Sp^{AT1}$, $Sp^{WAT1}$, and $Sp^{WAT2}$ each independently represent preferably a single bond or a linear or branched alkylene group having 1 to 20 carbon atoms, more preferably a single bond or a linear alkylene group having 1 to 20 carbon atoms, and still more preferably a single bond or a linear alkylene group having 2 to 10 carbon atoms.

In $Sp^{AT1}$, $Sp^{WAT1}$, and $Sp^{WAT2}$, one —CH$_2$— group or two or more non-adjacent —CH$_2$— groups in the alkylene group may be each independently replaced with —CH=CH—, —C≡C—, —O—, —CO—, —COO—, or —OCO— in such a manner that oxygen atoms are not linked directly to one another.

Any of the hydrogen atoms in $Sp^{AT1}$ and $Sp^{WAT1}$ may be each independently replaced with -$Sp^{AT1}$-$W^{AT1}$—$Z^{AT1}$ or $P^{AP1}$-$Sp^{AP1}$-.

$Z^{AT1}$ represents a monovalent group having a polar component and is preferably a group represented by the following general formula (ZAT1-1) or (ZAT1-2).

[Chem. 17]

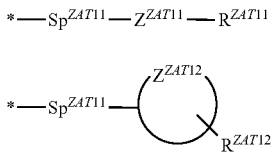

In the above formulas, $Sp^{ZAT11}$ and $Sp^{ZAT12}$ each independently represent a linear or branched alkylene group having 1 to 25 carbon atoms. Any hydrogen atom in the alkylene group may be replaced with —OH, —CN, -$Sp^{AT1}$-$W^{AT1}$—$Z^{AT1}$, or $P^{AP1}$-$Sp^{AP1}$-, and any —CH$_2$— group in the alkylene group may be replaced with a cyclic group, —O—, —COO—, —C(=O)—, —OCO—, or —CH=CH— in such a manner that oxygen atoms are not directly adjacent to each other.

$Z^{ZAT11}$ represents a group having a polar component.

The structure represented by a ring containing $Z^{ZAT12}$ in general formula (ZAT1-2) represents a 5 to 7-membered ring.

Any hydrogen atom in $Z^{ZAT11}$ and $Z^{ZAT12}$ may be replaced with —OH, —CN, -$Sp^{AT1}$-$W^{AT1}$—$Z^{AT1}$, or $P^{AP1}$-$Sp^{AP1}$-.

$R^{ZAT11}$ and $R^{ZAT12}$ each independently represent a linear or branched alkyl group having 1 to 8 carbon atoms. Any hydrogen atom in the alkyl group may be replaced with —OH, —CN, -$Sp^{AT1}$-$W^{AT1}$—$Z^{AT1}$, or $P^{AP1}$-$Sp^{AP1}$-, and any —CH$_2$— group in the alkyl group may be replaced with a cyclic group, —O—, —COO—, —C(=O)—, —OCO—, or —CH=CH— in such a manner that oxygen atoms are not linked directly to one another.

The group represented by general formula (ZAT1-1) is preferably a group represented by any of the following general formulas (ZAT1-1-1) to (ZAT1-1-30).

[Chem. 18]

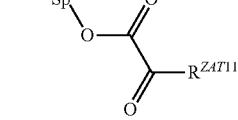

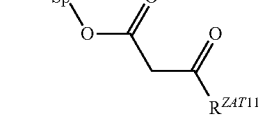

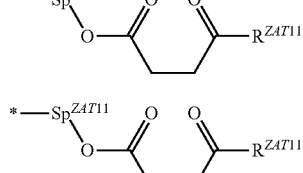

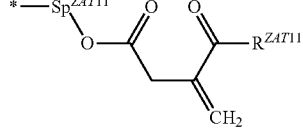

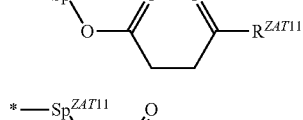

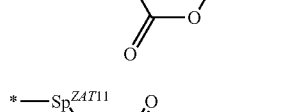

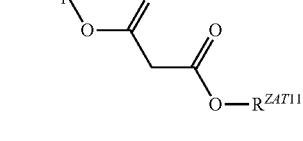

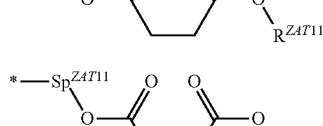

-continued (ZAT1-1-11)
(ZAT1-1-12)
(ZAT1-1-13)
(ZAT1-1-14)
(ZAT1-1-15)
(ZAT1-1-16)

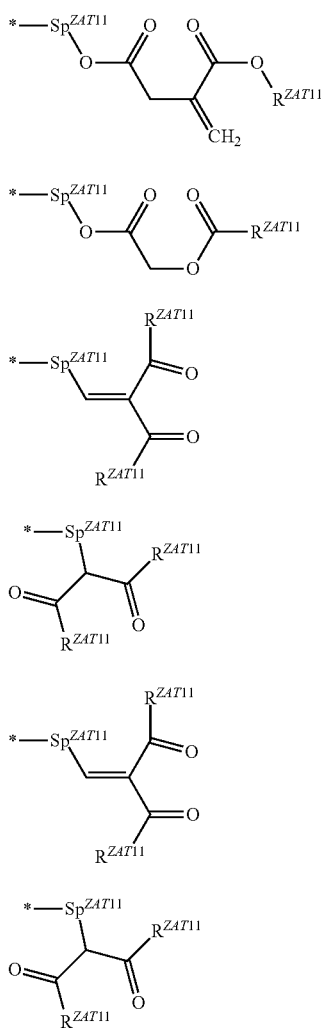

[Chem. 19]

(ZAT1-1-21)
(ZAT1-1-22)
(ZAT1-1-23)
(ZAT1-1-24)
(ZAT1-1-25)
(ZAT1-1-26)
(ZAT1-1-27)

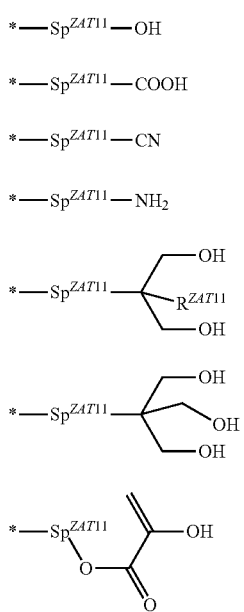

(ZAT1-1-28)
(ZAT1-1-29)
(ZAT1-1-30)

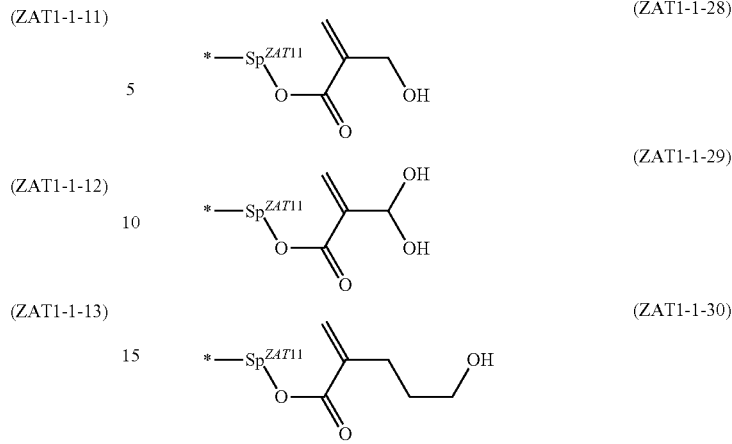

In the above formulas, any hydrogen atom bonded to a carbon atom may be replaced with —OH, —CN, -Sp$^{AT1}$-W$^{AT1}$—Z$^{AT1}$, or P$^{AP1}$-Sp$^{AP1}$-.

Sp$^{ZAT11}$ represents a linear or branched alkylene group having 1 to 25 carbon atoms. Any hydrogen atom in the alkylene group may be replaced with —OH, —CN, -Sp$^{AT1}$-W$^{AT1}$—Z$^{AT1}$, or P$^{AP1}$-Sp$^{AP1}$-, and any —CH$_2$— group in the alkylene group may be replaced with a cyclic group, —O—, —COO—, —C(=O)—, —OCO—, or —CH=CH— in such a manner that oxygen atoms are not directly adjacent to each other.

R$^{ZAT11}$ represents a linear or branched alkyl group having 1 to 8 carbon atoms. Any hydrogen atom in the alkyl group may be replaced with —OH, —CN, -Sp$^{AT1}$-W$^{AT1}$—Z$^{AT1}$, or P$^{AP1}$-Sp$^{AP1}$-, and any —CH$_2$— group in the alkyl group may be replaced with a cyclic group, —O—, —COO—, —C(=O)—, —OCO—, or —CH=CH— in such a manner that oxygen atoms are not linked directly to one another.

The group represented by general formula (ZAT1-2) is preferably a group represented by any of the following general formulas (ZAT1-2-1) to (ZAT1-2-9).

[Chem. 20]

(ZAT1-2-1)
(ZAT1-2-2)
(ZAT1-2-3)
(ZAT1-2-4)
(ZAT1-2-5)

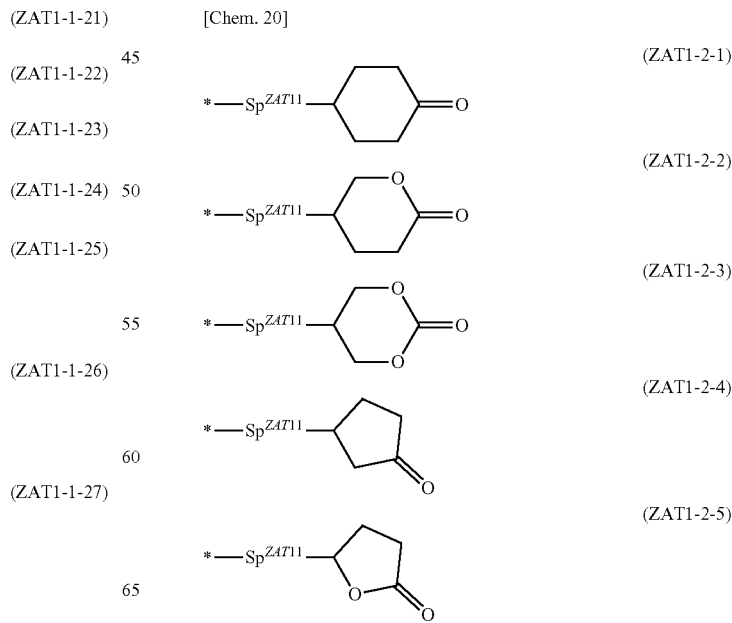

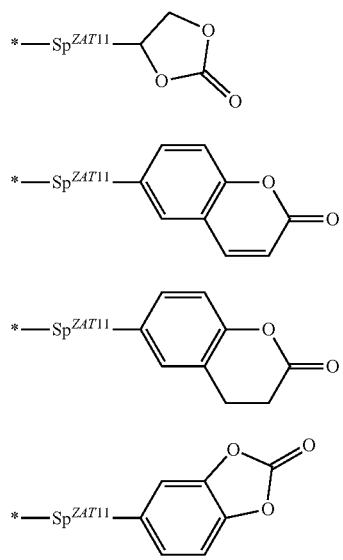

(ZAT1-2-6)

(ZAT1-2-7)

(ZAT1-2-8)

(ZAT1-2-9)

In the above formulas, any hydrogen atom bonded to a carbon atom may be replaced with a halogen atom, —OH, —CN, -Sp$^{AT1}$-W$^{AT1}$-Z$^{AT1}$, or P$^{AP1}$-Sp$^{AP1}$-.

Sp$^{ZAT11}$ represents a linear or branched alkylene group having 1 to 25 carbon atoms. Any hydrogen atom in the alkylene group may be replaced with —OH, —CN, —Sp$^{AT1}$-W$^{AT1}$-Z$^{AT1}$, or P$^{AP1}$-Sp$^{AP1}$-, and any —CH$_2$— group in the alkylene group may be replaced with a cyclic group, —O—, —COO—, —C(=O)—, —OCO—, or —CH=CH— in such a manner that oxygen atoms are not directly adjacent to each other.

Examples of the group represented by general formula (ZAT1-1) include the following groups.

[Chem. 21]

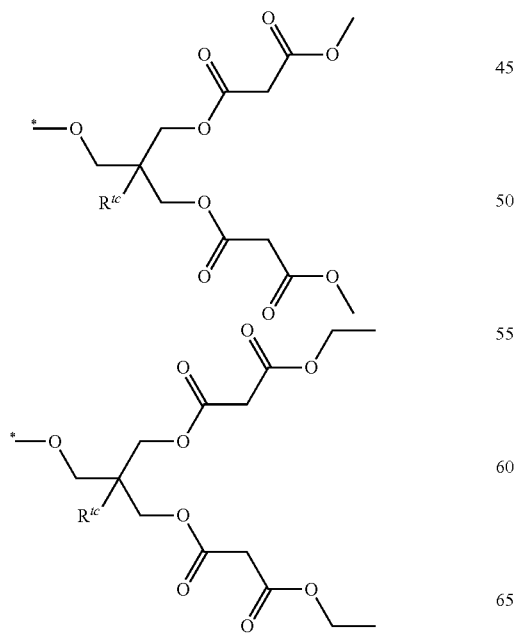

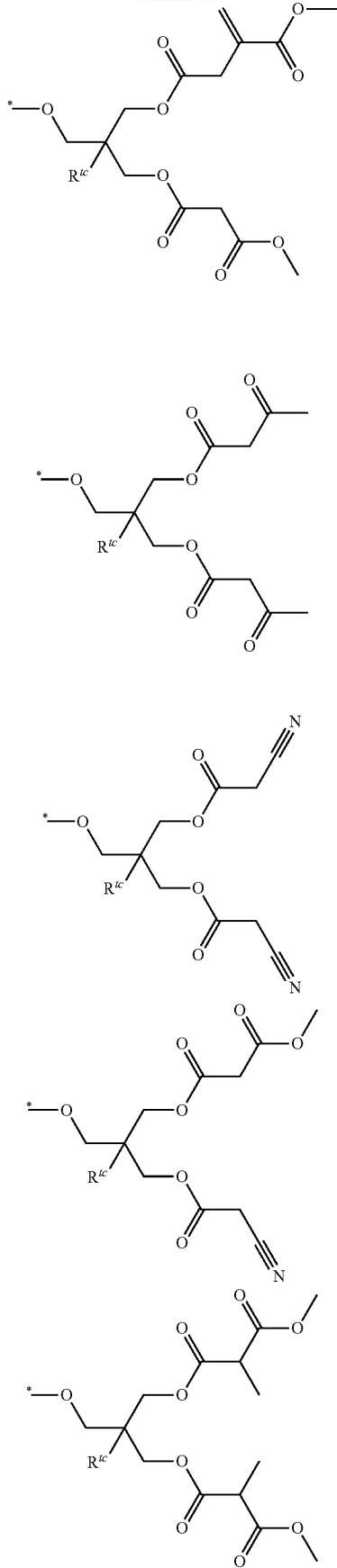

25
-continued
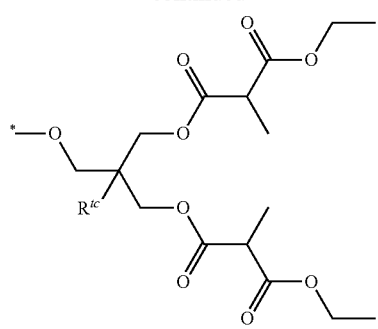
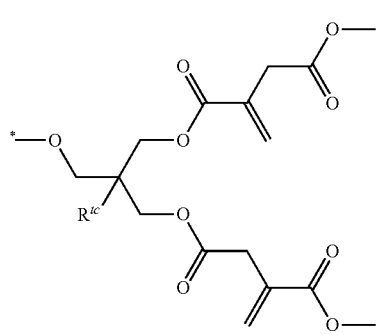
[Chem. 22]
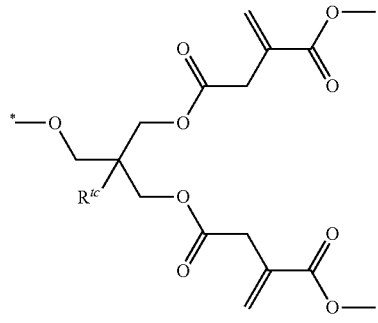
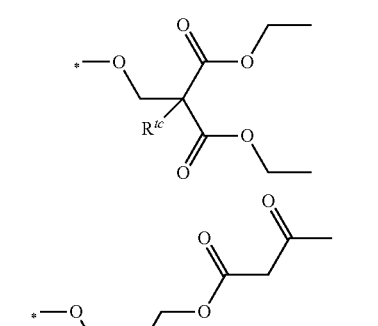
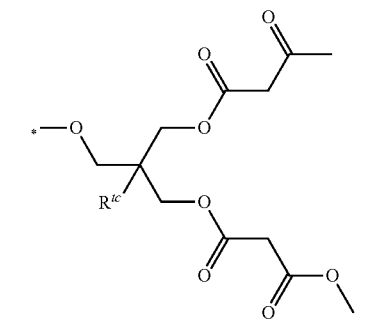
26
-continued
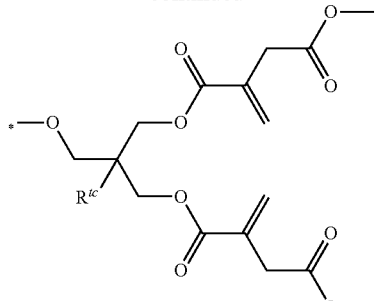
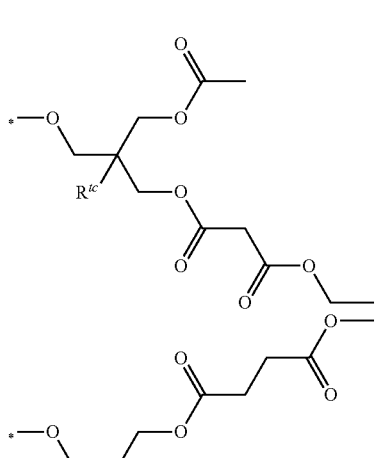
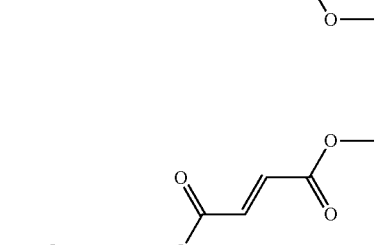
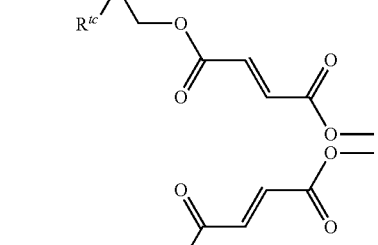
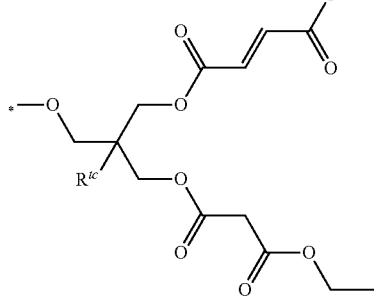

-continued
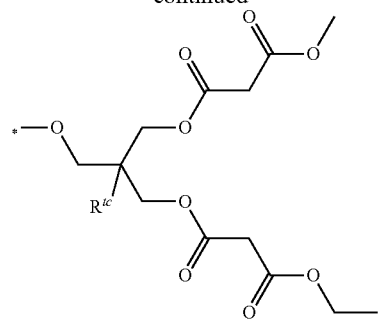
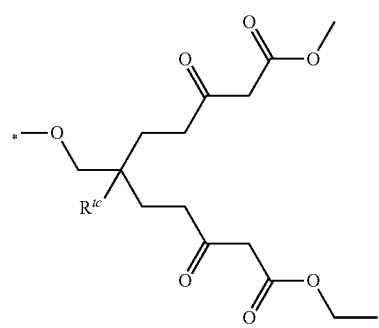
[Chem. 23]
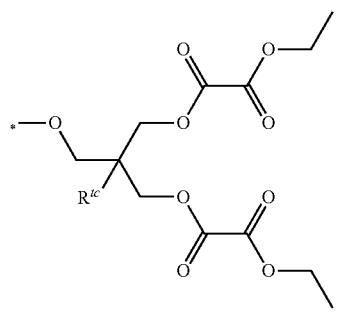
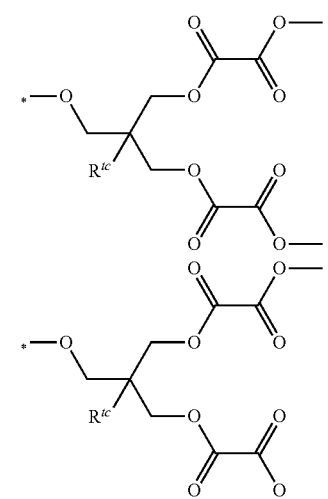
-continued
[Chem. 24]
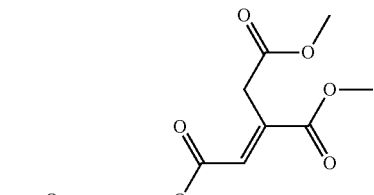
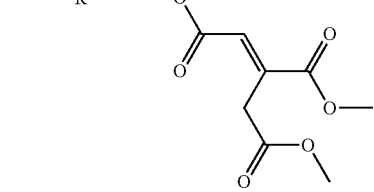
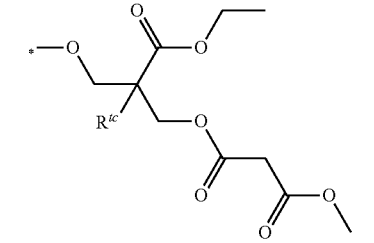
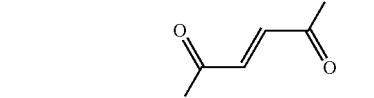
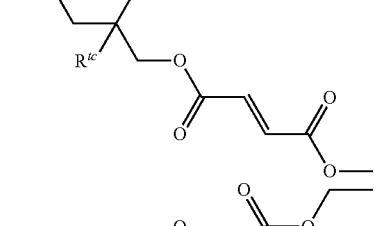
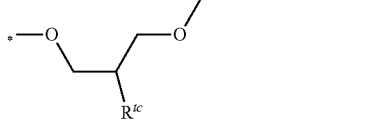
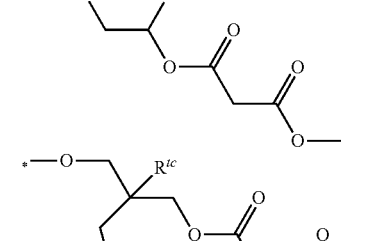

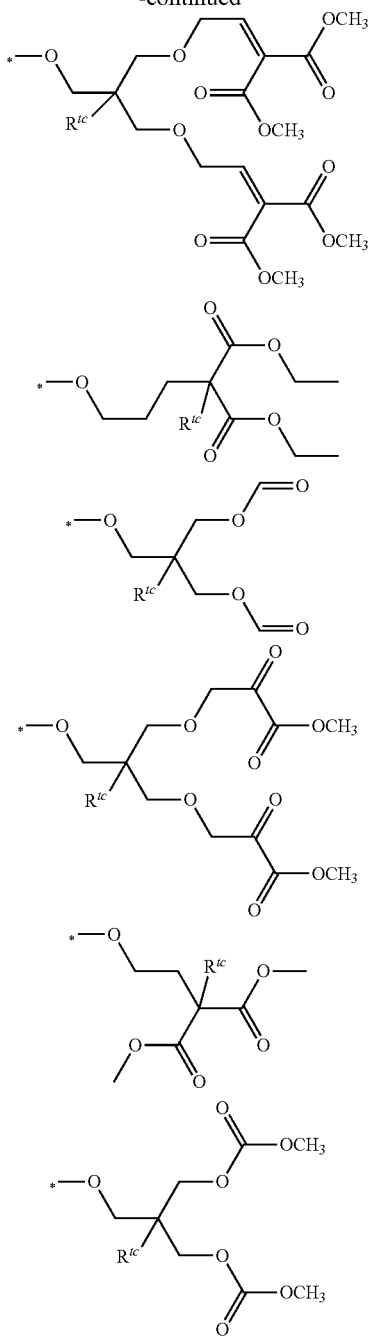

[Chem. 25]

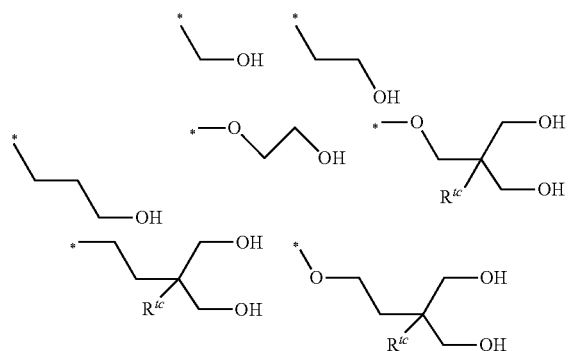

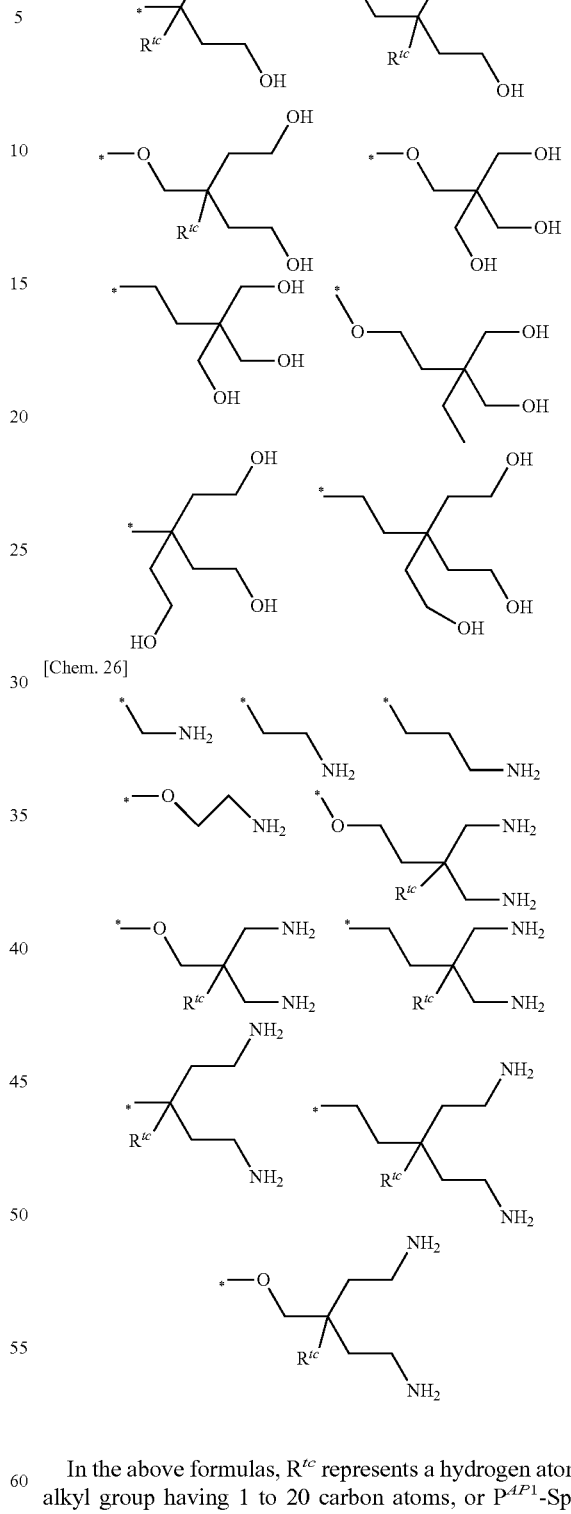

[Chem. 26]

In the above formulas, $R^{tc}$ represents a hydrogen atom, an alkyl group having 1 to 20 carbon atoms, or $P^{AP1}$-$Sp^{AP1}$-. Any hydrogen atom in the alkyl group may be replaced with —OH, —CN, -$Sp^{AT1}$-$W^{AT1}$—$Z^{AT1}$, or $P^{AP1}$-$Sp^{AP1}$-, and any —CH$_2$— group in the alkyl group may be replaced with a cyclic group, —O—, —COO—, —C(=O)—, —OCO—, or —CH=CH— in such a manner that oxygen atoms are not directly adjacent to each other.

Any hydrogen atom in each molecule may be replaced with $P^{AP1}$-$Sp^{AP1}$-.

Each * represents a bond.

It is preferable that, in the alignment aid, each polar component included in each adsorptive group and each polar component included in each polymerizable group are localized. Each adsorptive group has a structure that is important for aligning the liquid crystal molecules vertically. When an adsorptive group is adjacent to a polymerizable group, better alignability is obtained, and good solubility in the liquid crystal composition is obtained.

In one specific preferred form of the alignment aid, a polymerizable group and an adsorptive group are present on the same ring in the mesogenic group. Examples of such a form include a form in which one or more polymerizable groups and one or more adsorptive groups are bonded to the same ring and a form in which at least one of one or more polymerizable groups is bonded to at least one of one or more adsorptive groups such that the at least one polymerizable group and the at least one adsorptive group are present on the same ring.

In these cases, any hydrogen atom in a spacer group in each polymerizable group may be replaced with an adsorptive group, and any hydrogen atom in each adsorptive group may be replaced with a polymerizable group through a spacer group.

The alignment aid is preferably a compound represented by the following general formula (SAL).

[Chem. 28]

[Chem. 27]

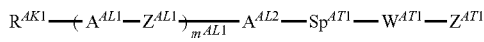

(SAL)

In the above formula, any hydrogen atom bonded to a carbon atom may be replaced with a linear or branched alkyl group having 1 to 25 carbon atoms, —OH, —CN, -$Sp^{AT1}$-$W^{AT1}$—$Z^{AT1}$, or $P^{AP1}$-$Sp^{AP1}$-. Any hydrogen atom in the alkyl group may be replaced with —OH, —CN, -$Sp^{AT1}$-$W^{AT1}$—$Z^{AT1}$, or $P^{AP1}$-$Sp^{AP1}$-, and any —$CH_2$— group in the alkyl group may be replaced with a cyclic group, —O—, —COO—, —C(=O)—, —OCO—, or —CH=CH— in such a manner that oxygen atoms are not linked directly to one another.

$R^{AK1}$ has the same meaning as $R^{AK1}$ in general formula (AK).

$A^{AL1}$ and AA each independently have the same meaning as $A^{AL1}$ or $A^{AL2}$ in general formula (AL).

$Z^{AL1}$ has the same meaning as $Z^{AL1}$ in general formula (AL).

$m^{AL1}$ has the same meaning as $m^{AL1}$ in general formula (AL).

$Sp^{AT1}$ has the same meaning as $Sp^{AT1}$ in general formula (AT).

$W^{AT1}$ has the same meaning as $W^{AT1}$ in general formula (AT).

$Z^{AT1}$ has the same meaning as $Z^{AT1}$ in general formula (AT).

The compound represented by general formula (SAL) is preferably a compound represented by any of the following formulas (SAL-1.1) to (SAL-2.9).

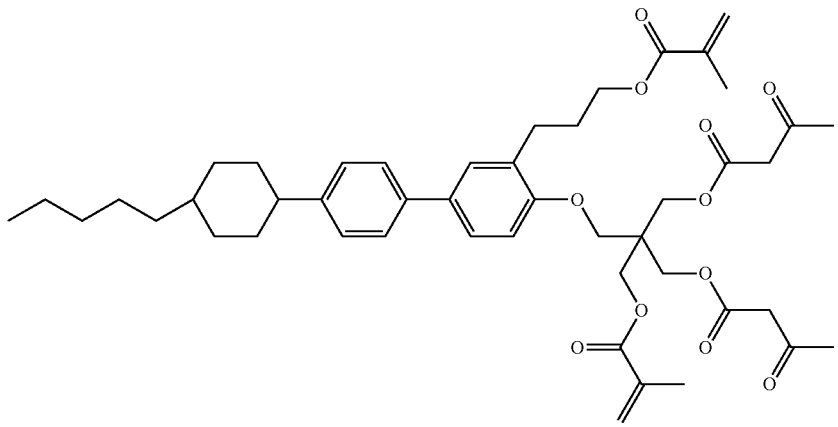

(SAL-1.1)

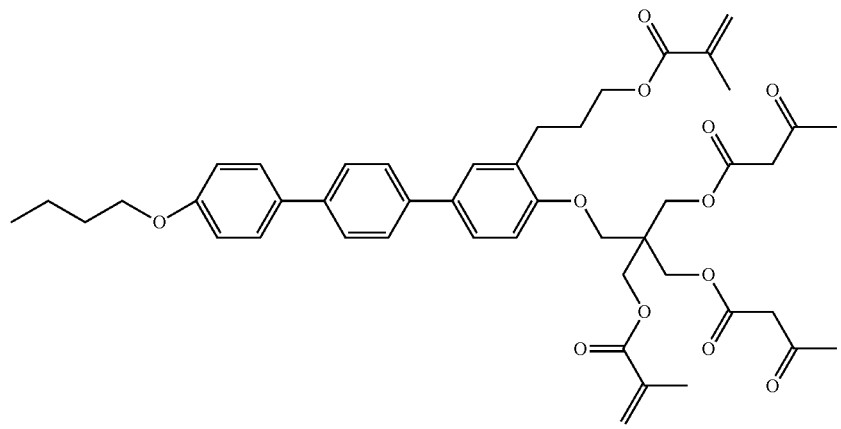
(SAL-1.2)
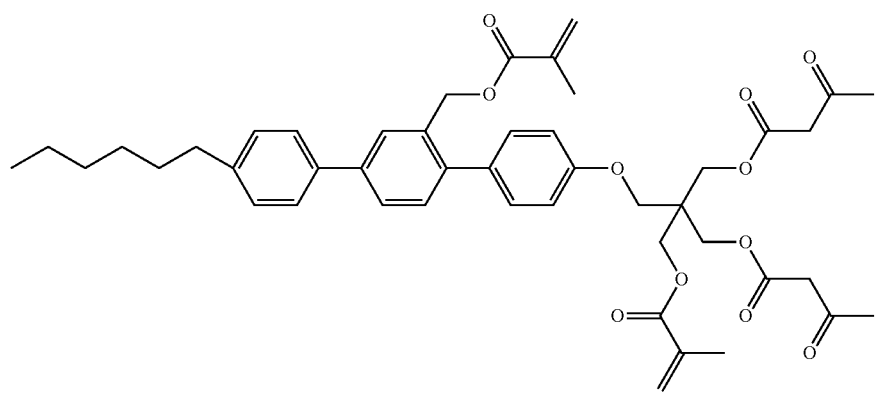
(SAL-1.3)
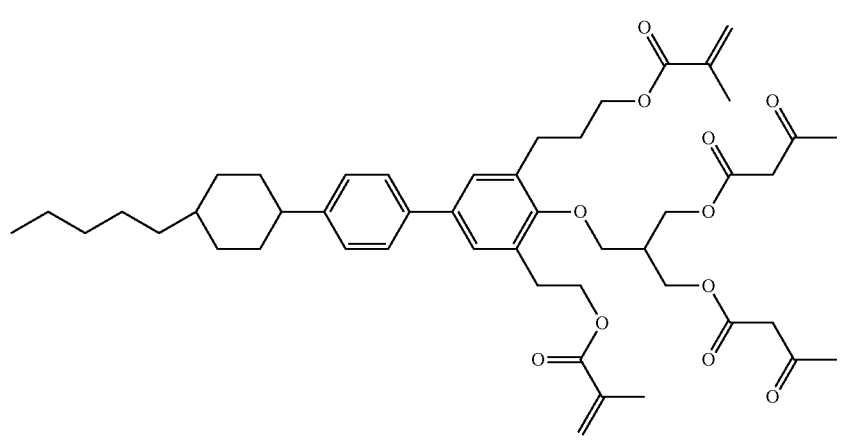
(SAL-1.4)

[Chem. 29]
(SAL-1.5)
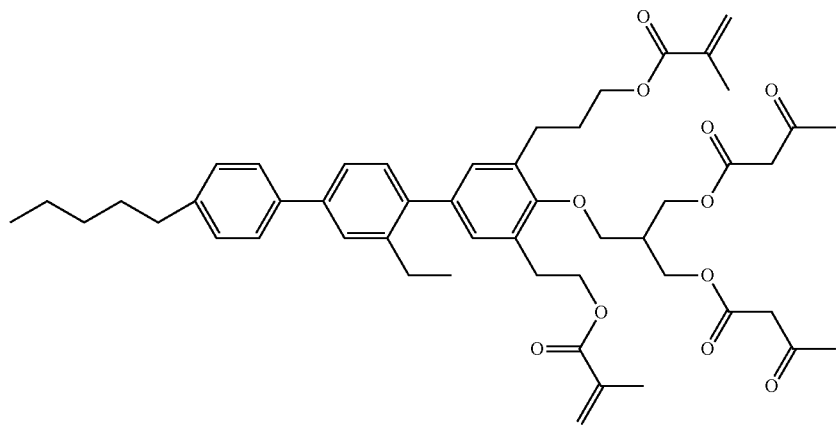
(SAL-1.6)
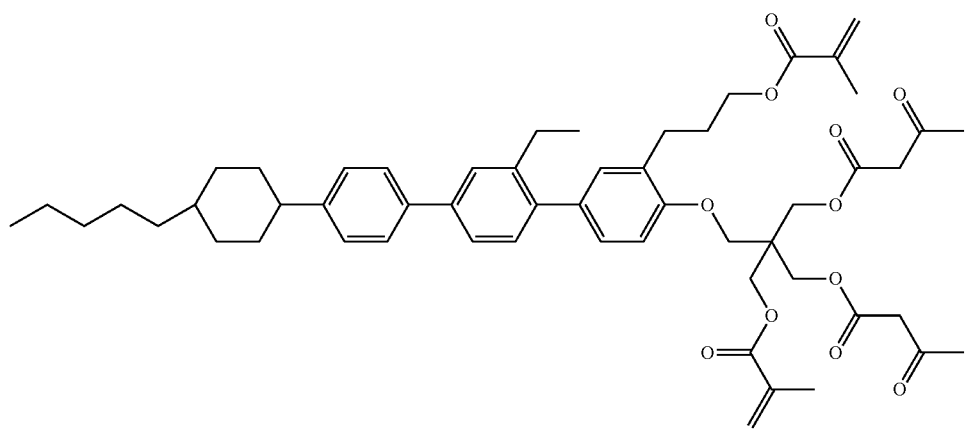
(SAL-1.7)
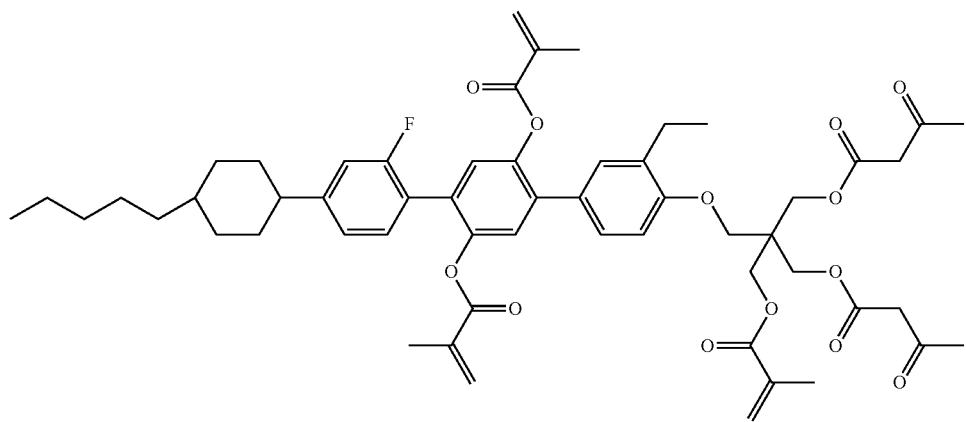

-continued
(SAL-1.8)
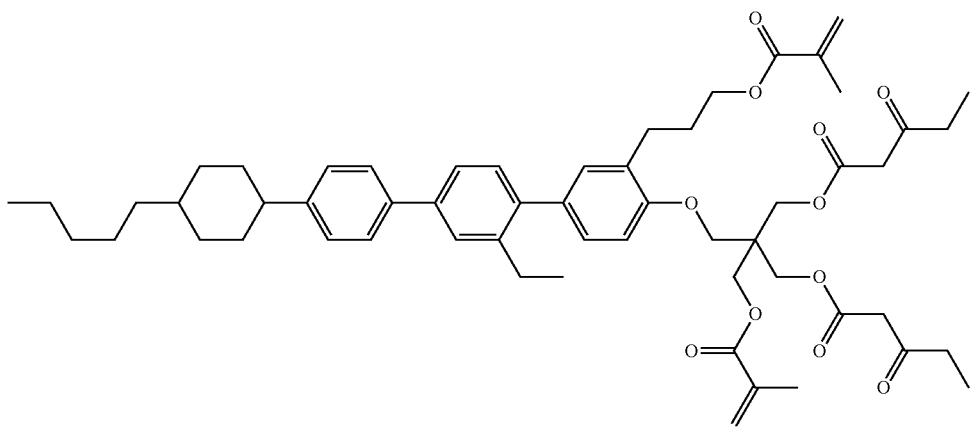
[Chem. 30]
(SAL-1.10)
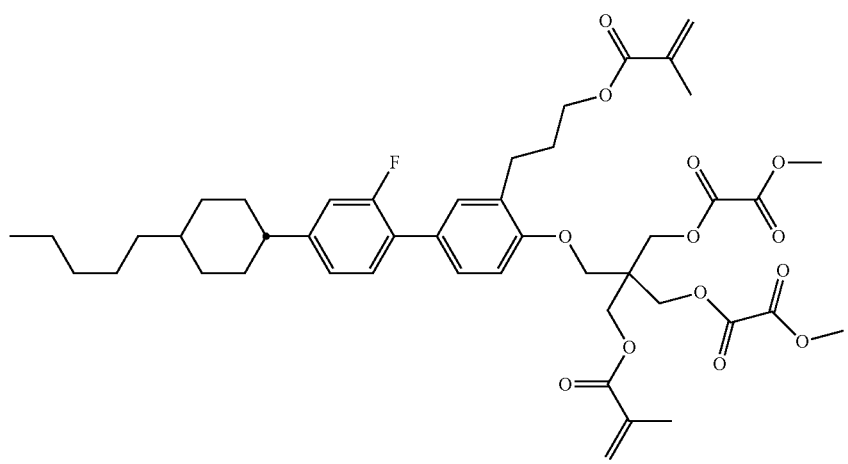
(SAL-1.11)
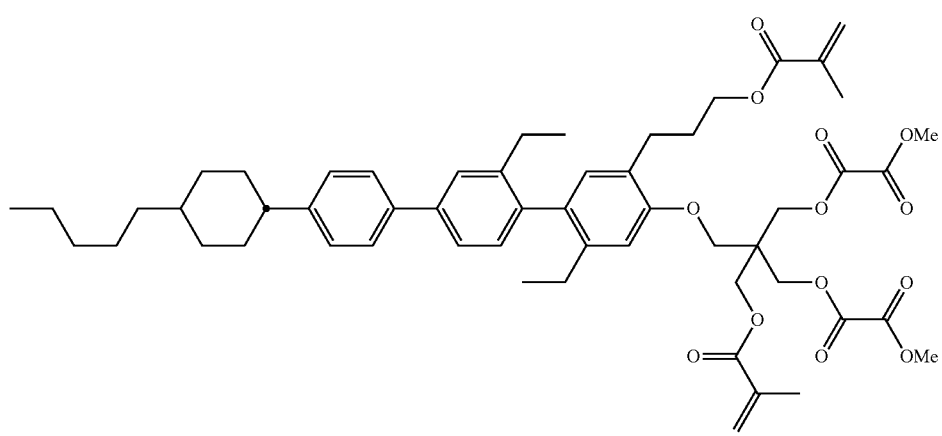

-continued
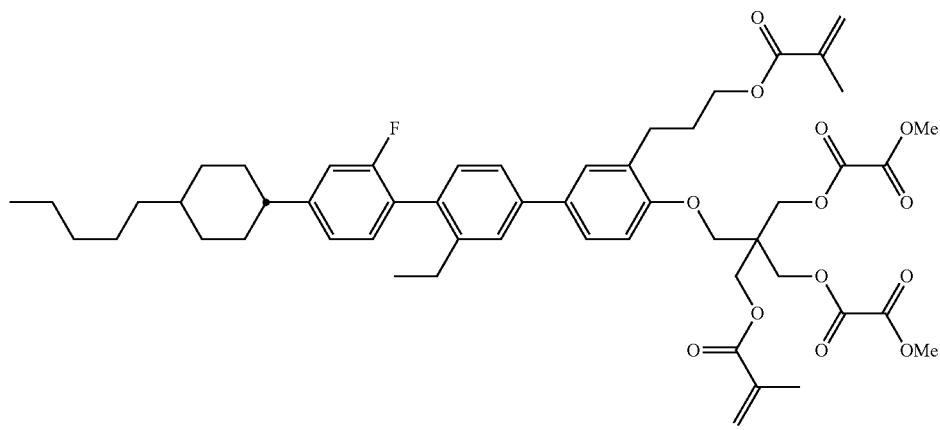
(SAL-1.12)
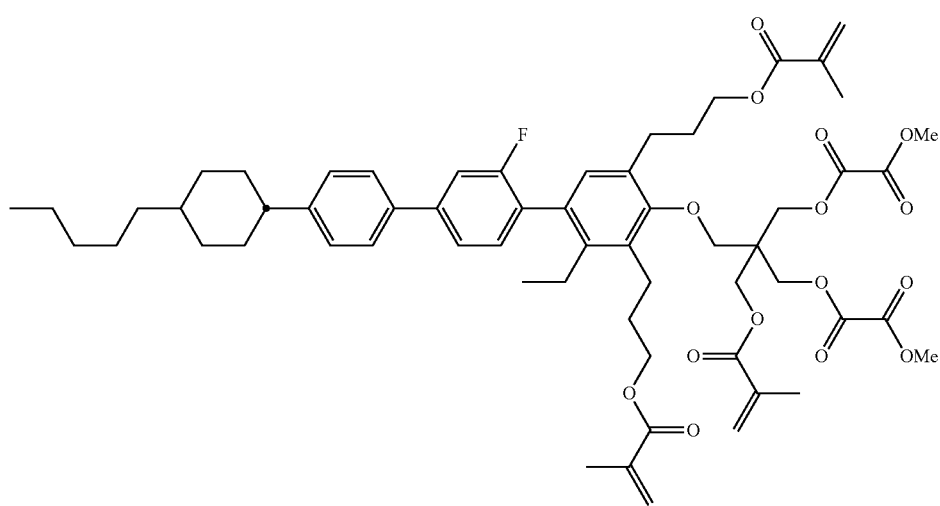
(SAL-1.13)
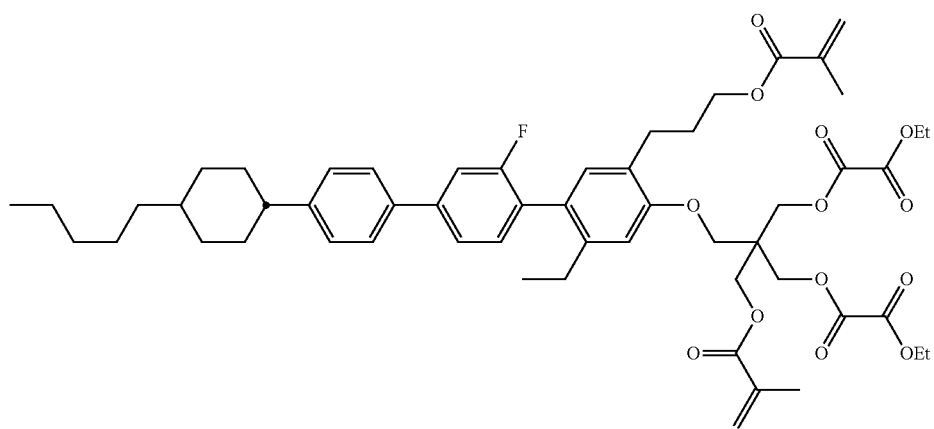
(SAL-1.14)

[Chem. 31]
-continued
(SAL-1.15)
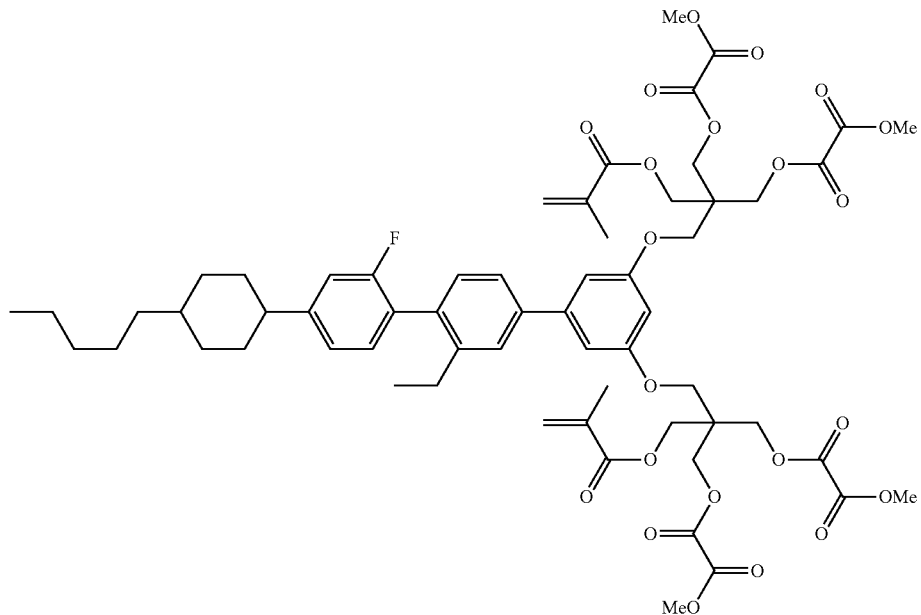
(SAL-1.16)
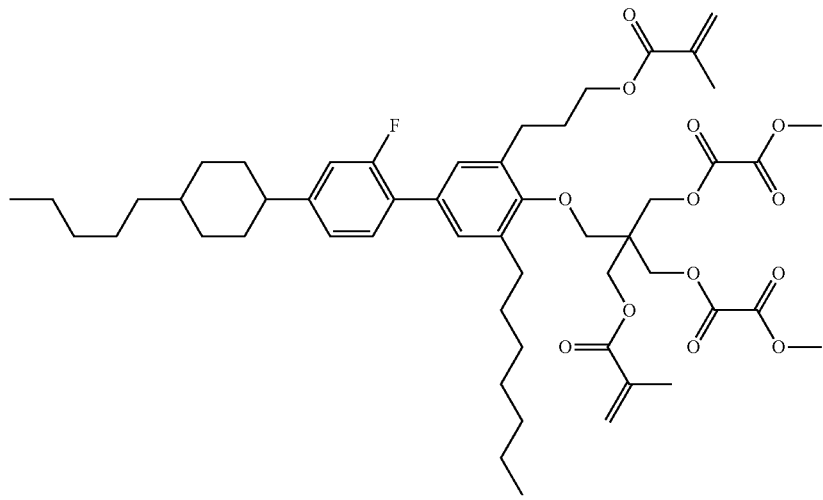
(SAL-1.17)
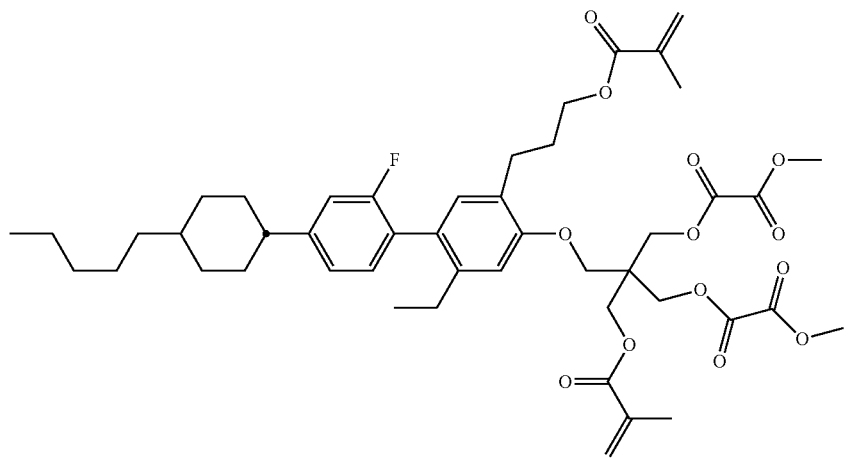

(SAL-1.18)
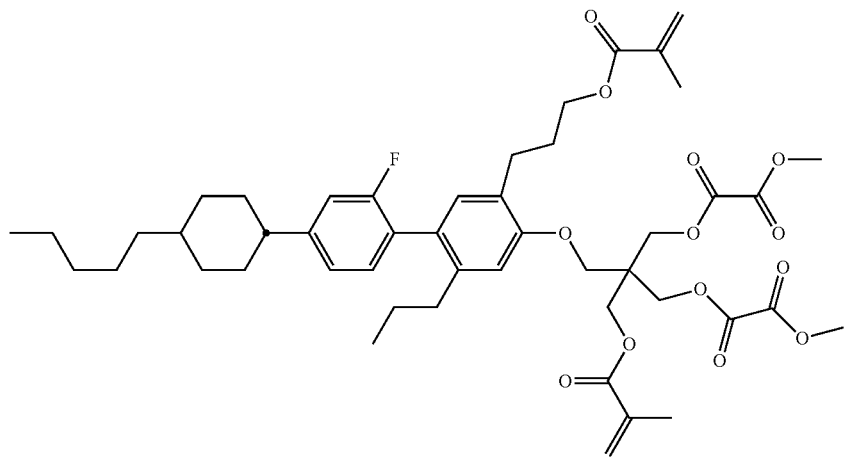
[Chem. 32]
(SAL-1.19)
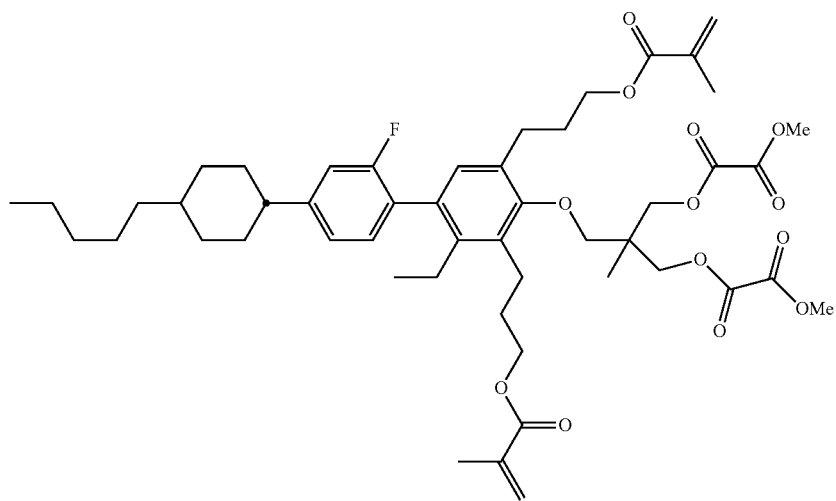
(SAL-1.20)
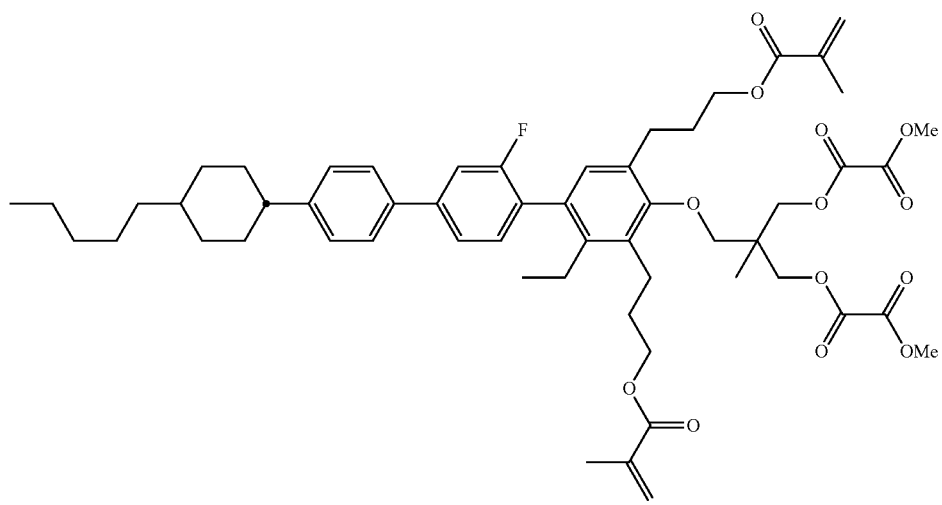

-continued
(SAL-1.21)
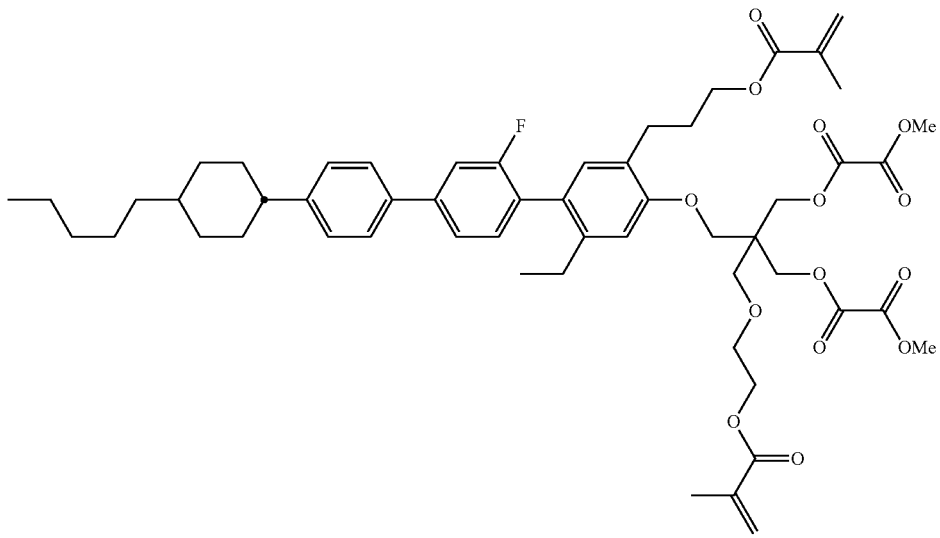
[Chem. 33]
(SAL-1.30)
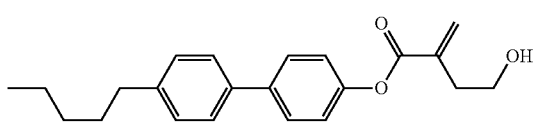
(SAL-1.31)
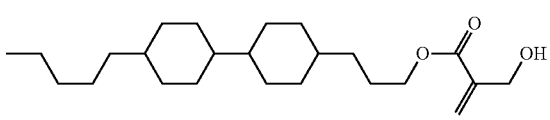
(SAL-1.32)
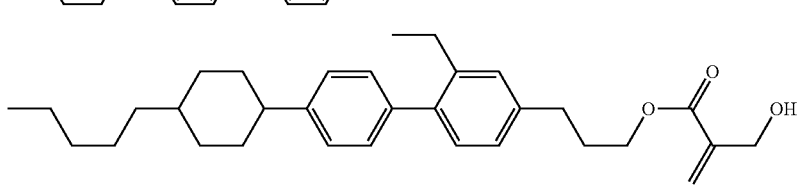
(SAL-1.33)
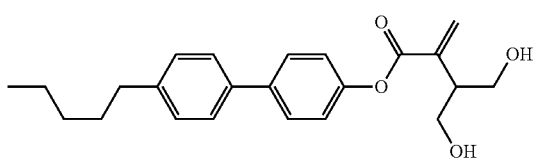
(SAL-1.34)
(SAL-1.35)
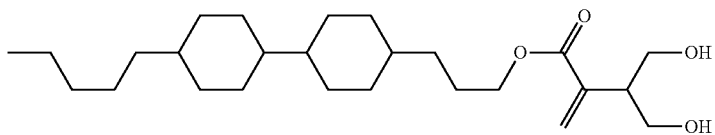
(SAL-1.36)
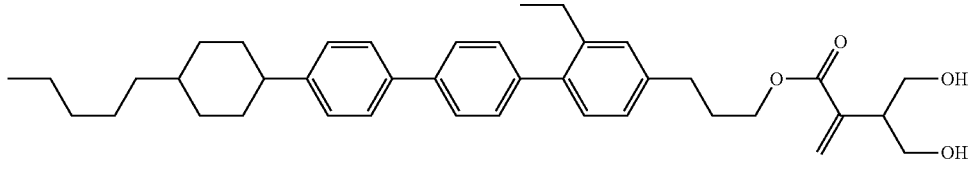
(SAL-1.37)
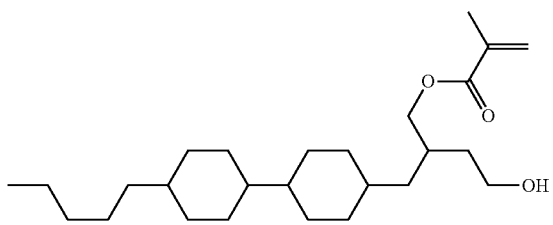
(SAL-1.38)
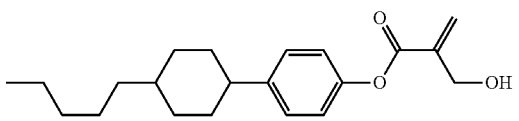

(SAL-1.39)
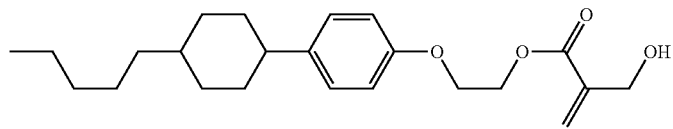
[Chem. 34]
(SAL-1.40)
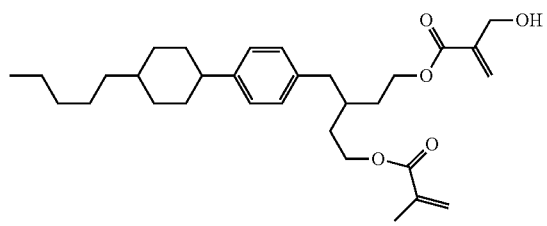
(SAL-1.41)
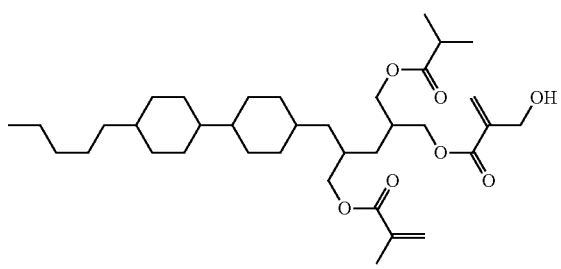
(SAL-1.42)
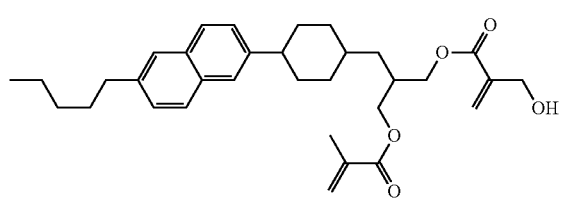
(SAL-1.43)
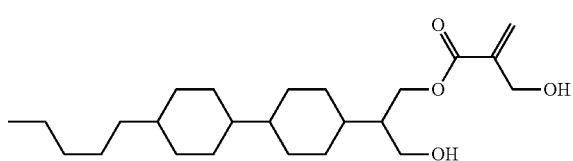
(SAL-1.44)
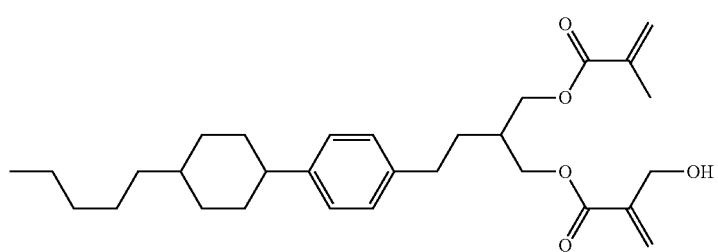
(SAL-1.45)
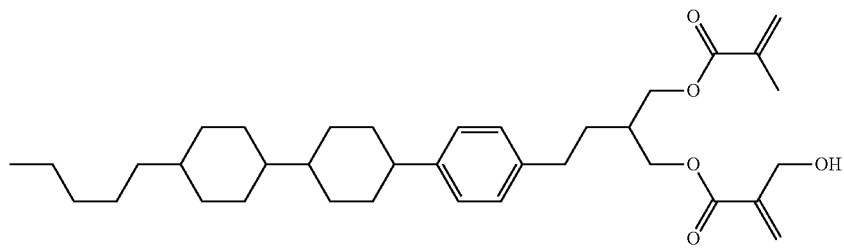
(SAL-1.46)
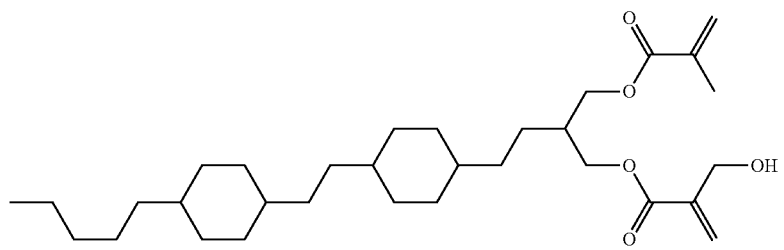

-continued
[Chem. 35]
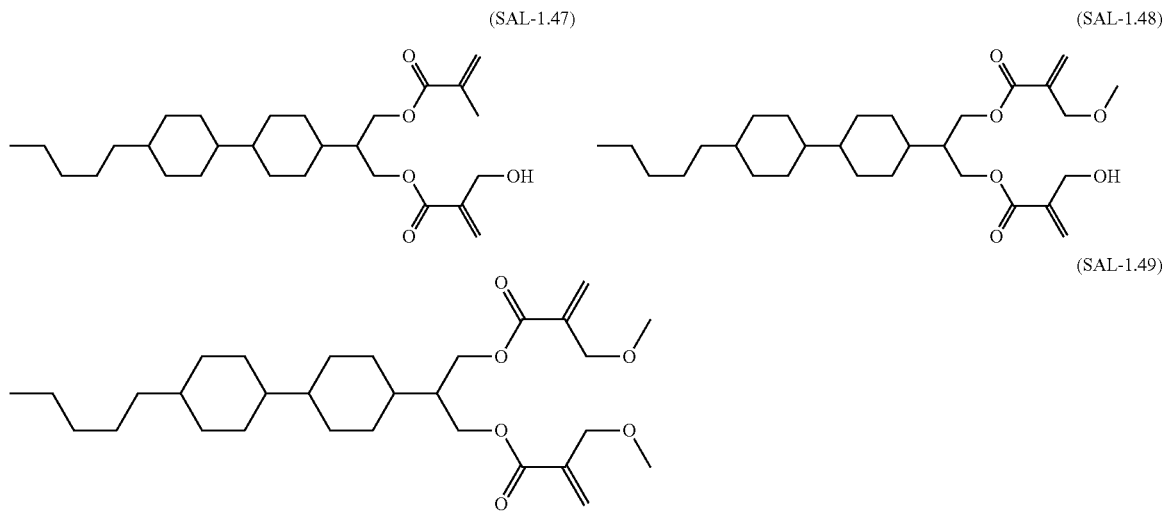
[Chem. 36]
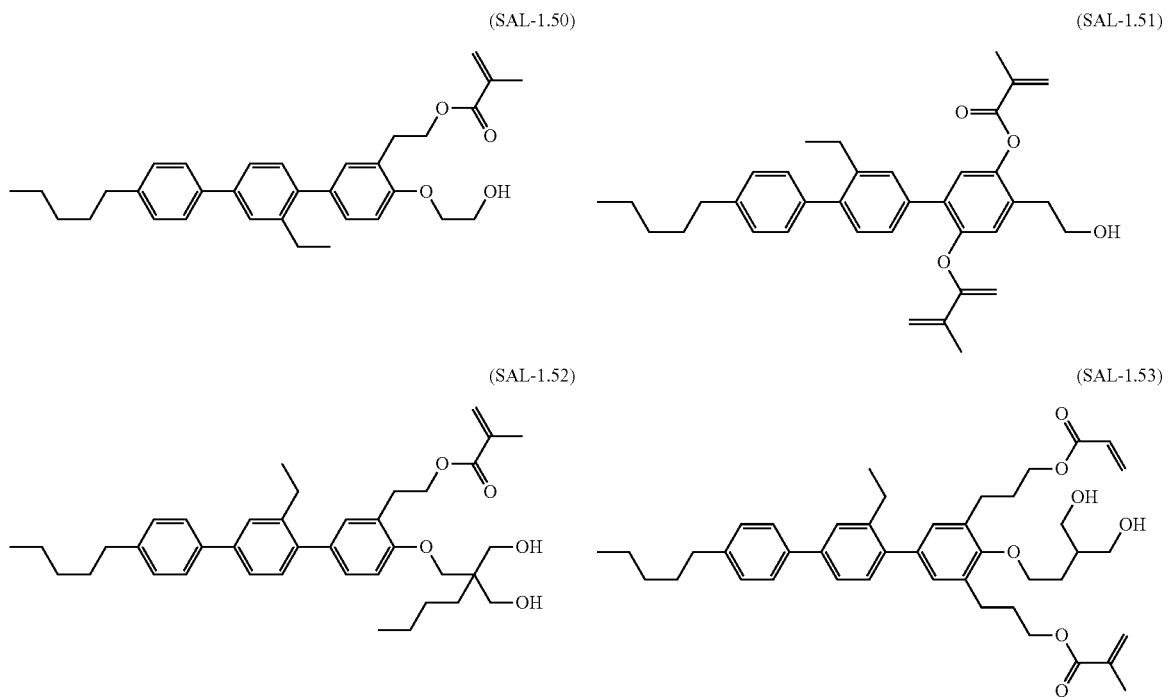
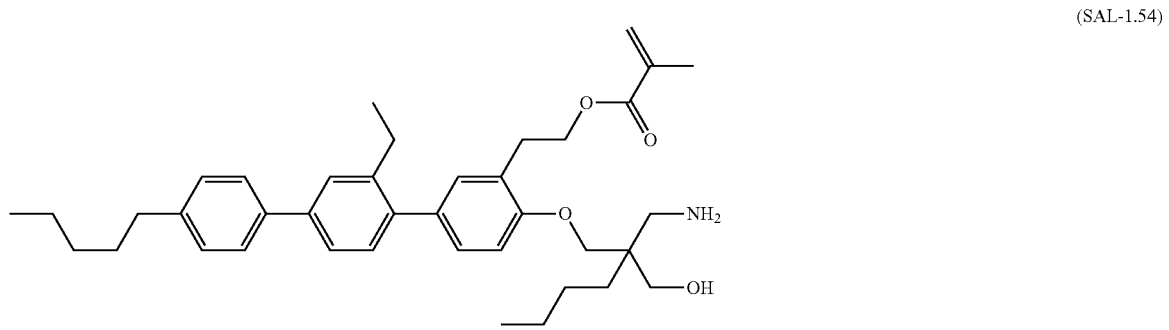

-continued
[Chem. 37]
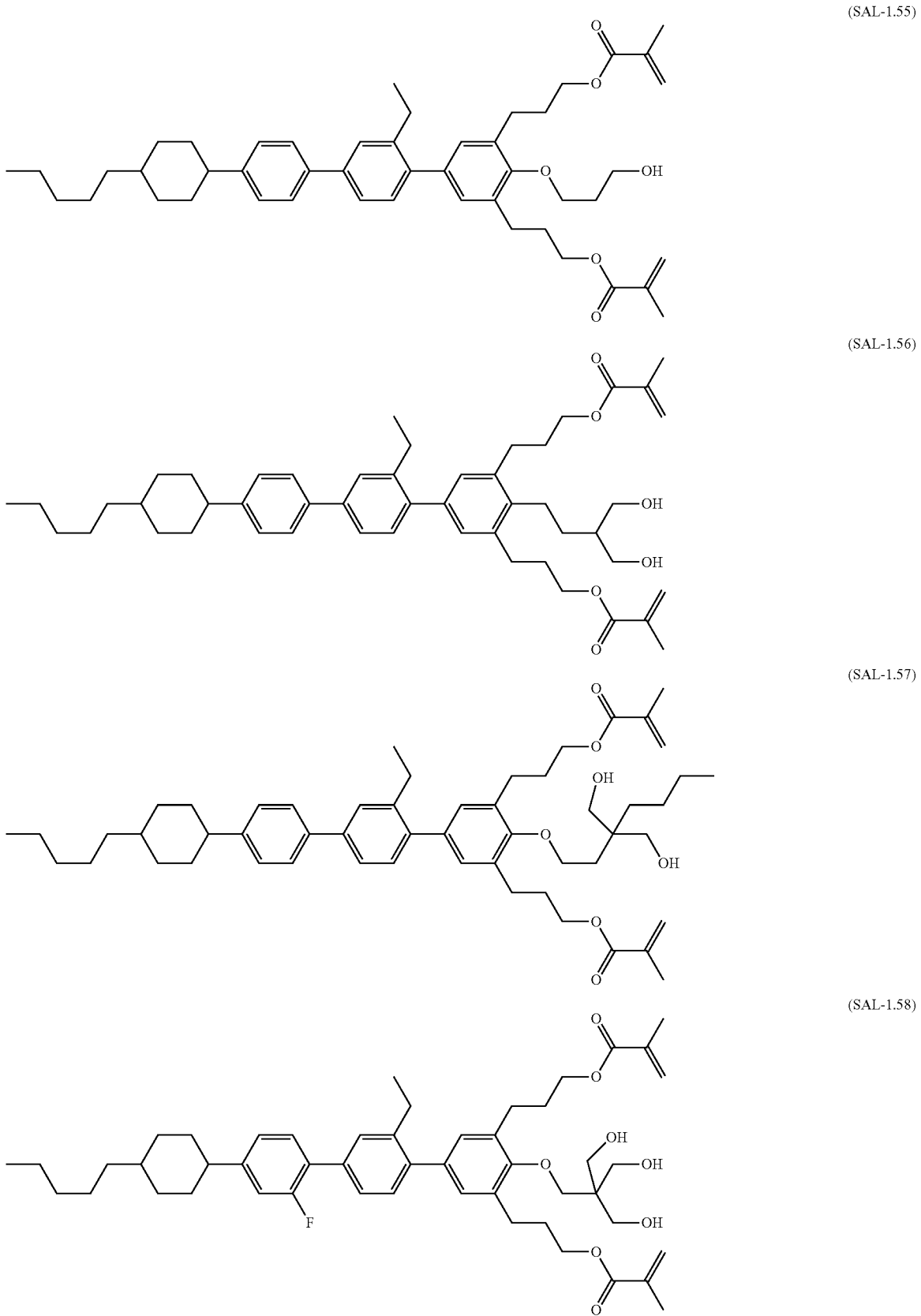

(SAL-1.59)
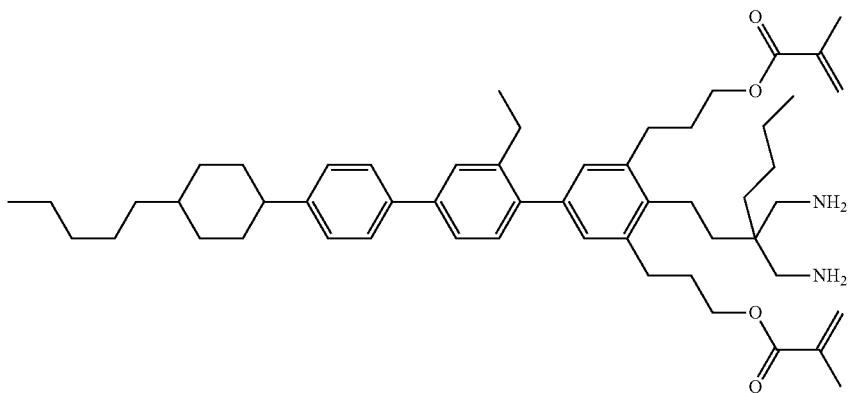
[Chem. 38]
(SAL-2.1)
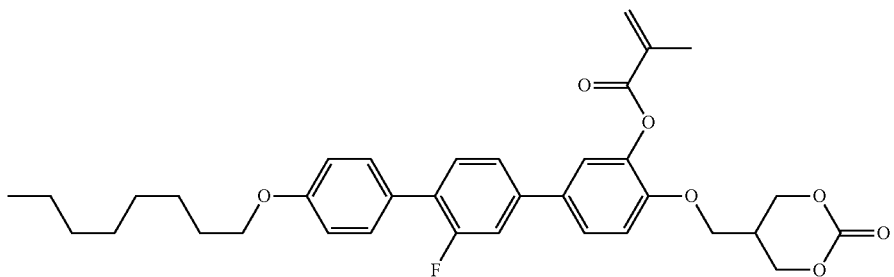
(SAL-2.2)
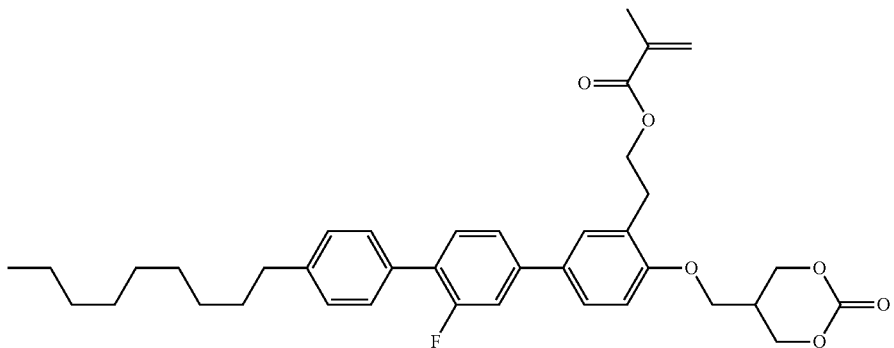
(SAL-2.3)
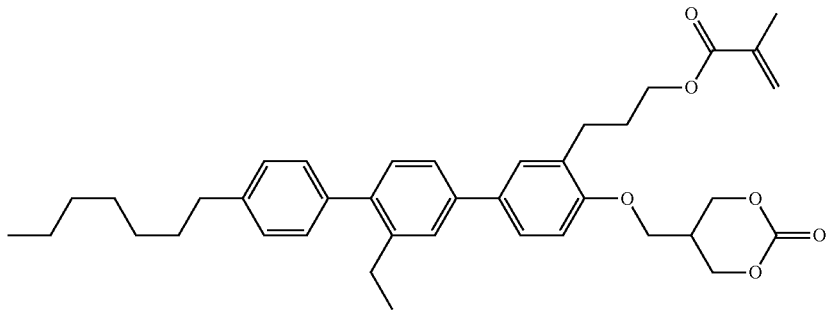

-continued
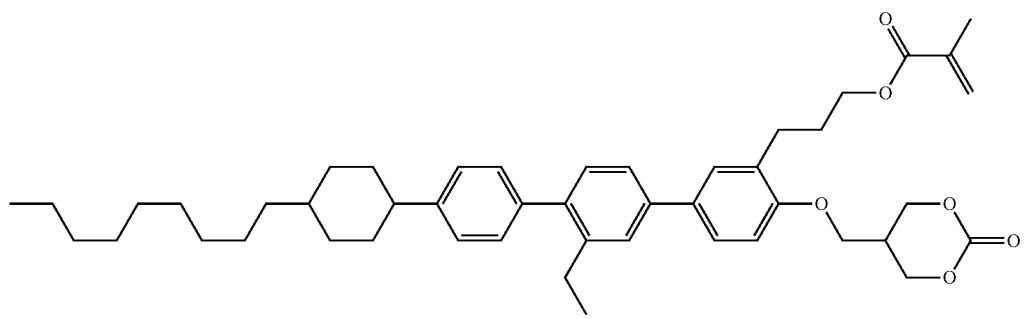
(SAL-2.4)
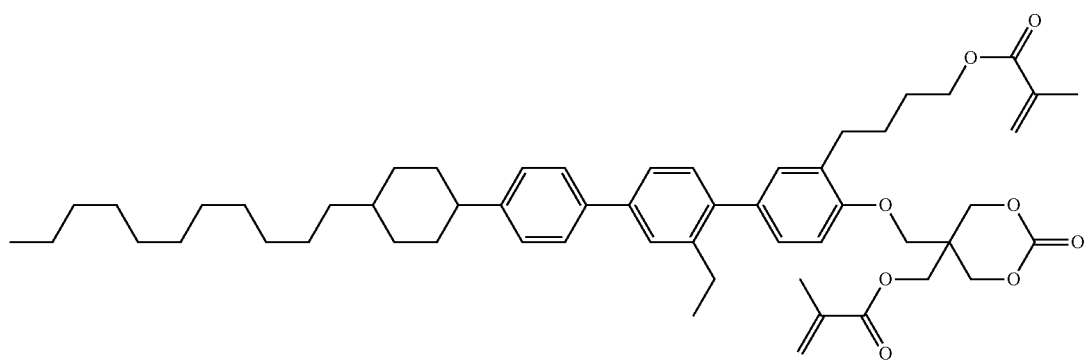
(SAL-2.5)
[Chem. 39]
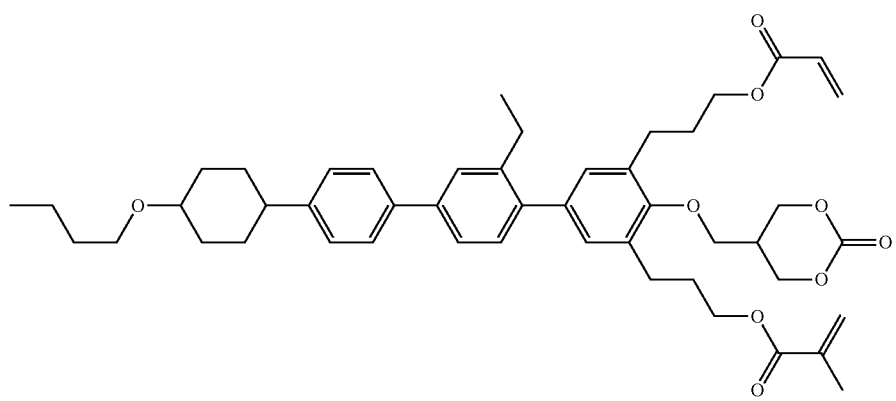
(SAL-2.6)
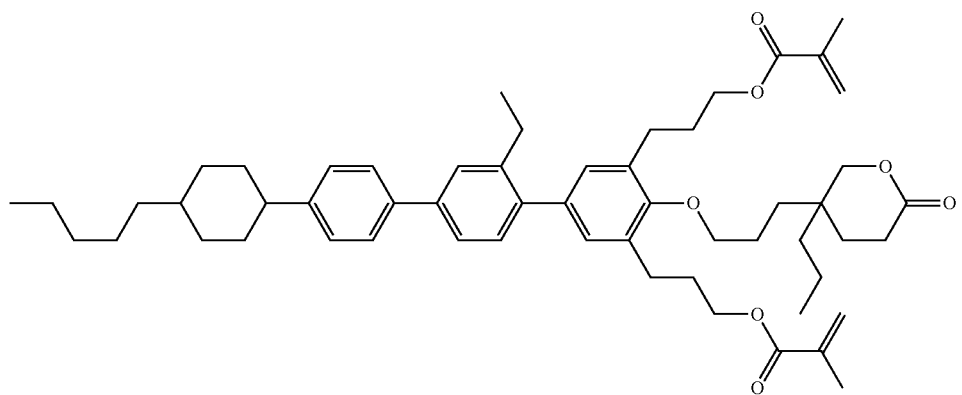
(SAL-2.7)

-continued (SAL-2.8)

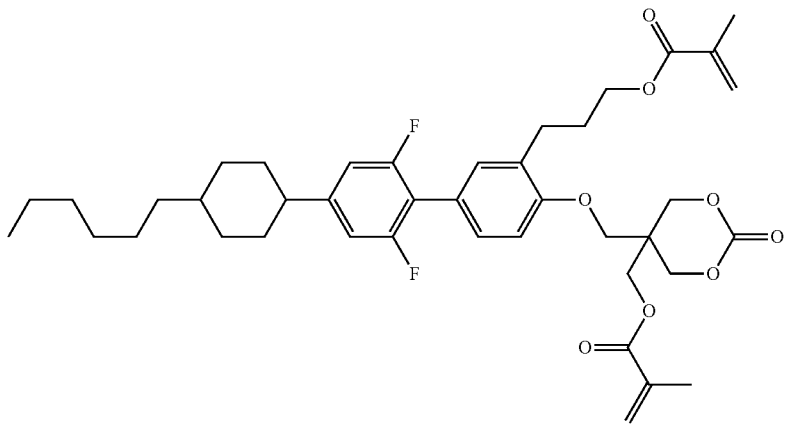

(SAL-2.9)

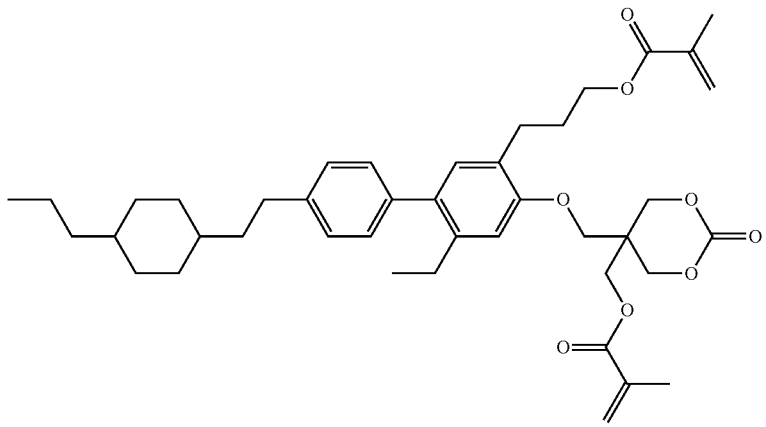

The amount of the alignment aid contained in the liquid crystal composition is preferably about 0.01 to about 50% by mass. The lower limit of the amount of the alignment aid is more preferably 0.05% by mass or 0.1% by mass in terms of aligning the liquid crystal molecules more preferably. In terms of improving response characteristics, the upper limit is more preferably 30% by mass, 10% by mass, 7% by mass, 5% by mass, 4% by mass, or 3% by mass.

((Liquid Crystal Molecules))

Preferably, the liquid crystal molecules contain at least one of compounds represented by the following general formulas (N-1) to (N-3).

[Chem. 40]

(N-1)

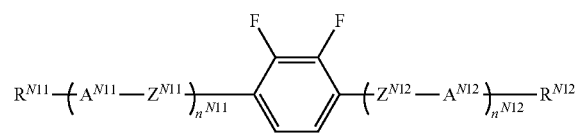

(N-2)

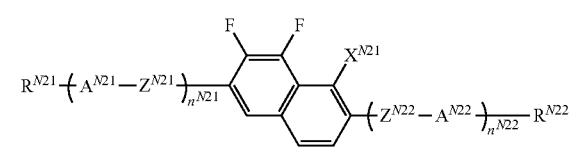

-continued (N-3)

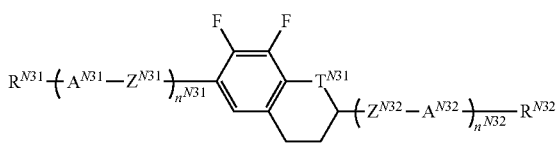

In the above formulas, $R^{N11}$, $R^{N12}$, $R^{N21}$, $R^{N22}$, $R^{N31}$, and $R^{N32}$ each independently represent an alkyl group having 1 to 8 carbon atoms. Any one —$CH_2$— group or two or more non-adjacent —$CH_2$— groups in the alkyl group may each be replaced with —CH=CH—, —C≡C—, —O—, —CO—, —COO—, or —OCO—.

$A^{N11}$, $A^{N12}$, $A^{N21}$, $A^{N22}$, $A^{N31}$, and $A^{N32}$ each independently represent a group selected from the group consisting of (a) a 1,4-cyclohexylene group (any one —$CH_2$— group or two or more non-adjacent —$CH_2$— groups present in this group may each be replaced with —O—), (b) a 1,4-phenylene group (any one —CH= group or two or more non-adjacent —CH= groups present in this group may each be replaced with —N=), (c) a naphthalene-2,6-diyl group, a 1,2,3,4-tetrahydronaphthalene-2,6-diyl group, or a decahydronaphthalene-2,6-diyl group (any one —CH= group or two or more non-adjacent —CH= groups present in these groups may each be replaced with —N=), and (d) a 1,4-cyclohexenylene group. The group (a), the group (b), the group (c), and the group (d) may be each independently substituted with a cyano group, a fluorine atom, or a chlorine atom.

$Z^{N11}$, $Z^{N12}$, $Z^{N21}$, $Z^{N22}$, $Z^{N31}$, and $Z^{N32}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—.

$X^{N21}$ represents a hydrogen atom or a fluorine atom.

$T^{N31}$ represents —CH$_2$— or an oxygen atom.

$n^{N11}$, $n^{N12}$, $n^{N21}$, $n^{N22}$, $n^{N31}$, and $n^{N32}$ each independently represent an integer of 0 to 3, and $n^{N11}+n^{N12}$, $n^{N21}+n^{N22}$, and $n^{N31}+n^{N32}$ are each independently 1, 2, or 3.

When $n^{N11}$, $n^{N12}$, $n^{N21}$, $n^{N22}$, $n^{N31}$, and $n^{N32}$ are each 2 or more, $A^{N31}$s to $A^{N32}$s and $Z^{N11}$s to $Z^{N32}$s may be the same or different.

Preferably, the compound represented by any of the above general formulas (N-1) to (N-3) has a negative dielectric anisotropy (Δε), and the absolute value of the dielectric anisotropy is more than 3.

$R^{N1}$ to $R^{N32}$ are each independently preferably an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, still more preferably an alkyl group having 1 to 5 carbon atoms or an alkenyl group having 2 to 5 carbon atoms, particularly preferably an alkyl group having 2 to 5 carbon atoms or an alkenyl group having 2 to 3 carbon atoms, and most preferably an alkenyl group having 3 carbon atoms (i.e., a propenyl group).

When ring structures to which these groups are bonded are each a benzene ring (aromatic ring), $R^{N11}$ to $R^{N32}$ are each independently preferably a linear alkyl group having 1 to 5 carbon atoms, a linear alkoxy group having 1 to 4 carbon atoms, or an alkenyl group having 4 to 5 carbon atoms. When the ring structures to which these groups are bonded are each a saturated ring structure such as a cyclohexane ring, a pyran ring, or a dioxane ring, $R^{N11}$ to $R^{N32}$ are each independently preferably a linear alkyl group having 1 to 5 carbon atoms, a linear alkoxy group having 1 to 4 carbon atoms, or a linear alkenyl group having 2 to 5 carbon atoms.

To stabilize the nematic phase, it is preferable that $R^{N11}$ to $R^{N32}$ are each independently a group in which the total number of carbon atoms and oxygen atoms (if present) is 5 or less, and it is also preferable that $R^{N11}$ to $R^{N32}$ are each linear.

The alkenyl group is preferably a group selected from the group consisting of groups represented by the following formulas (R1) to (R5).

[Chem. 41]

(R1)

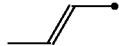
(R2)

(R3)

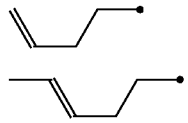
(R4)

(R5)

In each of the above formulas, each solid circle represents a bond.

To increase the refractive index anisotropy (Δn) of the liquid crystal molecules, $A^{N11}$ to $A^{N32}$ are each independently preferably an aromatic group. To improve the response speed of the liquid crystal molecules, $A^{N11}$ to $A^{N32}$ are each independently preferably an aliphatic group.

The aromatic group and the aliphatic group are each preferably a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably any of structures represented by Chem. 42 below, and still more preferably a trans-1,4-cyclohexylene group, a 1,4-cyclohexenylene group, or a 1,4-phenylene group.

[Chem. 42]

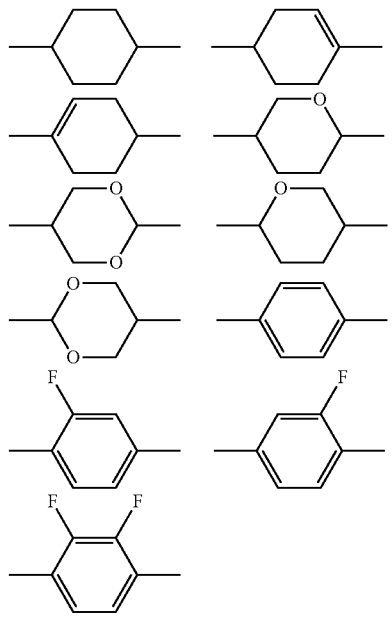

$Z^{N11}$ to $Z^{N32}$ are each independently preferably —CH$_2$O—, —CF$_2$O—, —CH$_2$CH$_2$—, —CF$_2$CF$_2$—, or a single bond, more preferably —CH$_2$O—, —CH$_2$CH$_2$—, or a single bond, and particularly preferably —CH$_2$O— or a single bond.

$X^{N21}$ is preferably a fluorine atom.

$T^{N31}$ is preferably an oxygen atom.

$n^{N11}+n^{N12}$, $n^{N21}+n^{N22}$, and $n^{N31}+n^{N32}$ are each independently preferably 1 or 2, and a combination of $n^{N11}=1$ and $n^{N12}=0$, a combination of $n^{N11}=2$ and $n^{N12}=0$, a combination of $n^{N11}=1$ and $n^{N12}=1$, a combination of $n^{N11}=2$ and $n^{N12}=1$, a combination of $n^{N21}=1$ and $n^{N22}=0$, a combination of $n^{N21}=2$ and $n^{N22}=0$, a combination of $n^{N31}=1$ and $n^{N32}=0$, and a combination of $n^{N31}=2$ and $n^{N32}=0$ are more preferred.

The amount of each of the compounds represented by general formula (N-1) to (N-3) and contained in the liquid crystal composition is preferably as follows. Specifically, the lower limit of the amount is preferably 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of the amount is preferably 95% by mass, 85% by mass, 75% by mass, 65% by mass, 55% by mass, 45% by mass, 35% by mass, 25% by mass, or 20% by mass.

To increase the response speed of the liquid crystal composition while its viscosity (q) is kept low, it is preferable that the lower limit of the amount of each of the compounds represented by general formula (N-1) to (N-3) is low and the upper limit is also low. Moreover, to improve the temperature stability of the liquid crystal composition while the nematic phase-isotropic liquid phase transition temperature (Tni) is kept high, it is preferable that the lower limit of the amount is low and the upper limit is also low. To increase the dielectric anisotropy (As) of the liquid crystal composition in order to keep the driving voltage of the liquid crystal display device low, it is preferable that the lower limit of the amount is high and the upper limit is also high.

Examples of the compound represented by general formula (N-1) include compounds represented by the following general formulas (N-1a) to (N-1g).

[Chem. 43]

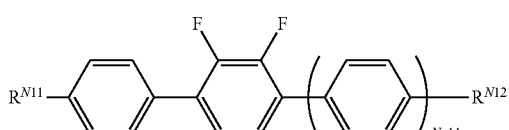
(N-1a)

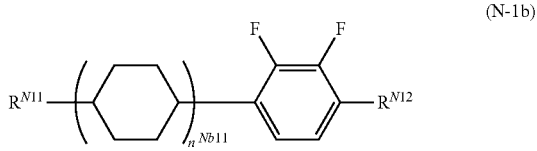
(N-1b)

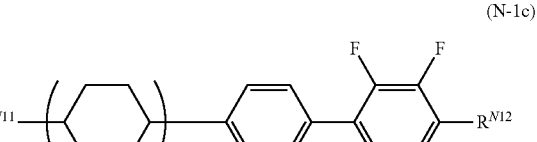
(N-1c)

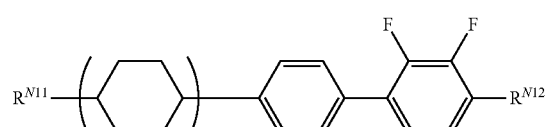
(N-1d)

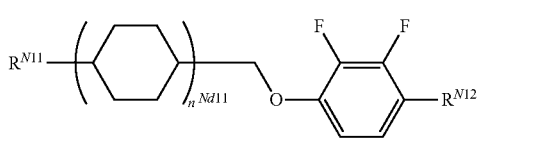
(N-1e)

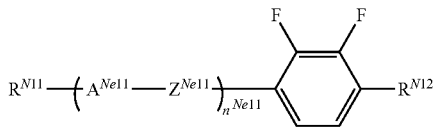

-continued

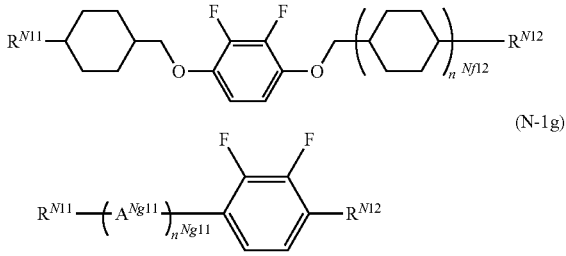
(N-1f)

(N-1g)

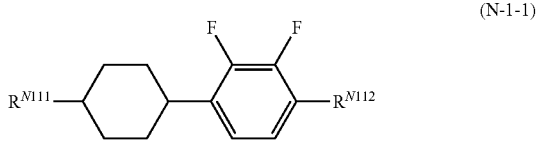

In the above formulas, $R^{N11}$ and $R^{N12}$ have the same meanings as $R^{N11}$ and $R^{N12}$, respectively, in general formula (N-1).

$n^{Na11}$, $n^{Nb11}$, $n^{Nc11}$, and $n^{Nd11}$ each independently represent 0 to 2.

$n^{Ne11}$, $n^{Nf11}$, and $n^{Ng11}$ each independently represent 1 or 2.

$A^{Ne11}$ represents a trans-1,4-cyclohexylene group or a 1,4-phenylene group.

$A^{Ng11}$ represents a trans-1,4-cyclohexylene group, a 1,4-cyclohexenylene group, or a 1,4-phenylene group, and at least one $A^{Ng11}$ is a 1,4-cyclohexenylene group.

$Z^{Ne11}$ represents a single bond or an ethylene group, and at least one $Z^{Ne11}$ is an ethylene group.

In general formulas (N-1a) to (N-1g) above, $n^{Na11}$ represents preferably 0 or 1. $n^{Nb11}$ represents preferably 1 or 2. $n^{Nc11}$ represents preferably 0 or 1. $n^{Nd11}$ represents preferably 1 or 2. $n^{Ne11}$ represents preferably 1 or 2. $n^{Nf12}$ represents preferably 1 or 2. $n^{Ng11}$ represents preferably 1 or 2. In general formulas (N-1e) and (N-1g) above, a plurality of $A^{Ne11}$s, a plurality of $Z^{Ne11}$s, and/or a plurality of $A^{Ng11}$s present in the molecules may be the same or different.

More specifically, the compound represented by general formula (N-1) is preferably a compound represented by any of general formulas (N-1-1) to (N-1-5) below, general formulas (N-1-10) to (N-1-18) below, and general formulas (N-1-20) to (N-1-22) below.

The compound represented by general formula (N-1-1) is the following compound.

[Chem. 44]

(N-1-1)

In the above formula, $R^{N111}$ and $R^{N112}$ have the same meanings as $R^{N11}$ and $R^{N11}$, respectively, in general formula (N-1).

$R^{N111}$ is preferably an alkyl group having 1 to 5 carbon atoms or an alkenyl group having 2 to 5 carbon atoms and more preferably a propyl group, a pentyl group, or a vinyl group.

$R^{N112}$ is preferably an alkyl group having 1 to 5 carbon atoms, an alkenyl group having 4 to 5 carbon atoms, or an alkoxy group having 1 to 4 carbon atoms and more preferably an ethoxy group or a butoxy group.

One compound represented by general formula (N-1-1) may be used alone, or a combination of two or more compounds represented by general formula (N-1-1) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-1) and contained in the liquid crystal composition is preferably as follows. Specifically, the lower limit of the amount is preferably 5% by mass, 10% by mass, 13% by mass, 15% by mass, 17% by mass, 20% by mass, 23% by mass, 25% by mass, 27% by mass, 30% by mass, 33% by mass, or 35% by mass. The upper limit of the amount is preferably 50% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, 5% by mass, or 3% by mass.

When importance is placed on an improvement in Δε, it is preferable that the amount of the compound represented by general formula (N-1-1) is set to be high. When importance is placed on low temperature solubility, setting the amount of the compound to be higher is highly effective. When importance is placed on Tni, setting the amount of the compound to be lower is highly effective. To improve droplet marks and image-sticking characteristics, it is preferable to set the amount of the compound represented by general formula (N-1-1) within an intermediate range between the above ranges.

The compound represented by general formula (N-1-1) is preferably a compound represented by any of the following formulas (N-1-1.1) to (N-1-1.4), formulas (N-1-1.11) to (N-1-1.14) and (N-1-1.20) to (N-1-1.22), more preferably a compound represented by any of formulas (N-1-1.1) to (N-1-1.4), and still more preferably a compound represented by any of formulas (N-1-1.1) and (N-1-1.3).

[Chem. 45]

(N-1-1.1)

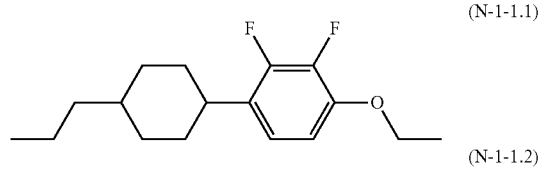

(N-1-1.2)

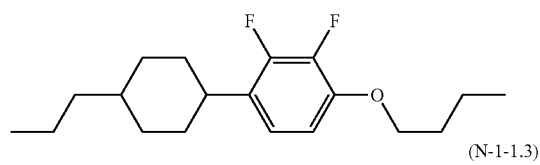

(N-1-1.3)

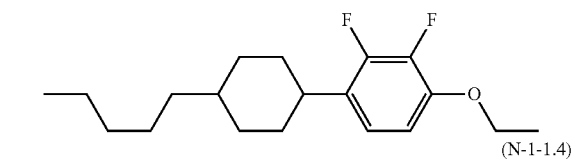

(N-1-1.4)

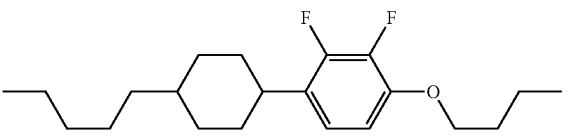

-continued (N-1-1.11)

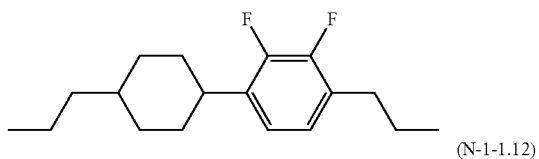

(N-1-1.12)

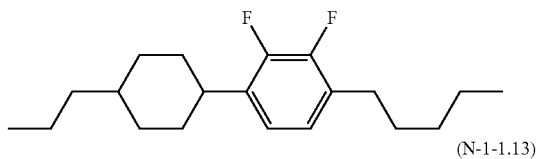

(N-1-1.13)

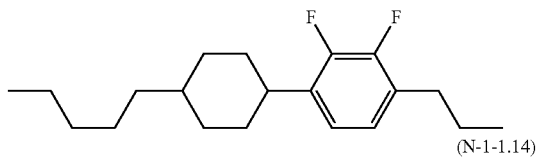

(N-1-1.14)

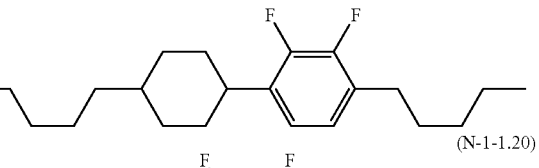

(N-1-1.20)

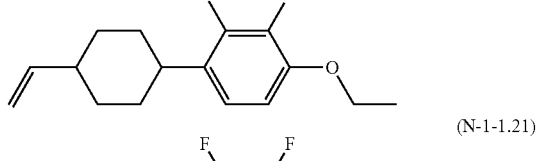

(N-1-1.21)

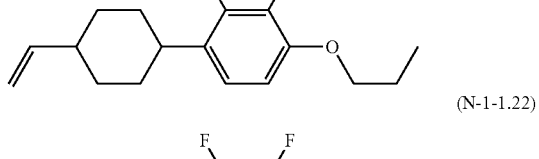

(N-1-1.22)

The compound represented by general formula (N-1-2) is the following compound.

[Chem. 46]

(N-1-2)

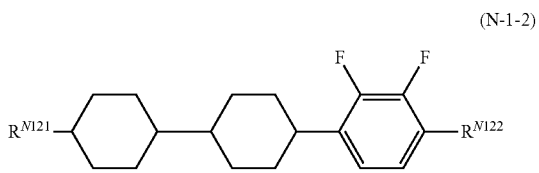

In the above formula, $R^{N121}$ and $R^{N122}$ have the same meanings as $R^{N11}$ and $R^{N12}$, respectively, in general formula (N-1).

$R^{N121}$ is preferably an alkyl group having 1 to 5 carbon atoms or an alkenyl group having 2 to 5 carbon atoms and more preferably an ethyl group, a propyl group, a butyl group, or a pentyl group.

$R^{N122}$ is preferably an alkyl group having 1 to 5 carbon atoms, an alkenyl group having 4 to 5 carbon atoms, or an alkoxy group having 1 to 4 carbon atoms and more preferably a methyl group, a propyl group, a methoxy group, an ethoxy group, or a propoxy group.

One compound represented by general formula (N-1-2) may be used alone, or a combination of two or more compounds represented by general formula (N-1-2) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-2) and contained in the liquid crystal composition is preferably as follows. Specifically, the lower limit of the amount is preferably 5% by mass, 7% by mass, 10% by mass, 13% by mass, 15% by mass, 17% by mass, 20% by mass, 23% by mass, 25% by mass, 27% by mass, 30% by mass, 33% by mass, 35% by mass, 37% by mass, 40% by mass, or 42% by mass. The upper limit of the amount is preferably 50% by mass, 48% by mass, 45% by mass, 43% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, or 5% by mass.

When importance is placed on an improvement in Δε, it is preferable that the amount of the compound represented by general formula (N-1-2) is set to be high. When importance is placed on low temperature solubility, setting the amount of the compound to be lower is highly effective. When importance is placed on Tni, setting the amount of the compound to be higher is highly effective. To improve droplet marks and image-sticking characteristics, it is preferable to set the amount of the compound represented by general formula (N-1-2) within an intermediate range between the above ranges.

The compound represented by general formula (N-1-2) is preferably a compound represented by any of the following formulas (N-1-2.1) to (N-1-2.7), formulas (N-1-2.10) to (N-1-2.13), and formulas (N-1-2.20) to (N-1-2.22) and more preferably a compound represented by any of formulas (N-1-2.3) to (N-1-2.7), formula (N-1-2.10), formula (N-1-2.11), formula (N-1-2.13), and formula (N-1-2.20).

When importance is placed on an improvement in Δε, the compounds represented by formulas (N-1-2.3) to (N-1-2.7) are preferred. When importance is placed on an improvement in Tni, the compounds represented by formula (N-1-2.10), formula (N-1-2.11), and formula (N-1-2.13) are preferred. When importance is placed on an improvement in response speed, the compound represented by formula (N-1-2.20) is preferred.

[Chem. 47]

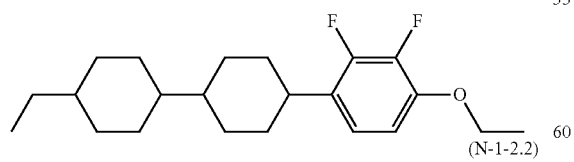

(N-1-2.1)

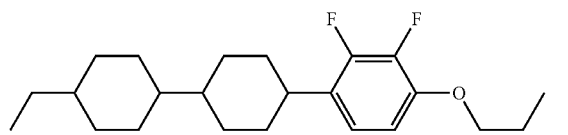

(N-1-2.2)

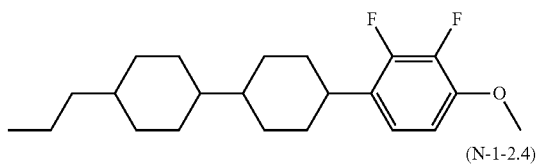

(N-1-2.3)

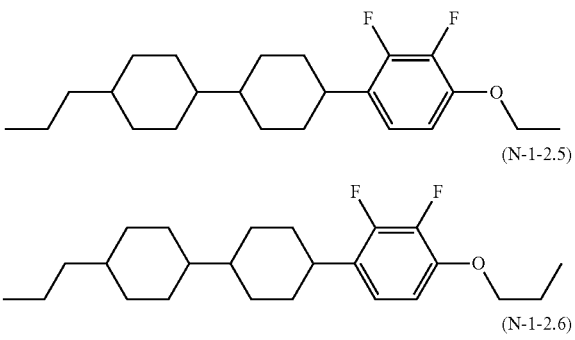

(N-1-2.4)

(N-1-2.5)

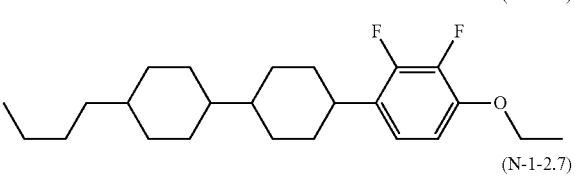

(N-1-2.6)

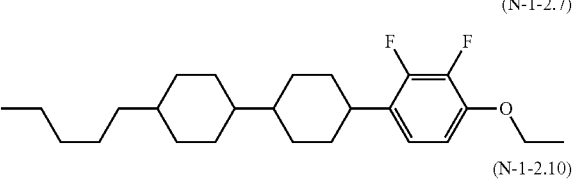

(N-1-2.7)

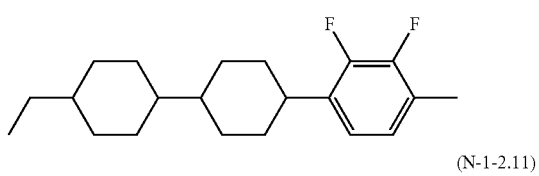

(N-1-2.10)

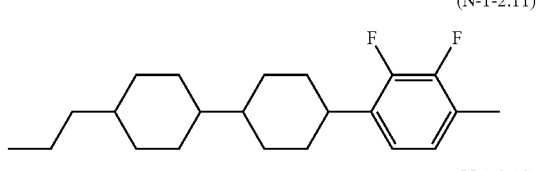

(N-1-2.11)

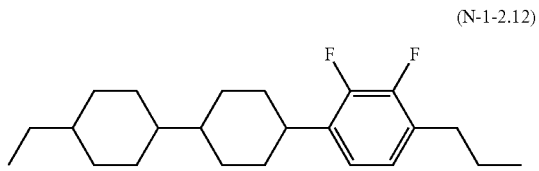

(N-1-2.12)

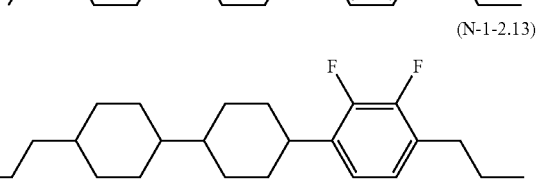

(N-1-2.13)

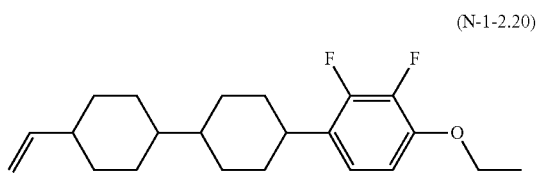

(N-1-2.20)

-continued

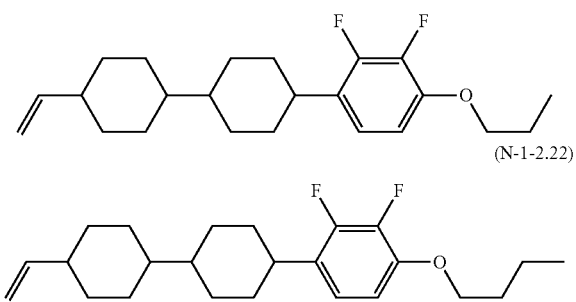
(N-1-2.21)

(N-1-2.22)

The compound represented by general formula (N-1-3) is the following compound.

[Chem. 48]

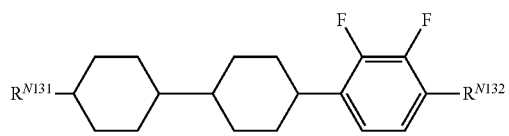
(N-1-3)

In the above formula, $R^{N131}$ and $R^{N132}$ have the same meanings as $R^{N11}$ and $R^{N12}$, respectively, in general formula (N-1).

$R^{N131}$ is preferably an alkyl group having 1 to 5 carbon atoms or an alkenyl group having 2 to 5 carbon atoms and more preferably an ethyl group, a propyl group, or a butyl group.

$R^{N132}$ is preferably an alkyl group having 1 to 5 carbon atoms, an alkenyl group having 3 to 5 carbon atoms, or an alkoxy group having 1 to 4 carbon atoms and more preferably a 1-propenyl group, an ethoxy group, a propoxy group, or a butoxy group.

One compound represented by general formula (N-1-3) may be used alone, or a combination of two or more compounds represented by general formula (N-1-3) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-3) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-3) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is pref- erable to set the amount of the compound represented by general formula (N-1-3) within an intermediate range between the above ranges.

The compound represented by general formula (N-1-3) is preferably a compound represented by any of the following formulas (N-1-3.1) to (N-1-3.7), formula (N-1-3.10), formula (N-1-3.11), formula (N-1-3.20), and formula (N-1-3.21), more preferably a compound represented by any of formulas (N-1-3.1) to (N-1-3.7) and formula (N-1-3.21), and still more preferably a compound represented by any of formulas (N-1-3.1) to (N-1-3.4) and formula (N-1-3.6).

[Chem. 49]

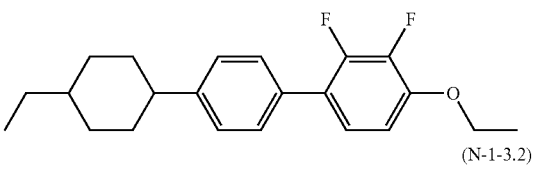
(N-1-3.1)

(N-1-3.2)

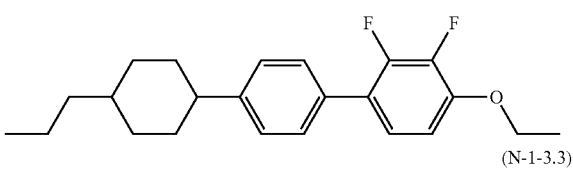
(N-1-3.3)

(N-1-3.4)

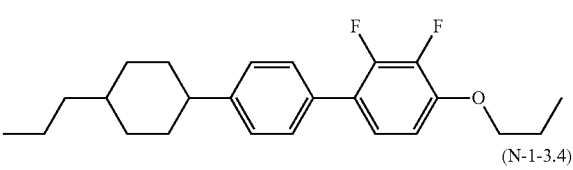
(N-1-3.5)

(N-1-3.6)

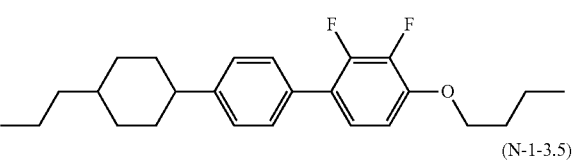
(N-1-3.7)

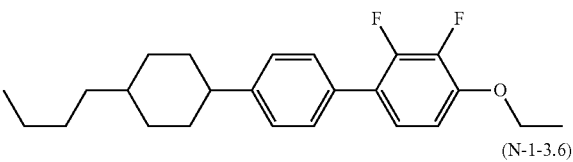

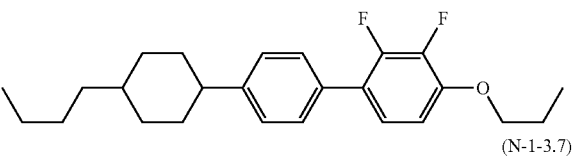

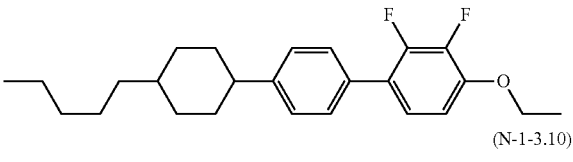
(N-1-3.10)

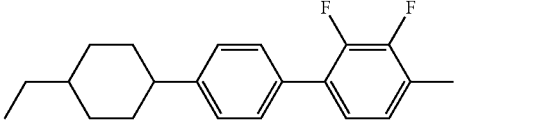

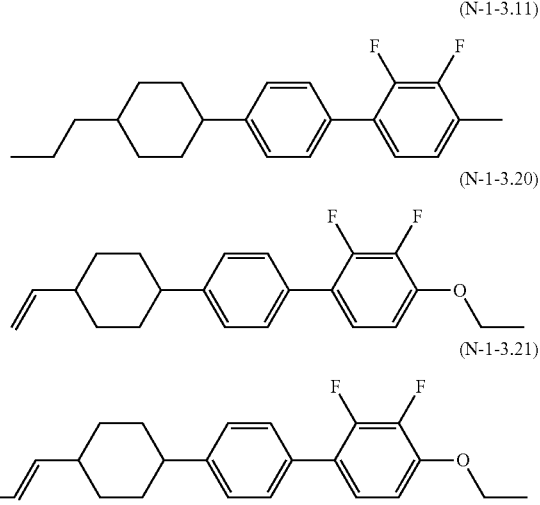

(N-1-3.11)

(N-1-3.20)

(N-1-3.21)

One of the compounds represented by formulas (N-1-3.1) to (N-1-3.4), formula (N-1-3.6), and formula (N-1-3.21) may be used alone, or two or more of them may be used in combination. In particular, a combination of the compound represented by formula (N-1-3.1) and the compound represented by formula (N-1-3.2) and a combination of two or three compounds selected from the compound represented by formula (N-1-3.3), the compound represented by formula (N-1-3.4), and the compound represented by formula (N-1-3.6) are preferred.

The compound represented by general formula (N-1-4) is the following compound.

[Chem. 50]

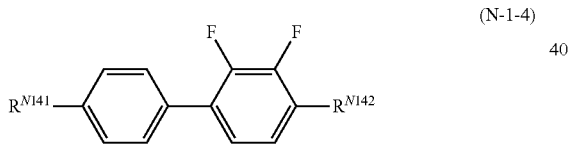

(N-1-4)

In the above formula, $R^{N141}$ and $R^{N142}$ have the same meanings as $R^{N11}$ and $R^{N12}$, respectively, in general formula (N-1).

$R^{N141}$ and $R^{N142}$ are each independently preferably an alkyl group having 1 to 5 carbon atoms, an alkenyl group having 4 to 5 carbon atoms, or an alkoxy group having 1 to 4 carbon atoms and more preferably a methyl group, a propyl group, an ethoxy group, or a butoxy group.

One compound represented by general formula (N-1-4) may be used alone, or a combination of two or more compounds represented by general formula (N-1-4) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-4) and contained in the liquid crystal composition is preferably as follows. Specifically, the lower limit of the amount is preferably 3% by mass, 5% by mass, 7% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, 13% by mass, 11% by mass, 10% by mass, or 8% by mass.

When importance is placed on an improvement in Δε, it is preferable that the amount of the compound represented by general formula (N-1-4) is set to be high. When importance is placed on low temperature solubility, setting the amount of the compound to be higher is highly effective. When importance is placed on $T_{ni}$, setting the amount of the compound to be lower is highly effective. To improve droplet marks and image-sticking characteristics, it is preferable to set the amount of the compound represented by general formula (N-1-4) within an intermediate range between the above ranges.

The compound represented by general formula (N-1-4) is preferably a compound represented by any of the following formulas (N-1-4.1) to (N-1-4.4) and formulas (N-1-4.11) to (N-1-4.14), more preferably a compound represented by any of formulas (N-1-4.1) to (N-1-4.4), and still more preferably a compound represented by formula (N-1-4.1), formula (N-1-4.2), or formula (N-1-4.4).

[Chem. 51]

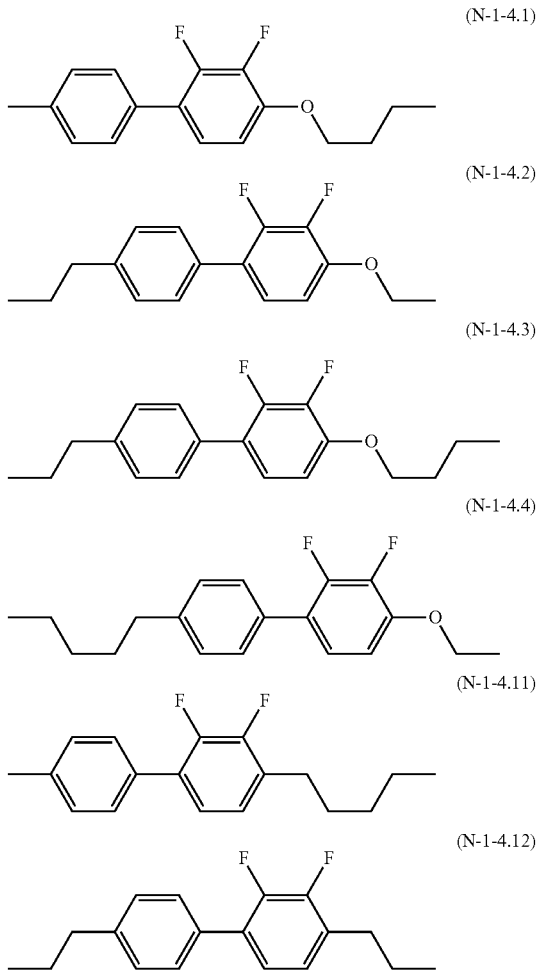

-continued

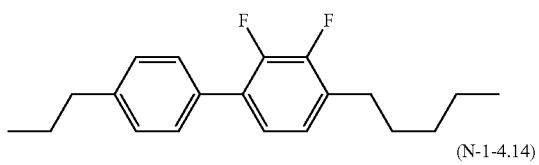
(N-1-4.13)

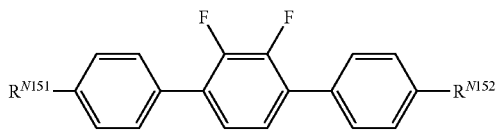
(N-1-4.14)

The compound represented by general formula (N-1-5) is the following compound.

[Chem. 52]

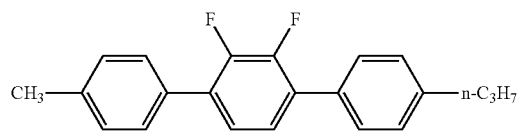
(N-1-5)

In the above formula, $R^{N151}$ and $R^{N152}$ have the same meanings as $R^{N11}$ and $R^{N12}$, respectively, in general formula (N-1).

$R^{N151}$ and $R^{N152}$ are each independently preferably an alkyl group having 1 to 5 carbon atoms, an alkenyl group having 4 to 5 carbon atoms, or an alkoxy group having 1 to 4 carbon atoms and more preferably an ethyl group, a propyl group, or a butyl group.

One compound represented by general formula (N-1-5) may be used alone, or a combination of two or more compounds represented by general formula (N-1-5) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-5) and contained in the liquid crystal composition is preferably as follows. Specifically, the lower limit of the amount is preferably 5% by mass, 8% by mass, 10% by mass, 13% by mass, 15% by mass, 17% by mass, or 20% by mass. The upper limit of the amount is preferably 35% by mass, 33% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-5) is set to be high. When importance is placed on low temperature solubility, setting the amount of the compound to be lower is highly effective. When importance is placed on Tni, setting the amount of the compound to be higher is highly effective. To improve droplet marks and image-sticking characteristics, it is preferable to set the amount of the compound represented by general formula (N-1-5) within an intermediate range between the above ranges.

The compound represented by general formula (N-1-5) is preferably a compound represented by any of the following formulas (N-1-5.1) to (N-1-5.6) and more preferably a compound represented by formula (N-1-5.1), formula (N-1-5.2), or formula (N-1-5.4).

[Chem. 53]

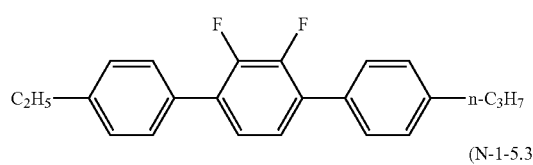
(N-1-5.1)

(N-1-5.2)

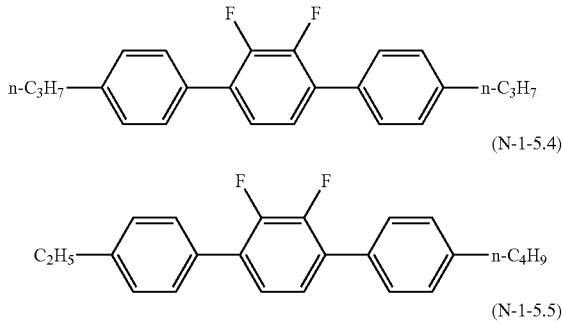
(N-1-5.3)

(N-1-5.4)

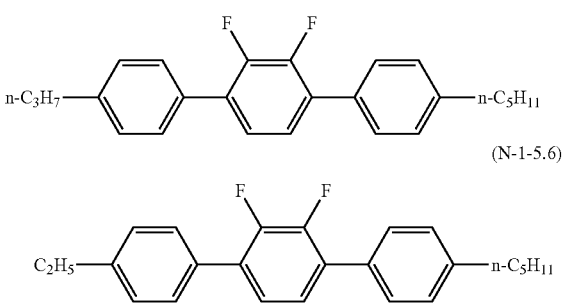
(N-1-5.5)

(N-1-5.6)

The compound represented by general formula (N-1-10) is the following compound.

[Chem. 54]

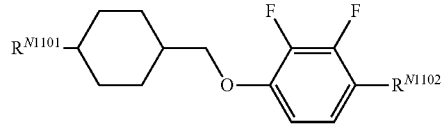
(N-1-10)

In the above formula, $R^{N1101}$ and $R^{N1102}$ have the same meanings as $R^{N11}$ and $R^{N12}$, respectively, in general formula (N-1).

$R^{N1101}$ is preferably an alkyl group having 1 to 5 carbon atoms or an alkenyl group having 2 to 5 carbon atoms and more preferably an ethyl group, a propyl group, a butyl group, a vinyl group, or a 1-propenyl group.

$R^{N1102}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-10) may be used alone, or a combination of two or more compounds represented by general formula (N-1-10) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-10) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-10) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-10) within an intermediate range between the above ranges.

The compound represented by general formula (N-1-10) is preferably a compound represented by any of the following formulas (N-1-10.1) to (N-1-10.5) and formulas (N-1-10.11) to (N-1-10.14), more preferably a compound represented by any of formulas (N-1-10.1) to (N-1-10.5), and still more preferably a compound represented by formula (N-1-10.1) or formula (N-1-10.2).

[Chem. 55]

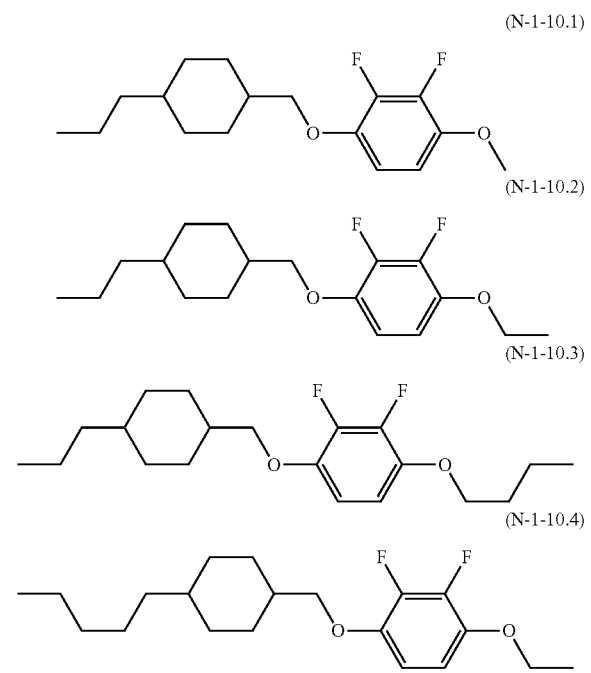

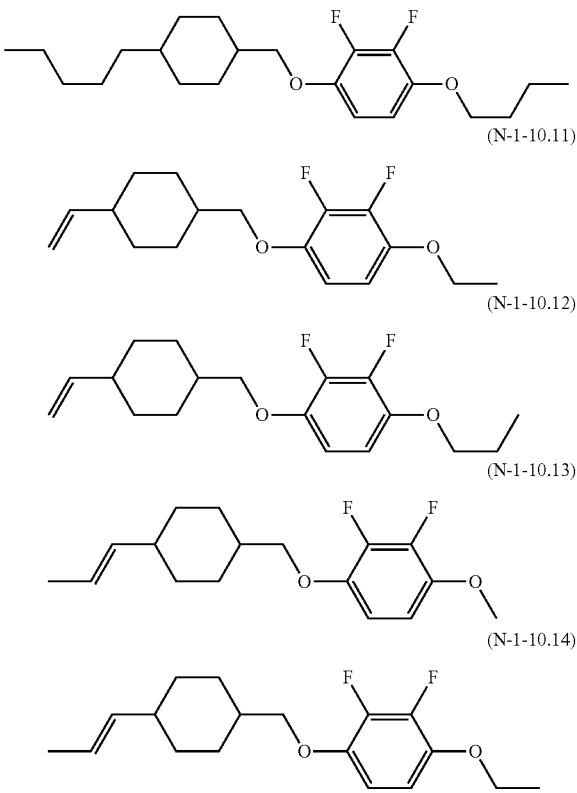

The compound represented by general formula (N-1-11) is the following compound.

[Chem. 56]

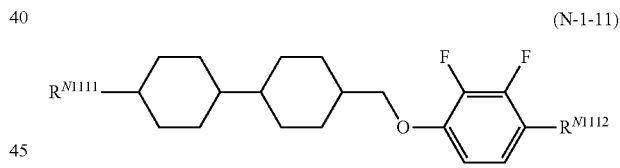

In the above formula, $R^{N1111}$ and $R^{N1112}$ have the same meanings as $R^{N11}$ and $R^{N12}$, respectively, in general formula (N-1).

$R^{N1111}$ is preferably an alkyl group having 1 to 5 carbon atoms or an alkenyl group having 2 to 5 carbon atoms and more preferably an ethyl group, a propyl group, a butyl group, a vinyl group, or a 1-propenyl group.

$R^{N1112}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-11) may be used alone, or a combination of two or more compounds represented by general formula (N-1-11) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-11) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in $\Delta\varepsilon$, it is preferable that the amount of the compound represented by general formula (N-1-11) is set to be high. When importance is placed on low temperature solubility, setting the amount of the compound to be lower is highly effective. When importance is placed on Tni, setting the amount of the compound to be higher is highly effective. To improve droplet marks and image-sticking characteristics, it is preferable to set the amount of the compound represented by general formula (N-1-11) within an intermediate range between the above ranges.

The compound represented by general formula (N-1-11) is preferably a compound represented by any of the following formulas (N-1-11.1) to (N-1-11.5) and formulas (N-1-11.11) to (N-1-11.14), more preferably a compound represented by any of formulas (N-1-11.1) to (N-1-11.5), and still more preferably a compound represented by formula (N-1-11.2) or formula (N-1-11.4).

[Chem. 57]

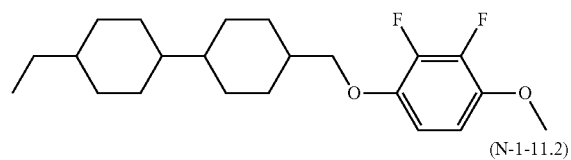
(N-1-11.1)

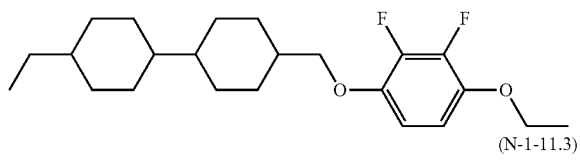
(N-1-11.2)

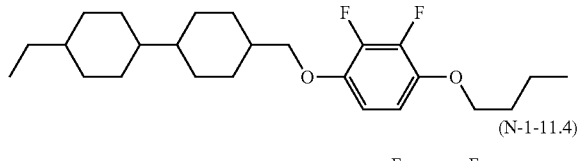
(N-1-11.3)

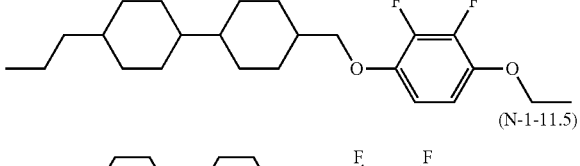
(N-1-11.4)

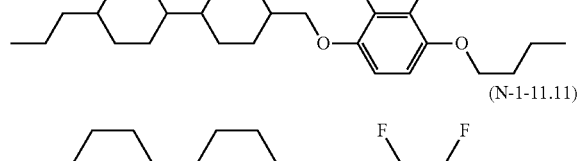
(N-1-11.5)

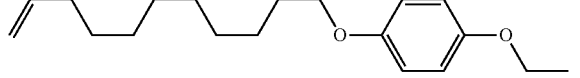
(N-1-11.11)

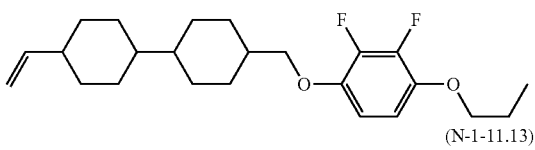
(N-1-11.12)

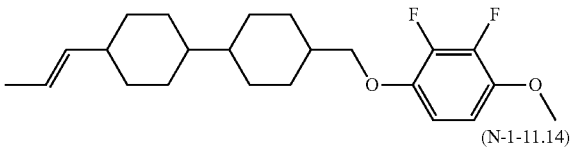
(N-1-11.13)

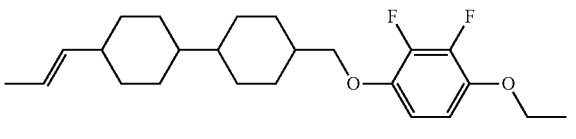
(N-1-11.14)

The compound represented by general formula (N-1-12) is the following compound.

[Chem. 58]

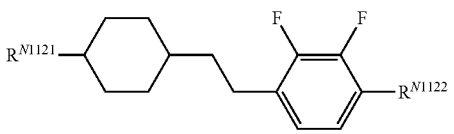
(N-1-12)

In the above formula, $R^{N1121}$ and $R^{N1122}$ have the same meanings as $R^{N11}$ and $R^{N12}$, respectively, in general formula (N-1).

$R^{N1121}$ is preferably an alkyl group having 1 to 5 carbon atoms or an alkenyl group having 2 to 5 carbon atoms and more preferably an ethyl group, a propyl group, or a butyl group.

$R^{N1122}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-12) may be used alone, or a combination of two or more compounds represented by general formula (N-1-12) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-12) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in $\Delta\varepsilon$, it is preferable that the amount of the compound represented by general formula (N-1-12) is set to be high. When importance is placed on low temperature solubility, setting the amount of the compound to be higher is highly effective.

When importance is placed on Tni, setting the amount of the compound to be higher is highly effective. To improve droplet marks and image-sticking characteristics, it is preferable to set the amount of the compound represented by general formula (N-1-12) within an intermediate range between the above ranges.

The compound represented by general formula (N-1-13) is the following compound.

[Chem. 59]

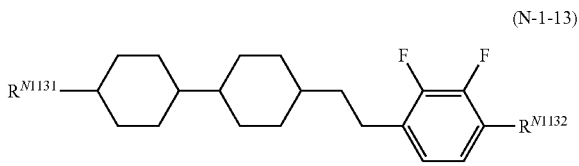

(N-1-13)

In the above formula, $R^{N131}$ and $R^{N1132}$ have the same meanings as $R^{N11}$ and $R^{N12}$, respectively, in general formula (N-1).

$R^{N1131}$ is preferably an alkyl group having 1 to 5 carbon atoms or an alkenyl group having 2 to 5 carbon atoms and more preferably an ethyl group, a propyl group, or a butyl group.

$R^{N1132}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-13) may be used alone, or a combination of two or more compounds represented by general formula (N-1-13) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-13) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-13) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-13) within an intermediate range between the above ranges.

The compound represented by general formula (N-1-14) is the following compound.

[Chem. 60]

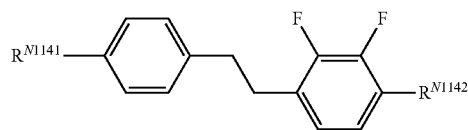

(N-1-14)

In the above formula, $R^{N1141}$ and $R^{N1142}$ have the same meanings as $R^{N11}$ and $R^{N12}$, respectively, in general formula (N-1).

$R^{N1141}$ is preferably an alkyl group having 1 to 5 carbon atoms or an alkenyl group having 2 to 5 carbon atoms and more preferably an ethyl group, a propyl group, or a butyl group.

$R^{N1142}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-14) may be used alone, or a combination of two or more compounds represented by general formula (N-1-14) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-14) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-14) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-14) within an intermediate range between the above ranges.

The compound represented by general formula (N-1-15) is the following compound.

[Chem. 61]

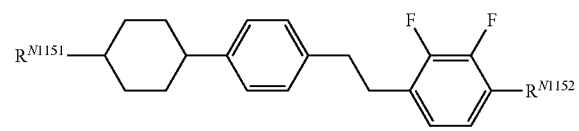

(N-1-15)

In the above formula, $R^{N1151}$ and $R^{N1152}$ have the same meanings as $R^{N11}$ and $R^{N12}$, respectively, in general formula (N-1).

$R^{N1151}$ is preferably an alkyl group having 1 to 5 carbon atoms or an alkenyl group having 2 to 5 carbon atoms and more preferably an ethyl group, a propyl group, or a butyl group.

$R^{N1152}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-15) may be used alone, or a combination of two or more compounds represented by general formula (N-1-15) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-15) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-15) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-15) within an intermediate range between the above ranges.

The compound represented by general formula (N-1-16) is the following compound.

[Chem. 62]

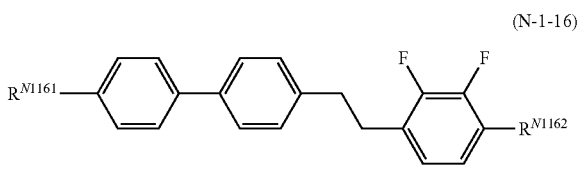

(N-1-16)

In the above formula, $R^{N1161}$ and $R^{N1162}$ have the same meanings as $R^{N11}$ and $R^{N12}$, respectively, in general formula (N-1).

$R^{N1161}$ is preferably an alkyl group having 1 to 5 carbon atoms or an alkenyl group having 2 to 5 carbon atoms and more preferably an ethyl group, a propyl group, or a butyl group.

$R^{N1162}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-16) may be used alone, or a combination of two or more compounds represented by general formula (N-1-16) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-16) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-16) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-16) within an intermediate range between the above ranges.

The compound represented by general formula (N-1-17) is the following compound.

[Chem. 63]

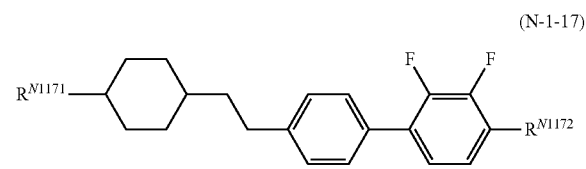

(N-1-17)

In the above formula, $R^{N1171}$ and $R^{N1172}$ have the same meanings as $R^{N11}$ and $R^{N12}$, respectively, in general formula (N-1).

$R^{N1171}$ is preferably an alkyl group having 1 to 5 carbon atoms or an alkenyl group having 2 to 5 carbon atoms and more preferably an ethyl group, a propyl group, or a butyl group.

$R^{N1172}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-17) may be used alone, or a combination of two or more compounds represented by general formula (N-1-17) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-17) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-17) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-17) within an intermediate range between the above ranges.

The compound represented by general formula (N-1-18) is the following compound.

[Chem. 64]

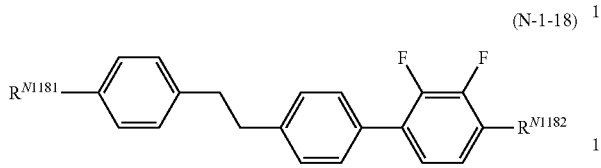

(N-1-18)

In the above formula, $R^{N1181}$ and $R^{N1182}$ have the same meanings as $R^{N11}$ and $R^{N12}$, respectively, in general formula (N-1).

$R^{N1181}$ is preferably an alkyl group having 1 to 5 carbon atoms or an alkenyl group having 2 to 5 carbon atoms and more preferably a methyl group, an ethyl group, a propyl group, or a butyl group.

$R^{N1182}$ is preferably an alkyl group having 1 to 5 carbon atoms, an alkenyl group having 4 to 5 carbon atoms, or an alkoxy group having 1 to 4 carbon atoms and more preferably an ethoxy group, a propoxy group, or a butoxy group.

One compound represented by general formula (N-1-18) may be used alone, or a combination of two or more compounds represented by general formula (N-1-18) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-18) and contained in the liquid crystal composition is preferably as follows. Specifically, the lower limit of the amount is preferably 5% by mass, 10% mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-18) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-18) within an intermediate range between the above ranges.

The compound represented by general formula (N-1-18) is preferably a compound represented by any of the following formulas (N-1-18.1) to (N-1-18.5), more preferably a compound represented by any of formulas (N-1-18.1) to (N-1-18.3), and still more preferably a compound represented by formula (N-1-18.2) or formula (N-1-18.3).

[Chem. 65]

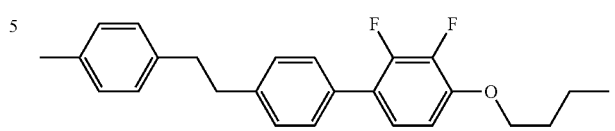

(N-1-18.1)

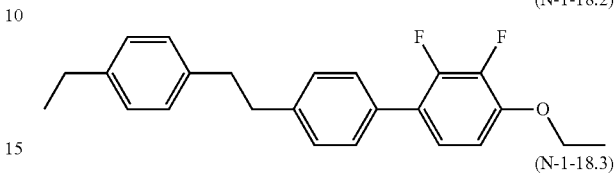

(N-1-18.2)

(N-1-18.3)

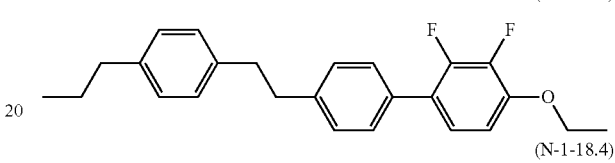

(N-1-18.4)

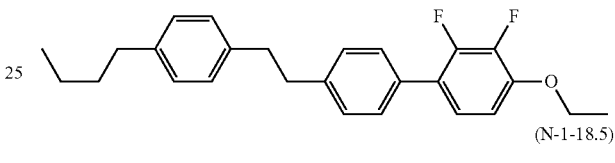

(N-1-18.5)

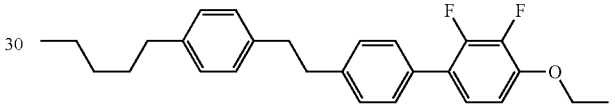

The compound represented by general formula (N-1-20) is the following compound.

[Chem. 66]

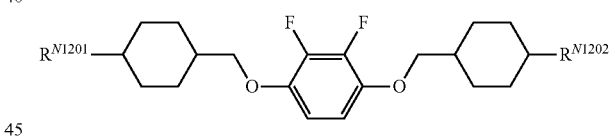

(N-1-20)

In the above formula, $R^{N1201}$ and $R^{N1202}$ have the same meanings as $R^{N11}$ and $R^{N12}$, respectively, in general formula (N-1).

$R^{N1201}$ and $R^{N1202}$ are each independently preferably an alkyl group having 1 to 5 carbon atoms or an alkenyl group having 2 to 5 carbon atoms and more preferably an ethyl group, a propyl group, or a butyl group.

One compound represented by general formula (N-1-20) may be used alone, or a combination of two or more compounds represented by general formula (N-1-20) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-20) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-20) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-20) within an intermediate range between the above ranges.

The compound represented by general formula (N-1-21) is the following compound.

[Chem. 67]

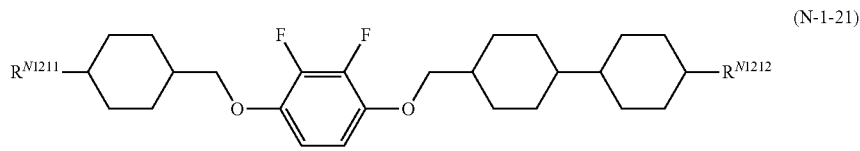

(N-1-21)

$R^{N1211}$ and $R^{N1212}$ are each independently preferably an alkyl group having 1 to 5 carbon atoms or an alkenyl group having 2 to 5 carbon atoms and more preferably an ethyl group, a propyl group, or a butyl group.

One compound represented by general formula (N-1-21) may be used alone, or a combination of two or more compounds represented by general formula (N-1-21) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-21) and contained in the liquid crystal composition is preferably as follows. Specifically, the lower limit of the amount is preferably 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, or 13% by mass.

When importance is placed on an improvement in Δε, it is preferable that the amount of the compound represented by general formula (N-1-21) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-21) within an intermediate range between the above ranges.

The compound represented by general formula (N-1-22) is the following compound.

[Chem. 68]

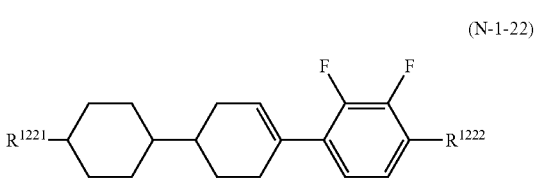

(N-1-22)

In the above formula, $R^{N1221}$ and $R^{1222}$ have the same meanings as $R^{N11}$ and $R^{N12}$, respectively, in general formula (N-1).

$R^{N1221}$ and $R^{N1222}$ are each independently preferably an alkyl group having 1 to 5 carbon atoms or an alkenyl group having 2 to 5 carbon atoms and more preferably an ethyl group, a propyl group, or a butyl group.

One compound represented by general formula (N-1-22) may be used alone, or a combination of two or more compounds represented by general formula (N-1-22) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-1-22) and contained in the liquid crystal composition is preferably as follows. Specifically, the lower limit of the amount is preferably 1% by mass, 5% by mass, 10% by mass, 13% by mass, 15% by mass, 17% by mass, or 20% by mass. The upper limit of the amount is preferably 35% by mass, 30% by mass, 28% by mass, 25% by mass, 23% by mass, 20% by mass, 18% by mass, 15% by mass, 13% by mass, 10% by mass, or 5% by mass.

When importance is placed on an improvement in Δε, it is preferable that the amount of the compound represented by general formula (N-1-22) is set to be high. When importance is placed on low temperature solubility, setting the amount of the compound to be higher is highly effective. When importance is placed on Tni, setting the amount of the compound to be higher is highly effective. To improve droplet marks and image-sticking characteristics, it is preferable to set the amount of the compound represented by general formula (N-1-21) within an intermediate range between the above ranges.

The compound represented by general formula (N-1-22) is preferably a compound represented by any of the following formulas (N-1-22.1) to (N-1-22.6) and formulas (N-1-22.11) and (N-1-22.12), more preferably a compound represented by any of formulas (N-1-22.1) to (N-1-22.5), and still more preferably a compound represented by any of formulas (N-1-22.1) to (N-1-22.4).

[Chem. 69]

(N-1-22.1)

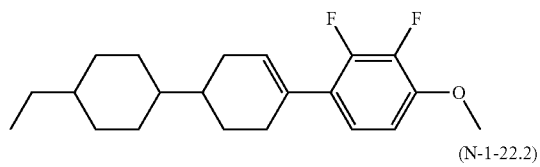

(N-1-22.2)

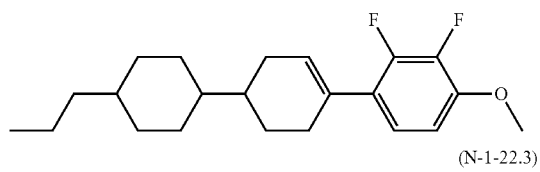

(N-1-22.3)

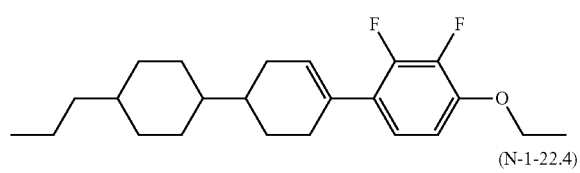

(N-1-22.4)

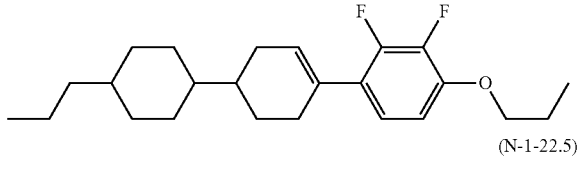

(N-1-22.5)

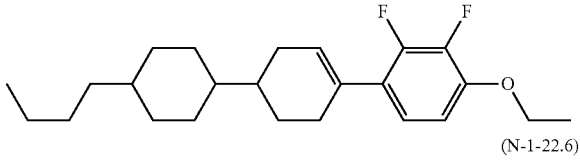

(N-1-22.6)

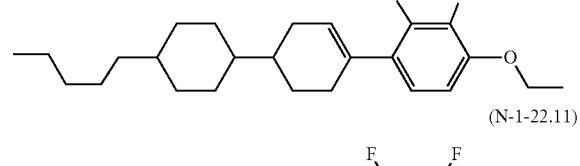

(N-1-22.11)

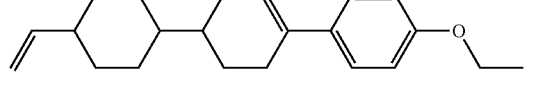

(N-1-22.12)

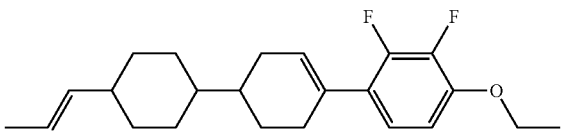

The compound represented by general formula (N-3) is preferably a compound represented by the following general formula (N-3-2).

[Chem. 70]

(N-3-2)

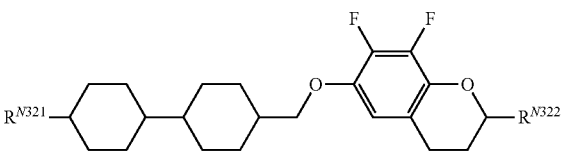

In the above formula, $R^{N321}$ and $R^{N322}$ have the same meanings as $R^{N31}$ and $R^{N32}$, respectively, in general formula (N-3).

$R^{N321}$ and $R^{N322}$ are each preferably an alkyl group having 1 to 5 carbon atoms or an alkenyl group having 2 to 5 carbon atoms and more preferably a propyl group or a pentyl group.

One compound represented by general formula (N-3-2) may be used alone, or a combination of two or more compounds represented by general formula (N-3-2) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (N-3-2) and contained in the liquid crystal composition is preferably as follows. Specifically, the lower limit of the amount is preferably 3% by mass, 5% by mass, 10% by mass, 13% by mass, 15% by mass, 17% by mass, 20% by mass, 23% by mass, 25% by mass, 27% by mass, 30% by mass, 33% by mass, or 35% by mass. The upper limit of the amount is preferably 50% by mass, 40% by mass, 38% by mass, 35% by mass, 33% by mass, 30% by mass, 28% by mass, 25% by mass, 23% by mass, 20% by mass, 18% by mass, 15% by mass, 13% by mass, 10% by mass, 8% by mass, 7% by mass, 6% by mass, or 5% by mass.

When importance is placed on an improvement in Δε, it is preferable that the amount of the compound represented by general formula (N-3-2) is set to be high. When importance is placed on low temperature solubility, setting the amount of the compound to be higher is highly effective. When importance is placed on Tni, setting the amount of the compound to be lower is highly effective. To improve droplet marks and image-sticking characteristics, it is preferable to set the amount of the compound represented by general formula (N-3-2) within an intermediate range between the above ranges.

The compound represented by general formula (N-3-2) is preferably a compound represented by any of the following formulas (N-3-2.1) to (N-3-2.3).

[Chem. 71]

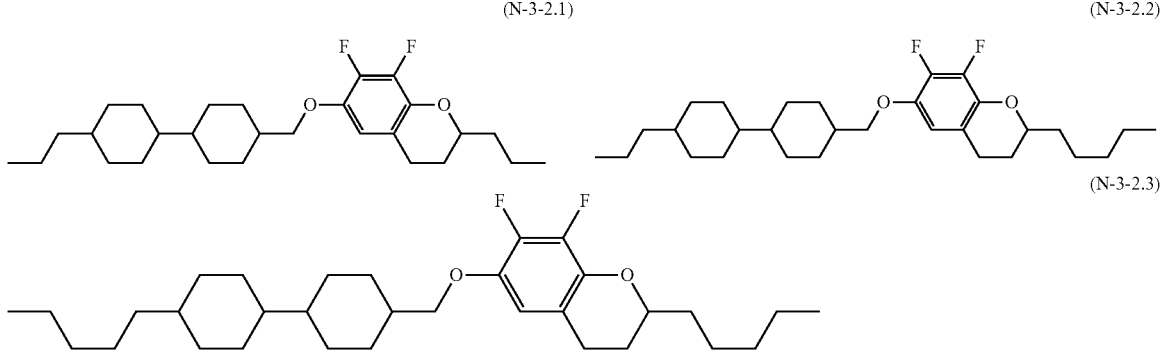

(N-3-2.1)
(N-3-2.2)
(N-3-2.3)

The liquid crystal molecules may further contain a compound represented by the following general formula (L).

[Chem. 72]

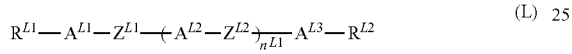

(L)

In the above formula, $R^{L1}$ and $R^{L2}$ each independently represent an alkyl group having 1 to 8 carbon atoms. Any one —CH$_2$— group or two or more non-adjacent —CH$_2$— groups present in the alkyl group may be each independently replaced with —CH=CH—, —C≡C—, —O—, —CO—, —COO—, or —OCO—.

$n^{L1}$ represents 0, 1, 2, or 3.

$A^{L1}$, $A^{L2}$, and $A^{L3}$ each independently represent a group selected from the group consisting of (a) a 1,4-cyclohexylene group (any one —CH$_2$— group or two or more non-adjacent —CH$_2$— groups present in this group may each be replaced with —O—), (b) a 1,4-phenylene group (any one —CH= group or two or more non-adjacent —CH= groups present in this group may each be replaced with —N=), and (c) a naphthalene-2,6-diyl group, a 1,2,3,4-tetrahydronaphthalene-2,6-diyl group, or a decahydronaphthalene-2,6-diyl group (any one —CH= group or two or more non-adjacent —CH= groups present in these groups may each be replaced with —N=). The group (a), the group (b), and the group (c) may be each independently substituted with a cyano group, a fluorine atom, or a chlorine atom.

$Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—.

When $n^{L1}$ is two or more, a plurality of $A^{L2}$s and a plurality of $Z^{L2}$s may be the same or different, and the compounds represented by general formulas (N-1) to (N-3) are excluded.

The compound represented by general formula (L) corresponds to a compound that is substantially dielectrically neutral (the value of Δε is -2 to 2). One compound represented by general formula (L) may be used alone, or two or more compounds represented by general formula (L) may be used in combination. No particular limitation is imposed on the types of compounds combined, and suitable compounds are selected according to the desired properties such as low temperature solubility, transition temperature, electrical reliability, and birefringence. The number of compounds used is, 1, 3, 4, 5, 6, 7, 8, 9, or 10 or more.

The amount of the compound represented by general formula (L) and contained in the liquid crystal composition is appropriately adjusted according to the desired properties such as low temperature solubility, transition temperature, electrical reliability, birefringence, process compatibility, droplet marks, image-sticking, and dielectric anisotropy.

The lower limit of the amount of the compound is preferably 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of the amount is preferably 95% by mass, 85% by mass, 75% by mass, 65% by mass, 55% by mass, 45% by mass, 35% by mass, or 25% by mass.

To increase the response speed of the liquid crystal composition while its viscosity (η) is kept low, it is preferable that the lower limit of the amount of the compound represented by general formula (L) is high and the upper limit is also high. To improve the temperature stability of the liquid crystal composition while the Tni of the liquid crystal composition is kept high, it is preferable that the lower limit of the amount of the compound is high and the upper limit is also high. To increase the Δε of the liquid crystal composition in order to keep the driving voltage of the liquid crystal display device low, it is preferable that the lower limit of the amount is low and the upper limit is also low.

When importance is placed on reliability, $R^{L1}$ and $R^{L2}$ are each independently preferably an alkyl group. When importance is placed on a reduction in the volatility of the compound, $R^{L1}$ and $R^{L2}$ are each independently preferably an alkoxy group. When importance is placed on a reduction in viscosity, at least one of $R^{L1}$ and $R^{L2}$ is preferably an alkenyl group.

The number of halogen atoms present in the compound represented by general formula (L) is preferably 0, 1, 2, or 3 and more preferably 0 or 1. When importance is placed on compatibility with other liquid crystal molecules, the number of halogen atoms is preferably 1.

When ring structures to which $R^{L1}$ and $R^{L2}$ are bonded are benzene rings (aromatic rings), $R^{L1}$ and $R^{L2}$ are each independently preferably a linear alkyl group having 1 to 5 carbon atoms, a linear alkoxy group having 1 to 4 carbon atoms, or an alkenyl group having 4 to 5 carbon atoms.

When the ring structures to which $R^{L1}$ and $R^{L2}$ are bonded are each a saturated ring structure such as a cyclohexane ring, a pyran ring, or a dioxane ring, $R^{L1}$ and $R^{L2}$ are each independently preferably a linear alkyl group having 1 to 5 carbon atoms, a linear alkoxy group having 1 to 4 carbon atoms, or a linear alkenyl group having 2 to 5 carbon atoms.

To stabilize the nematic phase, the total number of carbon atoms and oxygen atoms (if present) in each of $R^{L1}$ and $R^{L2}$ is preferably 5 or less, and $R^{L1}$ and $R^{L2}$ are preferably linear.

The alkenyl group is preferably a group selected from the group consisting of groups represented by the following formulas (R1) to (R5).

[Chem. 73]

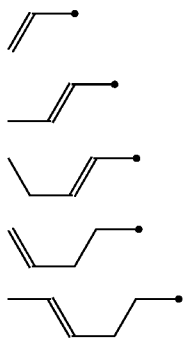

(R1)

(R2)

(R3)

(R4)

(R5)

In each of the above formulas, each solid circle represents a bond.

When importance is placed on the response speed of the liquid crystal molecules, $n^{L1}$ is preferably 0. To improve the upper limit temperature of the nematic phase of the liquid crystal molecules, $n^{L1}$ is preferably 2 or 3. To balance them, $n^{L1}$ is preferably 1. To satisfy the desired characteristics of the liquid crystal composition, it is preferable to use a combination of compounds with different $n^{L1}$ values.

To increase the Δn of the liquid crystal molecules, $A^{L1}$, $A^{L2}$, and $A^{L3}$ are each independently preferably an aromatic group. To improve the response speed of the liquid crystal molecules, $A^{L1}$, $A^{L2}$, and $A^{L3}$ are each independently preferably an aliphatic group.

The aromatic group and the aliphatic groups are each preferably a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably any of structures represented by Chem. 74, and still more preferably a trans-1,4-cyclohexylene group or a 1,4-phenylene group.

[Chem. 74]

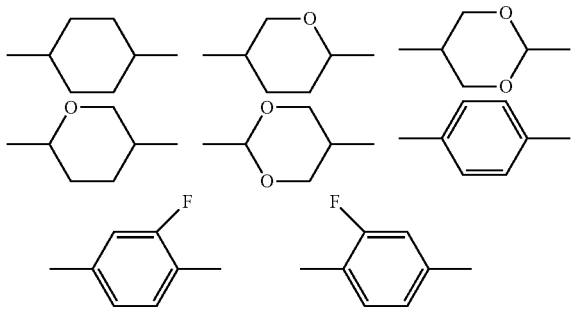

When importance is placed on the response speed of the liquid crystal molecules, $Z^{L1}$ and $Z^{L2}$ are each independently preferably a single bond.

The compound represented by general formula (L) is preferably a compound represented by any of the following general formulas (L-1) to (L-7).

The compound represented by general formula (L-1) is the following compound.

[Chem. 75]

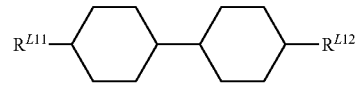

(L-1)

In the above formula, $R^{L11}$ and $R^{L12}$ have the same meanings as $R^{L1}$ and $R^{L2}$, respectively, in general formula (L).

$R^{L11}$ and $R^{L12}$ are each independently preferably a linear alkyl group having 1 to 5 carbon atoms, a linear alkoxy group having 1 to 4 carbon atoms, or a linear alkenyl group having 2 to 5 carbon atoms.

One compound represented by general formula (L-1) may be used alone, or a combination of two or more compounds represented by general formula (L-1) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (L-1) and contained in the liquid crystal composition is preferably as follows. Specifically, the lower limit of the amount is preferably 1% by mass, 2% by mass, 3% by mass, 5% by mass, 7% by mass, 10% by mass, 15% by mass, 20% by mass, 25% by mass, 30% by mass, 35% by mass, 40% by mass, 45% by mass, 50% by mass, or 55% by mass. The upper limit of the amount is preferably 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, or 25% by mass.

To increase the response speed of the liquid crystal composition while its viscosity (η) is kept low, it is preferable that the lower limit of the amount of the compound represented by general formula (L-1) is high and the upper limit is also high. To improve the temperature stability of the liquid crystal composition while the Tni of the liquid crystal composition is kept high, it is preferable that the lower limit of the amount is medium and the upper limit is also medium. To increase the Δε of the liquid crystal composition in order to keep the driving voltage of the liquid crystal display device low, it is preferable that the lower limit of the amount is low and the upper limit is also low.

Preferably, the compound represented by general formula (L-1) is a compound represented by the following general formula (L-1-1).

[Chem. 76]

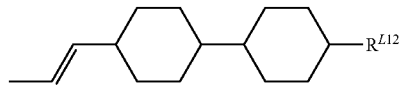

(L-1-1)

In the above formula, $R^{L12}$ has the same meaning as in general formula (L-1).

The compound represented by general formula (L-1-1) is preferably a compound represented by any of the following formulas (L-1-1.1) to (L-1-1.3), more preferably a compound represented by formula (L-1-1.2) or formula (L-1-1.3), and still more preferably a compound represented by formula (L-1-1.3).

[Chem. 77]

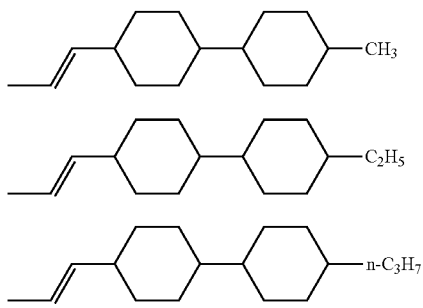

(L-1-1.1)

(L-1-1.2)

(L-1-1.3)

The amount of the compound represented by general formula (L-1-1.3) and contained in the liquid crystal composition is preferably as follows. Specifically, the lower limit of the amount is preferably 1% by mass 2% by mass, 3% by mass, 5% by mass, 7% by mass, or 10% by mass. The upper limit of the amount is preferably 20% by mass, 15% by mass, 13% by mass, 10% by mass, 8% by mass, 7% by mass, 6% by mass, 5% by mass, or 3% by mass.

Preferably, the compound represented by general formula (L-1) is a compound represented by the following general formula (L-1-2).

[Chem. 78]

(L-1-2)

In the above formula, $R^{L12}$ has the same meaning as in general formula (L-1).

The amount of the compound represented by general formula (L-1-2) and contained in the liquid crystal composition is preferably as follows. Specifically, the lower limit of the amount is preferably 1% by mass, 5% by mass, 10% by mass, 15% by mass, 17% by mass, 20% by mass, 23% by mass, 25% by mass, 27% by mass, 30% by mass, or 35% by mass. The upper limit of the amount is preferably 60% by mass, 55% by mass, 50% by mass, 45% by mass, 42% by mass, 40% by mass, 38% by mass, 35% by mass, 33% by mass, or 30% by mass.

The compound represented by general formula (L-1-2) is preferably a compound represented by any of formulas (L-1-2.1) to (L-1-2.4) below and more preferably a compound represented by any of formulas (L-1-2.2) to (L-1-2.4). In particular, the compound represented by formula (L-1-2.2) is preferred because its effect of improving the response speed of the liquid crystal composition is high.

When more importance is placed on an improvement in Tni of the liquid crystal composition than on its response speed, it is preferable to use the compound represented by formula (L-1-2.3) or formula (L-1-2.4). The amount of the compound represented by formula (L-1-2.3) or formula (L-1-2.4) and contained in the liquid crystal composition is preferably less than 30% by mass in order to increase low-temperature solubility.

[Chem. 79]

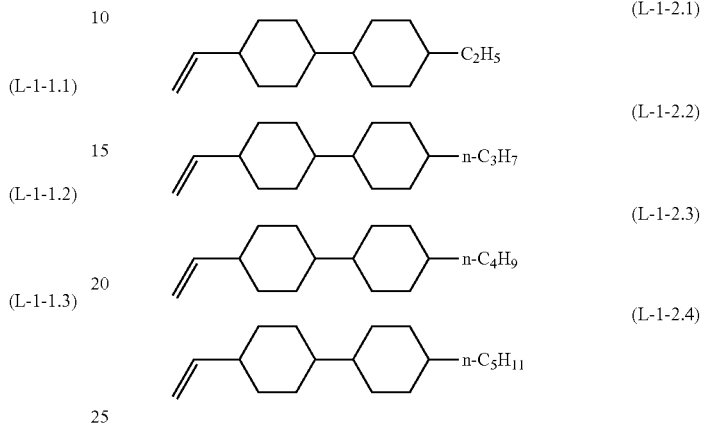

(L-1-2.1)

(L-1-2.2)

(L-1-2.3)

(L-1-2.4)

Preferably, the compound represented by general formula (L-1) is a compound represented by the following general formula (L-1-3).

[Chem. 85]

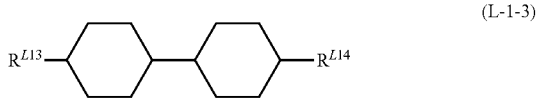

(L-1-3)

In the above formula, $R^{L13}$ and $R^{L14}$ each independently represent an alkyl group having 1 to 8 carbon atoms or an alkoxy group having 1 to 8 carbon atoms.

$R^{L13}$ and $R^{L14}$ are each independently preferably a linear alkyl group having 1 to 5 carbon atoms, a linear alkoxy group having 1 to 4 carbon atoms, or a linear alkenyl group having 2 to 5 carbon atoms.

The amount of the compound represented by general formula (L-1-3) and contained in the liquid crystal composition is preferably as follows. Specifically, the lower limit of the amount is preferably 1% by mass, 5% by mass, 10% by mass, 13% by mass, 15% by mass, 17% by mass, 20% by mass, 23% by mass, 25% by mass, or 30% by mass. The upper limit of the amount is preferably 60% by mass, 55% by mass, 50% by mass, 45% by mass, 40% by mass, 37% by mass, 35% by mass, 33% by mass, 30% by mass, 27% by mass, 25% by mass, 23% by mass, 20% by mass, 17% by mass, 15% by mass, 13% by mass, or 10% by mass.

The compound represented by general formula (L-1-3) is preferably a compound represented by any of formulas (L-1-3.1) to (L-1-3.4) and formulas (L-1-3.11) to (L-1-3.13) below and more preferably a compound represented by any of formula (L-1-3.1), formula (L-1-3.3), and formula (L-1-3.4) below. The compound represented by formula (L-1-3.1) is particularly preferred because its effect of improving the response speed of the liquid crystal composition is high.

When more importance is placed on an improvement in Tni of the liquid crystal composition than on its response speed, it is preferable to use a compound represented by formula (L-1-3.3), formula (L-1-3.4), formula (L-1-3.11), or formula (L-1-3.12). Preferably, the total amount of the compounds represented by formula (L-1-3.3), formula (L-1-3.4), formula (L-1-3.11), and formula (L-1-3.12) contained in the liquid crystal composition is less than 20% in order to increase the low-temperature solubility.

[Chem. 81]

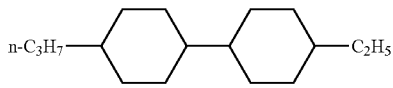
(L-1-3.1)

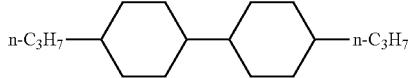
(L-1-3.2)

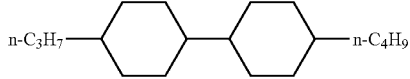
(L-1-3.3)

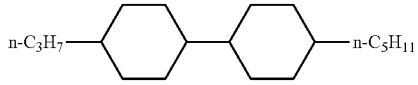
(L-1-3.4)

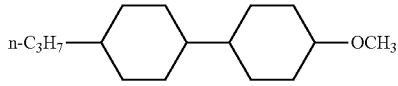
(L-1-3.11)

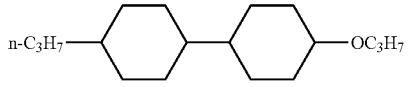
(L-1-3.12)

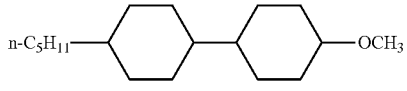
(L-1-3.13)

The compound represented by general formula (L-1) is preferably a compound represented by the following general formula (L-1-4) or (L-1-5).

[Chem. 82]

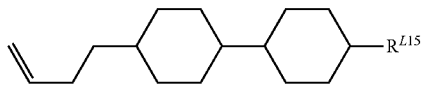
(L-1-4)

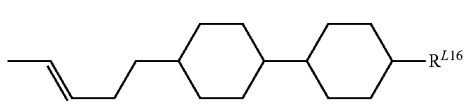
(L-1-5)

In the above formulas, $R^{L15}$ and $R^{L16}$ each independently represent an alkyl group having 1 to 8 carbon atoms or an alkoxy group having 1 to 8 carbon atoms.

$R^{L15}$ and $R^{L16}$ are each independently preferably a linear alkyl group having 1 to 5 carbon atoms, a linear alkoxy group having 1 to 4 carbon atoms, or a linear alkenyl group having 2 to 5 carbon atoms.

The amount of the compound represented by general formula (L-1-4) and contained in the liquid crystal composition is preferably as follows. Specifically, the lower limit of the amount is preferably 1% by mass, 5% by mass, 10% by mass, 13% by mass, 15% by mass, 17% by mass, or 20% by mass. The upper limit of the amount is preferably 25% by mass, 23% by mass, 20% by mass, 17% by mass, 15% by mass, 13% by mass, or 10% by mass.

The amount of the compound represented by general formula (L-1-5) and contained in the liquid crystal composition is preferably as follows. Specifically, the lower limit of the amount is preferably 1% by mass, 5% by mass, 10% by mass, 13% by mass, 15% by mass, 17% by mass, or 20% by mass. The upper limit of the amount is preferably 25% by mass, 23% by mass, 20% by mass, 17% by mass, 15% by mass, 13% by mass, or 10% by mass.

The compound represented by general formula (L-1-4) or (L-1-5) is preferably a compound represented by any of the following formulas (L-1-4.1) to (L-1-4.3) and formulas (L-1-5.1) to (L-1-5.3) and more preferably a compound represented by formula (L-1-4.2) or formula (L-1-5.2).

[Chem. 83]

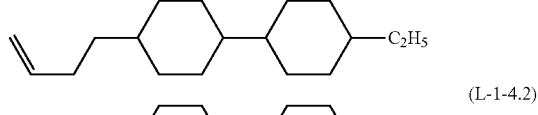
(L-1-4.1)

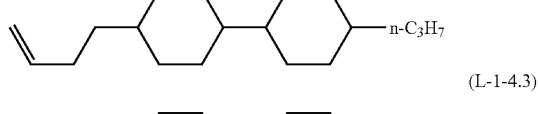
(L-1-4.2)

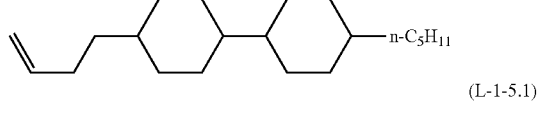
(L-1-4.3)

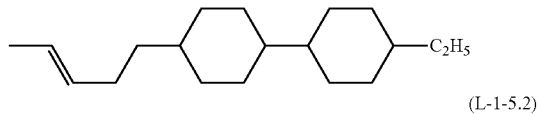
(L-1-5.1)

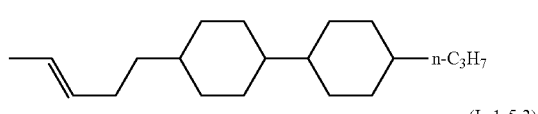
(L-1-5.2)

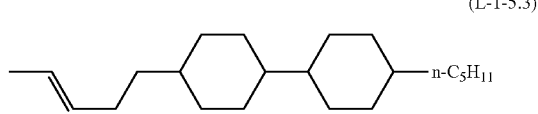
(L-1-5.3)

The compound represented by general formula (L-1) is preferably a combination of two or more selected from compounds represented by formula (L-1-1.3), formula (L-1-2.2), formula (L-1-3.1), formula (L-1-3.3), formula (L-1-3.4), formula (L-1-3.11), and formula (L-1-3.12) and more preferably a combination of two or more selected from compounds represented by formula (L-1-1.3), formula (L-1-2.2), formula (L-1-3.1), formula (L-1-3.3), formula (L-1-3.4), and formula (L-1-4.2).

When importance is placed on the reliability of the liquid crystal composition, a combination of two or more selected from formula (L-1-3.1), formula (L-1-3.3), and formula (L-1-3.4) is preferred. When importance is placed on the response speed of the liquid crystal composition, a combination of two or more selected from compounds represented by formula (L-1-1.3) and formula (L-1-2.2) is preferred.

The compound represented by general formula (L-1) is also preferably a compound represented by the following general formula (L-1-6).

[Chem. 84]

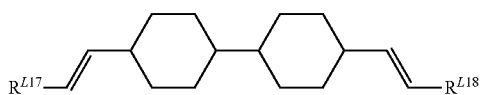
(L-1-6)

In the above formula, $R^{L17}$ and $R^{L18}$ each independently represent a methyl group or a hydrogen atom.

The amount of the compound represented by general formula (L-1-6) and contained in the liquid crystal composition is preferably as follows. Specifically, the lower limit of the amount is preferably 1% by mass, 5% by mass, 10% by mass, 15% by mass, 17% by mass, 20% by mass, 23% by mass, 25% by mass, 27% by mass, 30% by mass, or 35% by mass. The upper limit of the amount is preferably 60% by mass, 55% by mass, 50% by mass, 45% by mass, 42% by mass, 40% by mass, 38% by mass, 35% by mass, 33% by mass, or 30% by mass.

The compound represented by general formula (L-1-6) is preferably a compound represented by any of the following formulas (L-1-6.1) to (L-1-6.3).

[Chem. 85]

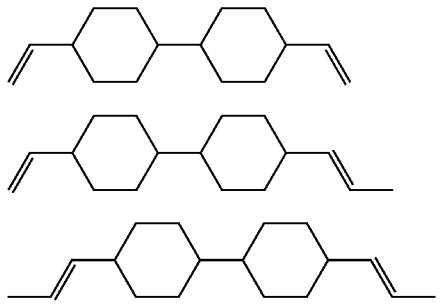
(L-1-6.1)
(L-1-6.2)
(L-1-6.3)

The compound represented by general formula (L-2) is the following compound.

[Chem. 86]

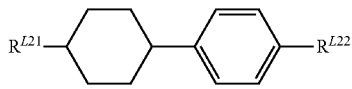
(L-2)

In the above formula, $R^{L21}$ and $R^{L22}$ have the same meanings as $R^{L1}$ and $R^{L2}$, respectively, in general formula (L).

$R^{L21}$ is preferably an alkyl group having 1 to 5 carbon atoms or an alkenyl group having 2 to 5 carbon atoms.

$R^{L22}$ is preferably an alkyl group having 1 to 5 carbon atoms, an alkenyl group having 4 to 5 carbon atoms, or an alkoxy group having 1 to 4 carbon atoms.

One compound represented by general formula (L-2) may be used alone, or a combination of two or more compounds represented by general formula (L-1) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (L-2) and contained in the liquid crystal composition is preferably as follows. Specifically, the lower limit of the amount is preferably 1% by mass, 2% by mass, 3% by mass, 5% by mass, 7% by mass, or 10% by mass. The upper limit of the amount is preferably 20% by mass, 15% by mass, 13% by mass, 10% by mass, 8% by mass, 7% by mass, 6% by mass, 5% by mass, or 3% by mass.

When importance is placed on the low temperature solubility of the liquid crystal molecules, setting the amount of the compound represented by general formula (L-2) to be higher is highly effective. When importance is placed on the response speed of the liquid crystal composition, setting the amount of the compound to be lower is highly effective. To improve droplet marks and image-sticking characteristics, it is preferable to set the amount of the compound represented by general formula (L-2) within an intermediate range between the above ranges.

The compound represented by general formula (L-2) is preferably a compound represented by any of the following formulas (L-2.1) to (L-2.6) and more preferably a compound represented by formula (L-2.1), formula (L-2.3), formula (L-2.4), or formula (L-2.6).

[Chem. 87]

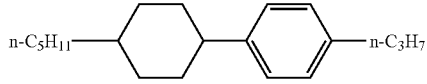
(L-2.1)

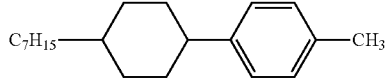
(L-2.2)

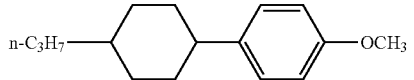
(L-2.3)

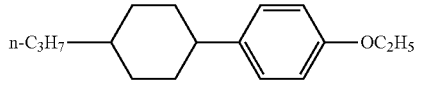
(L-2.4)

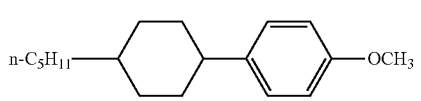
(L-2.5)

(L-2.6)

The compound represented by general formula (L-3) is the following compound.

[Chem. 88]

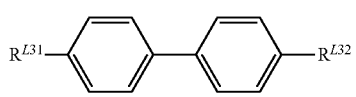
(L-3)

In the above formula, $R^{L31}$ and $R^{L32}$ have the same meanings as $R^{L1}$ and $R^{L2}$, respectively, in general formula (L).

$R^{L31}$ and $R^{L32}$ are each independently preferably an alkyl group having 1 to 5 carbon atoms, an alkenyl group having 4 to 5 carbon atoms, or an alkoxy group having 1 to 4 carbon atoms.

One compound represented by general formula (L-3) may be used alone, or a combination of two or more compounds represented by general formula (L-3) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (L-3) and contained in the liquid crystal composition is preferably as follows. Specifically, the lower limit of the amount is preferably 1% by mass, 2% by mass, 3% by mass, 5% by mass, 7% by mass, or 10% by mass. The upper limit of the amount is preferably 20% by mass, 15% by mass, 13% by mass, 10% by mass, 8% by mass, 7% by mass, 6% by mass, 5% by mass, or 3% by mass.

To obtain high birefringence, setting the amount of the compound represented by general formula (L-3) to be higher is highly effective. When importance is placed on high Tni, setting the amount of the compound to be lower is highly effective. To improve droplet marks and image-sticking characteristics, it is preferable that the amount of the compound represented by general formula (L-3) is set within an intermediate range between the above ranges.

The compound represented by general formula (L-3) is preferably a compound represented by any of the following formulas (L-3.1) to (L-3.4), formula (L-3.6), and formula (L-3.7) and more preferably a compound represented by any of formulas (L-3.2) to (L-3.4), formula (L-3.6), and formula (L-3.7).

[Chem. 89]

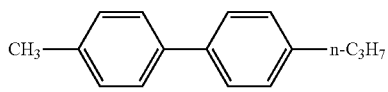
(L-3.1)

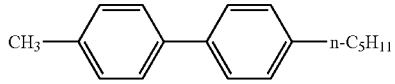
(L-3.2)

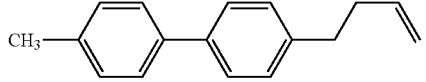
(L-3.3)

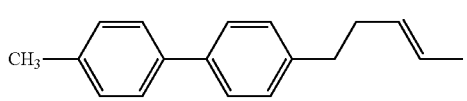
(L-3.4)

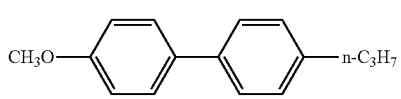
(L-3.6)

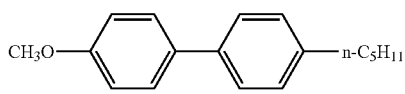
(L-3.7)

The compound represented by general formula (L-4) is the following compound.

[Chem. 90]

(L-4)

In the above formula, $R^{L41}$ and $R^{L42}$ have the same meanings as $R^{L1}$ and $R^{L2}$, respectively, in general formula (L).

$R^{L41}$ is preferably an alkyl group having 1 to 5 carbon atoms or an alkenyl group having 2 to 5 carbon atoms.

$R^{L42}$ is preferably an alkyl group having 1 to 5 carbon atoms, an alkenyl group having 4 to 5 carbon atoms, or an alkoxy group having 1 to 4 carbon atoms.

One compound represented by general formula (L-4) may be used alone, or a combination of two or more compounds represented by general formula (L-4) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (L-4) and contained in the liquid crystal composition is appropriately adjusted according to the desired properties such as low temperature solubility, transition temperature, electrical reliability, birefringence, process compatibility, droplet marks, image-sticking, and dielectric anisotropy.

The lower limit of the amount is preferably 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass. The upper limit of the amount is preferably 50% by mass, 40% by mass, 35% by mass, 30% by mass, 20% by mass, 15% by mass, 10% by mass, or 5% by mass.

The compound represented by general formula (L-4) is preferably a compound represented by any of the following formulas (L-4.1) to (L-4.3).

[Chem. 91]

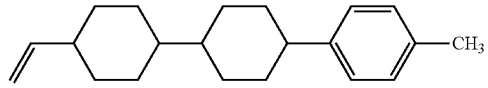
(L-4.1)

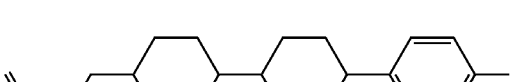
(L-4.2)

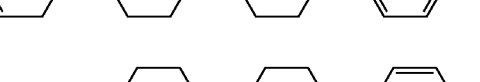
(L-4.3)

In accordance with the desired properties such as low temperature solubility, transition temperature, electrical reliability, and birefringence, the liquid crystal composition may contain only the compound represented by formula (L-4.1), may contain only the compound represented by formula (L-4.2), may contain both the compound represented by formula (L-4.1) and the compound represented by formula (L-4.2), or may contain all the compounds represented by formulas (L-4.1) to (L-4.3).

The compound represented by general formula (L-4) is preferably a compound represented by any of the flowing formulas (L-4.4) to (L-4.6) and more preferably a compound represented by formula (L-4.4).

[Chem. 92]

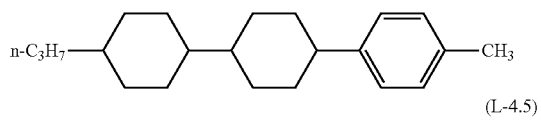

(L-4.4)

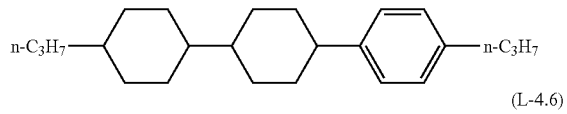

(L-4.5)

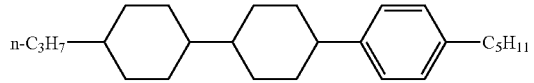

(L-4.6)

In accordance with the desired properties such as low temperature solubility, transition temperature, electrical reliability, and birefringence, the liquid crystal composition may contain only the compound represented by formula (L-4.4), may contain only the compound represented by formula (L-4.5), or may contain both the compounds represented by formula (L-4.4) and formula (L-4.5).

The compound represented by general formula (L-4) is preferably a compound represented by any of the flowing formulas (L-4.7) to (L-4.10) and more preferably a compound represented by formula (L-4.9).

[Chem. 93]

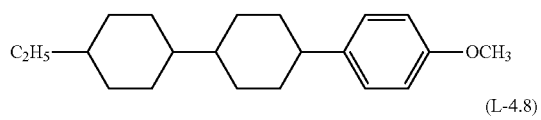

(L-4.7)

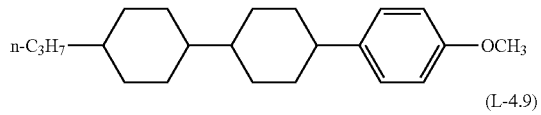

(L-4.8)

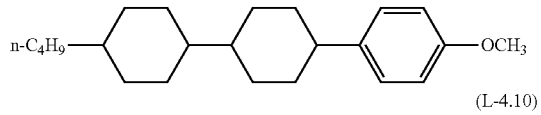

(L-4.9)

(L-4.10)

The compound represented by general formula (L-5) is the following compound.

[Chem. 94]

(L-5)

In the above formula, $R^{L51}$ and $R^{L52}$ have the same meanings as $R^{L1}$ and $R^{L2}$, respectively, in general formula (L).

$R^{L51}$ is preferably an alkyl group having 1 to 5 carbon atoms or an alkenyl group having 2 to 5 carbon atoms.

$R^{L52}$ is preferably an alkyl group having 1 to 5 carbon atoms, an alkenyl group having 4 to 5 carbon atoms, or an alkoxy group having 1 to 4 carbon atoms.

One compound represented by general formula (L-5) may be used alone, or a combination of two or more compounds represented by general formula (L-5) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (L-5) and contained in the liquid crystal composition is appropriately adjusted according to the desired properties such as low temperature solubility, transition temperature, electrical reliability, birefringence, process compatibility, droplet marks, image-sticking, and dielectric anisotropy.

The lower limit of the amount of the compound is preferably 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass. The upper limit of the amount is preferably 50% by mass, 40% by mass, 35% by mass, 30% by mass, 20% by mass, 15% by mass, 10% by mass, or 5% by mass.

The compound represented by general formula (L-5) is preferably a compound represented by the following formula (L-5.1) or formula (L-5.2) and more preferably a compound represented by formula (L-5.1).

[Chem. 95]

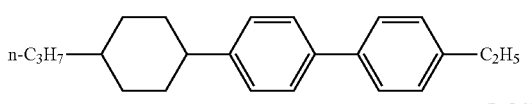

(L-5.1)

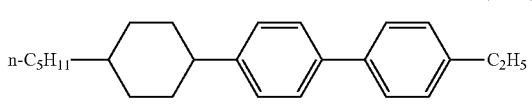

(L-5.2)

The compound represented by general formula (L-5) is also preferably a compound represented by the following formula (L-5.3) or formula (L-5.4).

[Chem. 96]

(L-5.3)

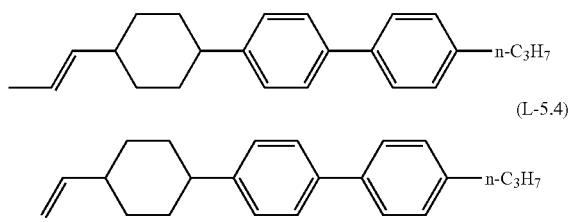

(L-5.4)

The compound represented by general formula (L-5) is also preferably a compound represented by any of the following formulas (L-5.5) to (L-5.7) and more preferably a compound represented by formula (L-5.7).

[Chem. 97]

(L-5.5)

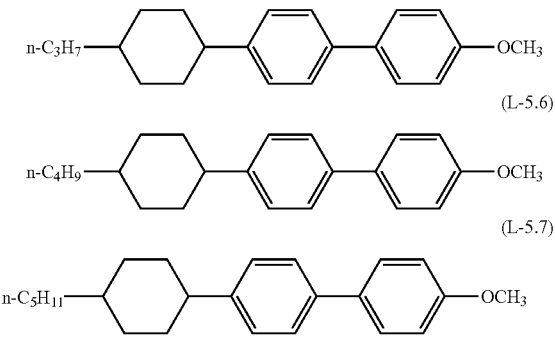

(L-5.6)

(L-5.7)

The compound represented by general formula (L-6) is the following compound.

[Chem. 98]

(L-6)

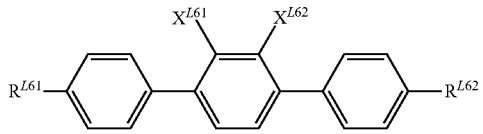

In the above formula, $R^{L61}$ and $R^{L62}$ have the same meanings as $R^{L1}$ and $R^{L2}$, respectively, in general formula (L).

$X^{L61}$ and $X^{L62}$ each independently represent a hydrogen atom or a fluorine atom.

$R^{L61}$ and $R^{L62}$ are each independently preferably an alkyl group having 1 to 5 carbon atoms or an alkenyl group having 2 to 5 carbon atoms.

Preferably, one of $X^{L61}$ and $X^{L62}$ is a fluorine atom, and the other one is a hydrogen atom.

One compound represented by general formula (L-6) may be used alone, or a combination of two or more compounds represented by general formula (L-6) may be used. No particular limitation is imposed on the types of compounds combined, and suitable compounds are selected according to the desired properties such as low temperature solubility, transition temperature, electrical reliability, and birefringence. The number of compounds used is, for example, 1, 2, 3, 4, or 5 or more.

The amount of the compound represented by general formula (L-6) and contained in the liquid crystal composition is preferably as follows. Specifically, the lower limit of the amount is preferably 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass. The upper limit of the amount is preferably 50% by mass, 40% by mass, 35% by mass, 30% by mass, 20% by mass, 15% by mass, 10% by mass, or 5% by mass.

When importance is placed on an increase in Δn, it is preferable to increase the amount of the compound represented by general formula (L-6). When importance is placed on precipitation at low temperature, it is preferable to reduce the amount of the compound.

The compound represented by general formula (L-6) is preferably a compound represented by any of the following formulas (L-6.1) to (L-6.9).

[Chem. 99]

(L-6.1)

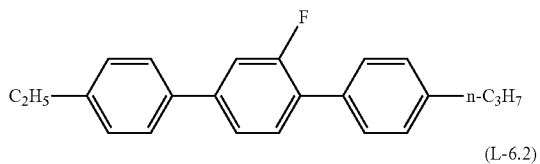

(L-6.2)

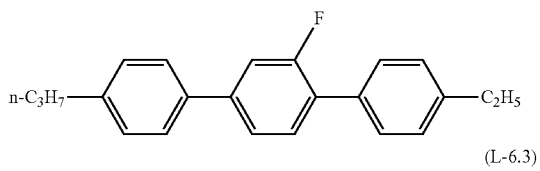

(L-6.3)

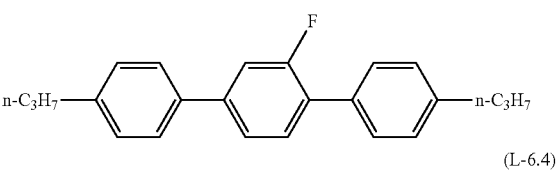

(L-6.4)

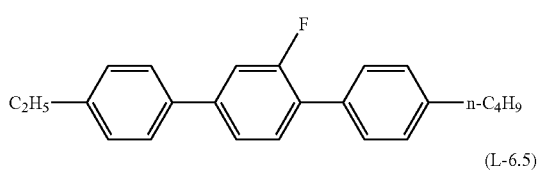

(L-6.5)

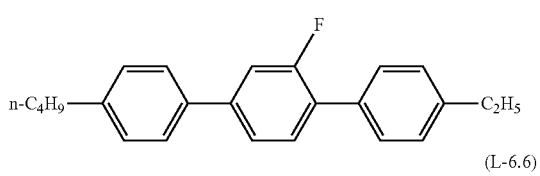

(L-6.6)

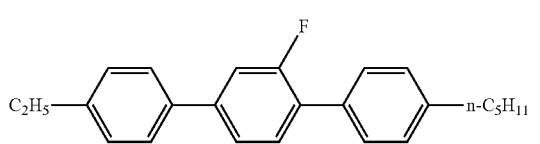

-continued (L-6.7)
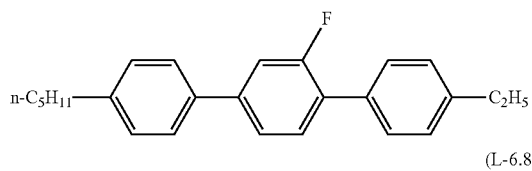

(L-6.8)
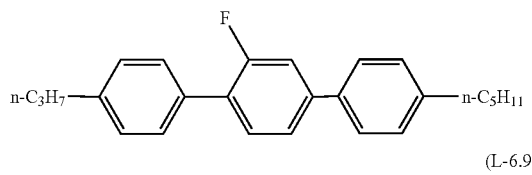

(L-6.9)
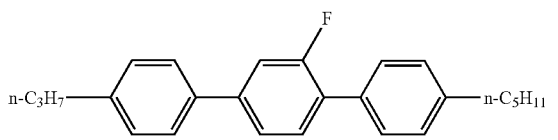

No particular limitation is imposed on the number of compounds combined. However, it is preferable to use one to three compounds, and it is more preferable to use one to four compounds. For example, it is preferable to select and appropriately combine one of the compounds represented by formula (L-6.1) and formula (L-6.2), one of the compounds represented by formula (L-6.4) and formula (L-6.5), one of the compounds represented by formula (L-6.6) and formula (L-6.7), and one of the compounds represented by formula (L-6.8) and formula (L-6.9) because a wide molecular weight distribution of the selected compounds is effective for the solubility. In particular, a combination of compounds represented by formula (L-6.1), formula (L-6.3), formula (L-6.4), formula (L-6.6), and formula (L-6.9) is more preferred.

The compound represented by general formula (L-6) is also preferably a compound represented by any of the following formulas (L-6.10) to (L-6.17) and more preferably a compound represented by formula (L-6.11).

[Chem. 100]

(L-6.10)
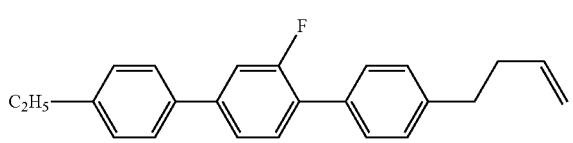

(L-6.11)
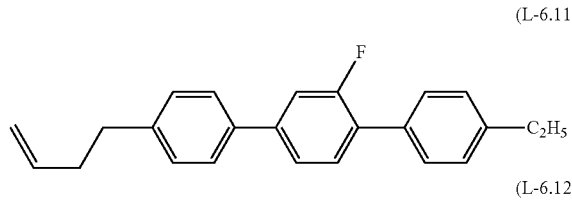

(L-6.12)
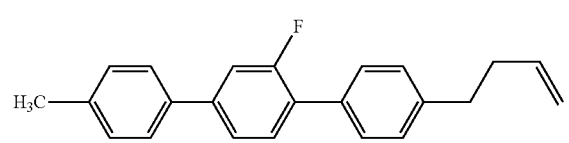

-continued (L-6.13)
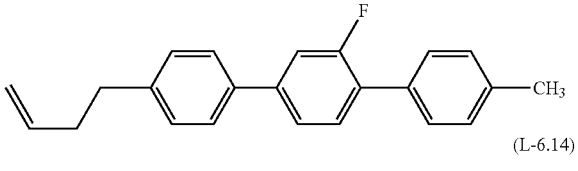

(L-6.14)
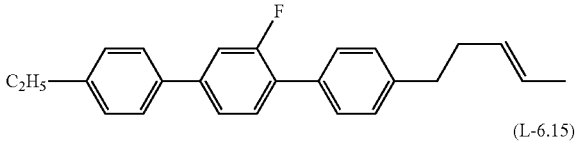

(L-6.15)
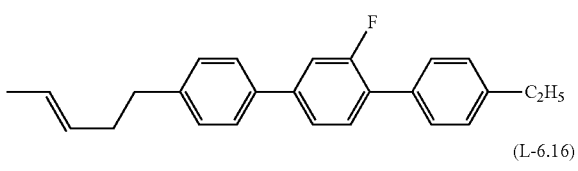

(L-6.16)
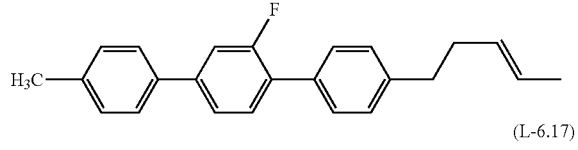

(L-6.17)

The compound represented by general formula (L-7) is the following compound.

[Chem. 101]

(L-7)

$$R^{L71}-\text{cyclohexyl}-A^{L71}-Z^{L71}-\text{phenyl}(X^{L71})(X^{L72})-A^{L72}-R^{L72}$$

In the above formula, $R^{L71}$ and $R^{L72}$ have the same meanings as $R^{L1}$ and $R^{L2}$, respectively, in general formula (L).

$A^{L71}$ and $A^{L72}$ have the same meanings as $A^{L2}$ and $A^{L3}$, respectively, in general formula (L). Any hydrogen atom present in $A^{L71}$ and $A^{L72}$ may be replaced with a fluorine atom.

$Z^{L71}$ has the same meaning as $Z^{L2}$ in general formula (L).

$X^{L71}$ and $X^{L72}$ each independently represent a fluorine atom or a hydrogen atom.

In the above formula, $R^{L71}$ and $R^{L72}$ are each independently preferably an alkyl group having 1 to 5 carbon atoms, an alkenyl group having 2 to 5 carbon atoms, or an alkoxy group having 1 to 4 carbon atoms.

$A^{L71}$ and $A^{L72}$ are each independently preferably a 1,4-cyclohexylene group or a 1,4-phenylene group. Any hydrogen atom present in $A^{L71}$ and $A^{L72}$ may be replaced with a hydrogen atom or a fluorine atom.

$Z^{L71}$ is preferably a single bond or COO— and more preferably a single bond.

$X^{L71}$ and $X^{L72}$ are each preferably a hydrogen atom.

No particular limitation is imposed on the types of compounds combined, and suitable compounds are selected according to the desired properties such as low temperature solubility, transition temperature, electrical reliability, and birefringence. The number of compounds used is 1, 2, 3, or 4.

The amount of the compound represented by general formula (L-7) and contained in the liquid crystal composition is appropriately adjusted according to the desired properties such as low temperature solubility, transition temperature, electrical reliability, birefringence, process compatibility, droplet marks, image-sticking, and dielectric anisotropy.

The lower limit of the amount of the compound is preferably 1% by mass, 2% by mass, 3% by mass, 5% by mass, 7% by mass, 10% by mass, 14% by mass, 16% by mass, or 20% by mass. The upper limit of the amount is preferably 30% by mass, 25% by mass, 23% by mass, 20% by mass, 18% by mass, 15% by mass, 10% by mass, or 5% by mass.

When the liquid crystal composition is required to have high Tni, it is preferable to increase the amount of the compound represented by general formula (L-7). When low viscosity is desired, it is preferable to reduce the amount of the compound.

The compound represented by general formula (L-7) is preferably a compound represented by any of the following formulas (L-7.1) to (L-7.4) and more preferably a compound represented by formula (L-7.2).

[Chem. 102]

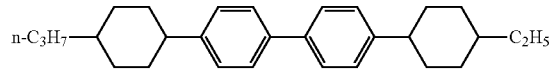
(L-7.1)

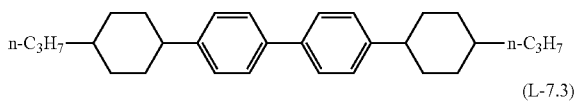
(L-7.2)

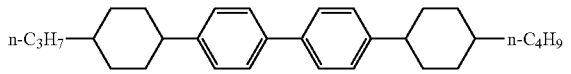
(L-7.3)

(L-7.4)

The compound represented by general formula (L-7) is also preferably a compound represented by any of the following formulas (L-7.11) to (L-7.13) and more preferably a compound represented by formula (L-7.11).

[Chem. 103]

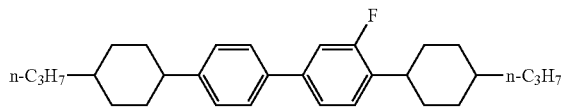
(L-7.11)

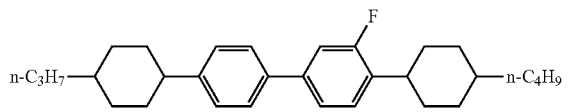
(L-7.12)

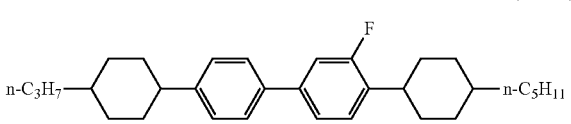
(L-7.13)

The compound represented by general formula (L-7) is also preferably a compound represented by any of the following formulas (L-7.21) to (L-7.23) and more preferably a compound represented by formula (L-7.21).

[Chem. 104]

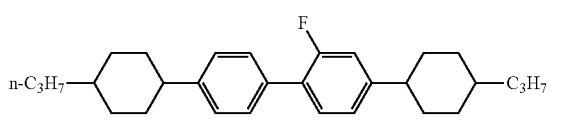
(L-7.21)

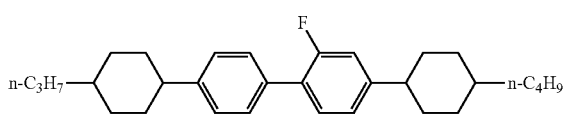
(L-7.22)

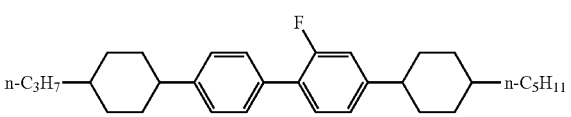
(L-7.23)

The compound represented by general formula (L-7) is also preferably a compound represented by any of the following formulas (L-7.31) to (L-7.34) and more preferably a compound represented by formula (L-7.31) or formula (L-7.32).

[Chem. 105]

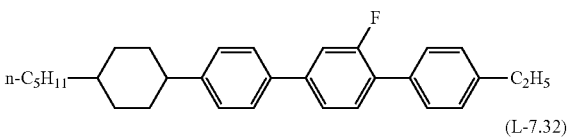
(L-7.31)

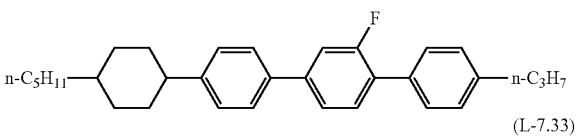
(L-7.32)

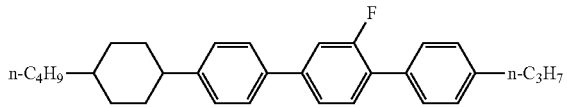
(L-7.33)

-continued (L-7.34)
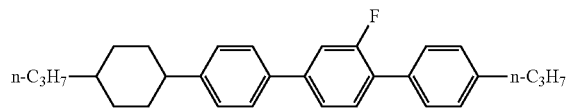

The compound represented by general formula (L-7) is also preferably a compound represented by any of the following formulas (L-7.41) to (L-7.44) and more preferably a compound represented by formula (L-7.41) or formula (L-7.42).

[Chem. 106]

(L-7.41)
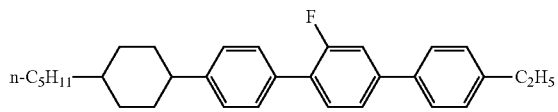

[Chem. 107]

-continued (L-7.42)
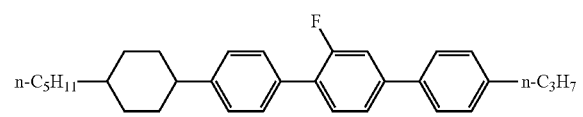

(L-7.43)

(L-7.44)
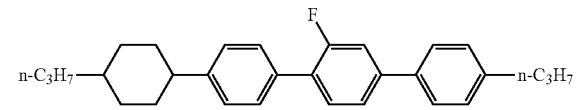

The compound represented by general formula (L-7) is also preferably a compound represented by any of the following formulas (L-7.51) to (L-7.53).

(L-7.51)
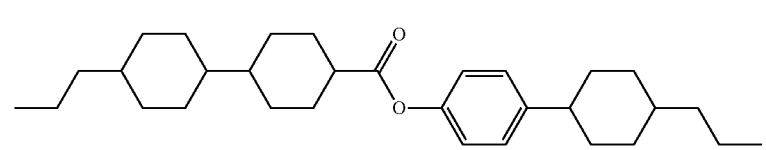

(L-7.52)
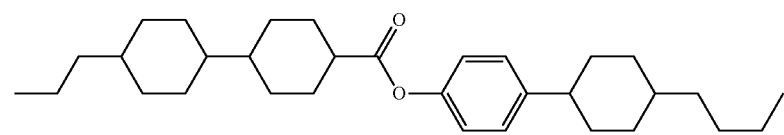

(L-7.53)
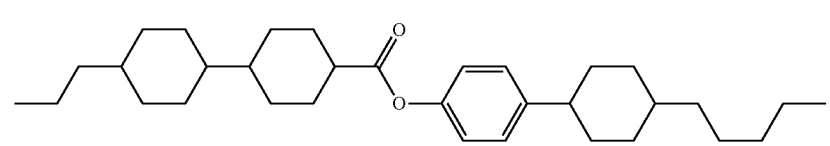

((Polymerizable Compound))

The liquid crystal composition may further contain a polymerizable compound that can be polymerized by irradiation with active energy rays. The polymerizable compound is preferably a compound represented by the following general formula (P). Preferably, the liquid crystal composition contains one or two or more polymerizable compounds represented by the following general formula (P).

[Chem. 108]

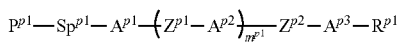
(P)

In the above formula, $R^{p1}$ represents a hydrogen atom, a fluorine atom, a cyano group, an alkyl group having 1 to 15 carbon atoms, or -$Sp^{p2}$-$P^{p2}$. One —$CH_2$— group or two or more non-adjacent —$CH_2$— groups in the alkyl group may be each independently replaced with —CH=CH—, —C≡C—, —O—, —CO—, —COO—, or —OCO—. One or two or more hydrogen atoms in the alkyl group may be each independently replaced with a cyano group, a fluorine atom, or a chlorine atom.

$P^{p1}$ and $P^{p2}$ each independently represent any of the following general formula ($P^{p1}$-1) to formula ($P^{p1}$-9).

[Chem. 109]

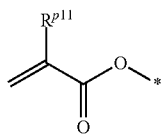
($P^{p1}$-1)

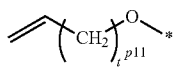
($P^{p1}$-2)

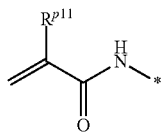
($P^{p1}$-3)

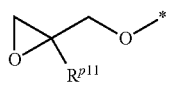
($P^{p1}$-4)

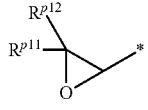
($P^{p1}$-5)

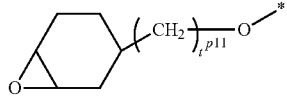
($P^{p1}$-6)

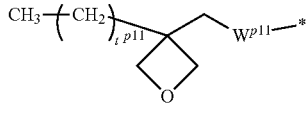
($P^{p1}$-7)

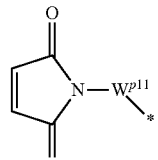
($P^{p1}$-8)

HS—* ($P^{p1}$-9)

(In the above formulas, $R^{p11}$ and $R^{p12}$ each independently represent a hydrogen atom, an alkyl group having 1 to 5 carbon atoms, or a halogenated alkyl group having 1 to 5 carbon atoms; $W^{p11}$ represents a single bond, —O—, —COO—, or a methylene group; $t^{p11}$ represents 0, 1, or 2; when a plurality of $R^{p11}$s, a plurality of $R^{p12}$s, a plurality of $W^{p11}$s and/or a plurality of $t^{p11}$s are present, they may be the same or different.)

$Sp^{p1}$ and $Sp^{p2}$ each independently represent a single bond or a spacer group.

$Z^{p1}$ and $Z^{p2}$ each independently represent a single bond, —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —$OCH_2CH_2O$—, —CO—$NR^{ZP1}$—, —$NR^{ZP1}$—CO—, —$SCH_2$—, —$CH_2S$—, —CH=$CR^{ZP1}$—COO—, —CH=$CR^{ZP1}$—OCO—, —COO—$CR^{ZP1}$=CH—, —OCO—$CR^{ZP1}$=CH—, —COO—$CR^{ZP1}$=CH—COO—, —COO—$CR^{ZP1}$=CH—OCO—, —OCO—$CR^{ZP1}$=CH—COO—, —OCO—$CR^{ZP1}$=CH—OCO—, —$(CH_2)_2$—COO—, —$(CH_2)_2$—OCO—, —OCO—$(CH_2)_2$—, —(C=O)—O—$(CH_2)_2$—, —CH=CH—, —CF=CF—, —CF=CH—, —CH=CF—, —$CF_2$—, —$CF_2O$—, —$OCF_2$—, —$CF_2CH_2$—, —$CH_2CF_2$—, —$CF_2CF_2$—, or —C≡C— (wherein $R^{ZP1}$s each independently represent a hydrogen atom or an alkyl group having 1 to 4 carbon atoms; and when a plurality of $R^{ZP1}$s are present in one molecule, they may be the same or different).

$A^{p1}$, $A^{p2}$, and $A^{p3}$ each independently represent a group selected from the group consisting of ($a^P$) a 1,4-cyclohexylene group (one —$CH_2$— group or two or more non-adjacent —$CH_2$— groups present in this group may be replaced with —O—)

($b^P$) a 1,4-phenylene group (one —CH= group or two or more non-adjacent —CH= group present in this group may be replaced with —N=), and ($c^P$) a naphthalene-2,6-diyl group, a 1,2,3,4-tetrahydronaphthalene-2,6-diyl group, a decahydronaphthalene-2,6-diyl group, a phenanthrene-2,7-diyl group, or an anthracene-2,6-diyl group (one —CH= group or two or more non-adjacent —CH= groups present in these groups may each be replaced with —N=, and any hydrogen atom present in these groups may be replaced with a halogen atom, an alkyl group having 1 to 8 carbon atoms, or an alkenyl group having 1 to 8 carbon atoms). The group ($a^P$), the group ($b^P$), and the group ($c^P$) may be each independently substituted with an alkyl group having 1 to 8 carbon atoms, an alkenyl group having 1 to 8 carbon atoms, a cyano group, a fluorine atom, a chlorine atom, or -$Sp^{p2}$-$P^{p2}$.

$m^{p1}$ represents 0, 1, 2, or 3.

When a plurality of $Z^{p1}$s, a plurality of $A^{p2}$s, a plurality of $Sp^{p2}$s, and/or a plurality of $P^{p2}$ are present in one molecule, they may be the same or different. When $m^{p1}$ is 0 and $A^{p1}$ is a phenanthrene-2,7-diyl group or an anthracene-2,6-diyl group, $A^{p3}$ represents a single bond.

The alignment aid is excluded from the polymerizable compound.

$R^{p1}$ is preferably $-Sp^{p2}-P^{p2}$.

$P^{p1}$ and $P^{p2}$ are each independently preferably one of formula ($P^{p1}$-1) to formula ($P^{p1}$-3) and more preferably ($P^{p1}$-1).

$R^{p11}$ and $R^{p12}$ are each independently preferably a hydrogen atom or a methyl group.

$t^{p11}$ is preferably 0 or 1.

$W^{p11}$ is preferably a single bond, a methylene group, or an ethylene group.

$m^{p1}$ is preferably 0, 1, or 2 and preferably 0 or 1.

$Z^{p1}$ and $Z^{p2}$ are each independently preferably a single bond, —OCH$_2$—, —CH$_2$O—, —CO—, —C$_2$H$_4$—, —COO—, —OCO—, —COOC$_2$H$_4$—, —OCOC$_2$H$_4$—, —C$_2$H$_4$OCO—, —C$_2$H$_4$COO—, —CH═CH—, —CF$_2$—, —CF$_2$O—, —(CH$_2$)$_2$—COO—, —(CH$_2$)$_2$—OCO—, —OCO—(CH$_2$)$_2$—, —CH═CH—COO—, —COO—CH═CH—, —OCOCH═CH—, —COO—(CH$_2$)$_2$—, —OCF$_2$—, or —C≡C— and more preferably a single bond, —OCH$_2$—, —CH$_2$O—, —C$_2$H$_4$—, —COO—, —OCO—, —COOC$_2$H$_4$—, —OCOC$_2$H$_4$—, —C$_2$H$_4$OCO—, —C$_2$H$_4$COO—, —CH═CH—, —(CH$_2$)$_2$—COO—, —(CH$_2$)$_2$—OCO—, —OCO—(CH$_2$)$_2$—, —CH═CH—COO—, —COO—CH═CH—, —OCOCH═CH—, —COO—(CH$_2$)$_2$—, or —C≡C—.

Preferably, only one of $Z^{p1}$(s) and $Z^{p2}$ present in one molecule is —OCH$_2$—, —CH$_2$O—, —C$_2$H$_4$—, —COO—, —OCO—, —COOC$_2$H$_4$—, —OCOC$_2$H$_4$—, —C$_2$H$_4$OCO—, —C$_2$H$_4$COO—, —CH═CH—, —(CH$_2$)$_2$—COO—, —(CH$_2$)$_2$—OCO—, —OCO—(CH$_2$)$_2$—, —CH═CH—COO—, —COO—CH═CH—, —OCOCH═CH—, —COO—(CH$_2$)$_2$—, or —C≡C—, and the rest are each a single bond. More preferably, only one of $Z^{p1}$(s) and $Z^{p2}$ present in one molecule is —OCH$_2$—, —CH$_2$O—, —C$_2$H$_4$—, —COO—, or —OCO—, and the rest are each a single bond. Still more preferably, all of $Z^{p1}$(s) and $Z^{p2}$ present in one molecule are each a single bond.

Preferably, only one of $Z^{p1}$(s) and $Z^{p2}$ present in one molecule is a linking group selected from the group consisting of —CH═CH—COO—, —COO—CH═CH—, —(CH$_2$)$_2$—COO—, —(CH$_2$)$_2$—OCO—, —O—CO—(CH$_2$)$_2$—, and —COO—(CH$_2$)$_2$—, and the rest are each a single bond.

$Sp^{p1}$ and $Sp^{p2}$ each independently represent a single bond or a spacer group, and the spacer group is preferably an alkylene group having 1 to 30 carbon atoms. Any —CH$_2$— group in the alkylene group may be replaced with —O—, —CO—, —COO—, —OCO—, —CH═CH—, or —C≡C— so long as oxygen atoms are not directly linked to each other, and any hydrogen atom in the alkylene group may be replaced with a halogen atom.

In particular, $Sp^{p1}$ and $Sp^{p2}$ are each independently preferably a linear alkylene group having 1 to 10 carbon atoms or a single bond.

$A^{p1}$, $A^{p2}$, and $A^{p3}$ are each independently preferably a 1,4-phenylene group or a 1,4-cyclohexylene group and more preferably a 1,4-phenylene group.

To improve the compatibility with the liquid crystal molecules (liquid crystal compound), it is preferable that the 1,4-phenylene group is substituted with one fluorine atom, one methyl group, or one methoxy group.

The total content of the compounds represented by general formula (P) relative to the liquid crystal composition is preferably 0.05 to 10% by mass, more preferably 0.1 to 8% by mass, still more preferably 0.1 to 5% by mass, yet more preferably 0.1 to 3% by mass, even more preferably 0.2 to 2% by mass, yet even more preferably 0.2 to 1.3% by mass, particularly preferably 0.2 to 1% by mass, and most preferably 0.2 to 0.56% by mass.

The lower limit of the total content of the compounds represented by general formula (P) relative to the liquid crystal composition is preferably 0.01% by mass, 0.03% by mass, 0.05% by mass, 0.08% by mass, 0.1% by mass, 0.15% by mass, 0.2% by mass, 0.25% by mass, or 0.3% by mass.

The upper limit of the total content of the compounds represented by general formula (P) relative to the liquid crystal composition is preferably 10% by mass, 8% by mass, 5% by mass, 3% by mass, 1.5% by mass, 1.2% by mass, 1% by mass, 0.8% by mass, or 0.5% by mass.

If the content of the compounds represented by general formula (P) is small, the effect of these compounds added to the liquid crystal composition tends not to be obtained. For example, problems such as weak anchoring force of the liquid crystal molecules and a reduction in the anchoring force over time may occur depending on the type of liquid crystal molecules, the type of alignment aid, etc. If the content of the compounds represented by general formula (P) is excessively large, problems such as an increase in the amount of the compounds remaining present after curing, an increase in curing time, and a reduction in the reliability of the liquid crystal composition may occur depending on, for example, the illuminance of active energy rays. It is therefore preferable to set the content in consideration of the balance between them.

The total content of the compound represented by general formula (SAL) (the alignment aid that is a compound containing an adsorptive group $Z^{AT1}$) and the compound represented by general formula (P) relative to the liquid crystal composition is preferably 0.05 to 10% by mass, preferably 0.1 to 8% by mass, preferably 0.1 to 5% by mass, preferably 0.1 to 3% by mass, preferably 0.2 to 2% by mass, preferably 0.2 to 1.3% by mass, preferably 0.2 to 1% by mass, and preferably 0.2 to 0.56% by mass.

The lower limit of the total content of the compound represented by general formula (SAL) and the compound represented by general formula (P) relative to the liquid crystal composition is preferably 0.01% by mass, 0.03% by mass, 0.05% by mass, 0.08% by mass, 0.1% by mass, 0.15% by mass, 0.2% by mass, 0.25% by mass, or 0.3% by mass.

The upper limit of the total content of the compound represented by general formula (SAL) and the compound represented by general formula (P) relative to the liquid crystal composition is preferably 10% by mass, 8% by mass, 5% by mass, 3% by mass, 1.5% by mass, 1.2% by mass, 1% by mass, 0.8% by mass, or 0.5% by mass.

If the total content of the compound represented by general formula (SAL) and the compound represented by general formula (P) is small, the effect of these compounds added to the liquid crystal composition tends not to be obtained. For example, problems such as weak anchoring force of the liquid crystal molecules and a reduction in the anchoring force over time may occur depending on the type of liquid crystal molecules etc. If the total content of the compound represented by general formula (SAL) and the compound represented by general formula (P) is excessively large, problems such as an increase in the amount of the compounds remaining present after curing, an increase in curing time, and a reduction in the reliability of the liquid crystal composition may occur depending on, for example, the illuminance of active energy rays. It is therefore preferable to set the contents in consideration of the balance between them.

Preferred examples of the compound represented by general formula (P) include polymerizable compounds represented by the following formula (P-1-1) to formula (P-1-46).
[Chem. 110]
(P-1-1)
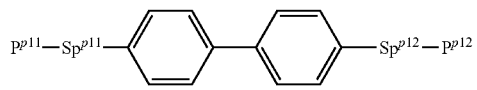
(P-1-2)
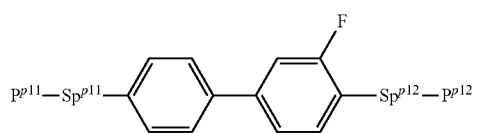
(P-1-3)
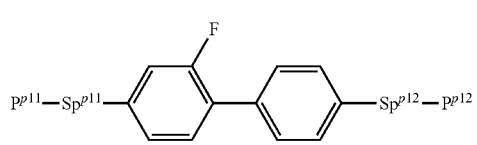
(P-1-4)
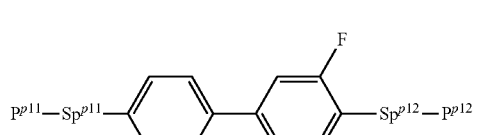
(P-1-5)
(P-1-6)
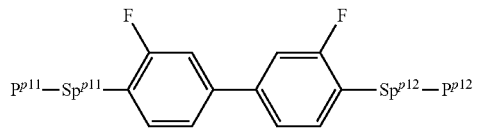
(P-1-7)
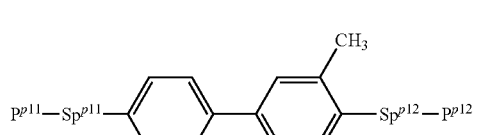
(P-1-8)
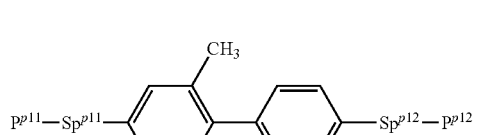
(P-1-9)
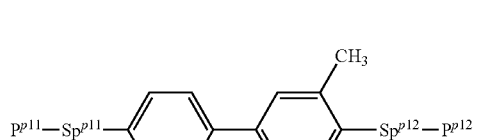
[Chem. 111]
(P-1-10)
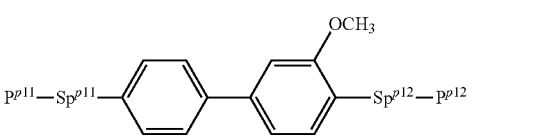
(P-1-11)
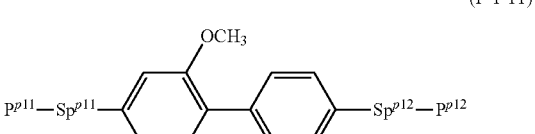
(P-1-12)
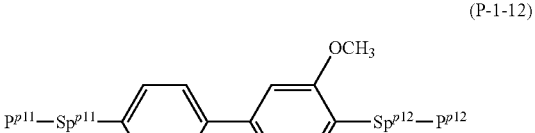
(P-1-13)
[Chem. 112]
(P-1-14)
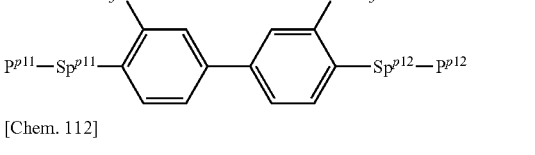
[Chem. 113]
(P-1-21)
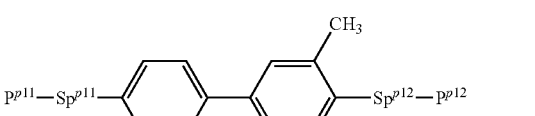
(P-1-22)
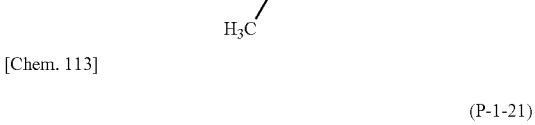
(P-1-23)
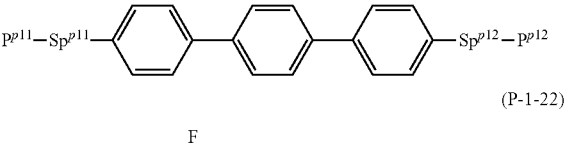
(P-1-24)
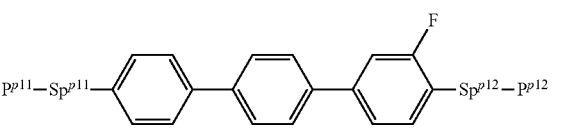

(P-1-25)
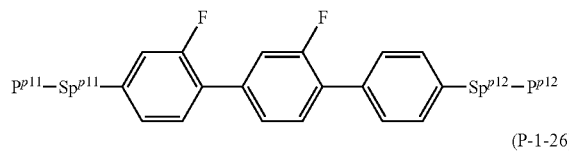
(P-1-26)
(P-1-27)
[Chem. 114]
(P-1-32)
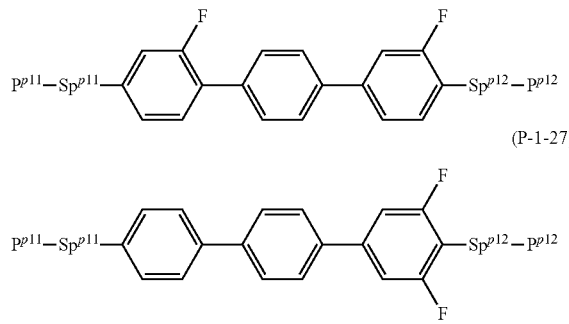
[Chem. 115]
(P-1-41)
(P-1-42)
(P-1-43)
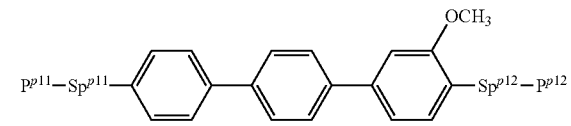
(P-1-44)
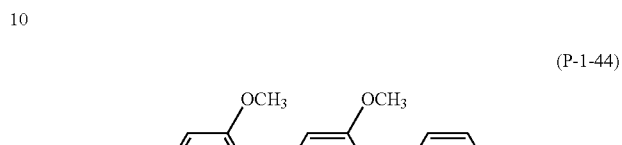
(P-1-45)
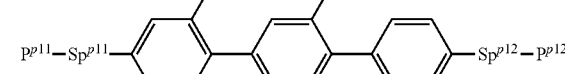
(P-1-46)
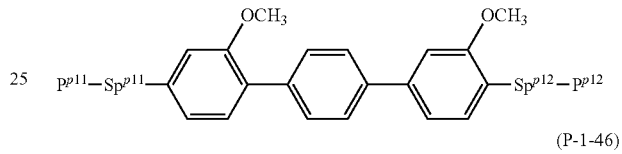
In the above formulas, $P^{p11}$, $P^{p12}$, $Sp^{p11}$, and $Sp^{p12}$ have the same meanings as $P^{p1}$, $P^{p2}$, $Sp^{p1}$ and $Sp^{p2}$, respectively, in general formula (P).
Other preferred examples of the compound represented by general formula (P) include polymerizable compounds represented by the following formula (P-2-1) to formula (P-2-12).
[Chem. 116]
(P-2-1)
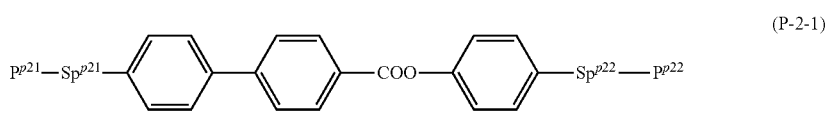
(P-2-2)
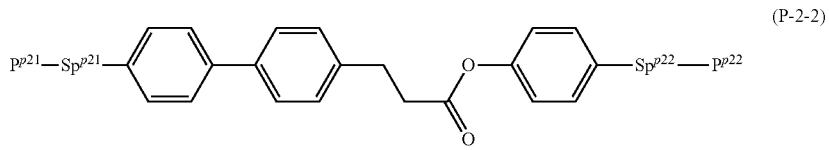
(P-2-3)
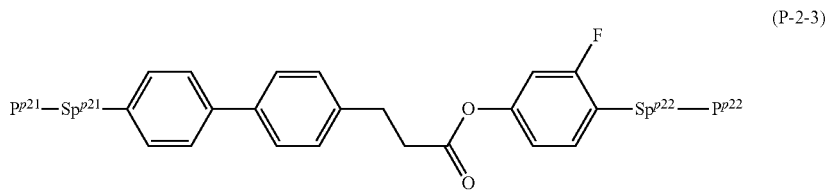

(P-2-4)
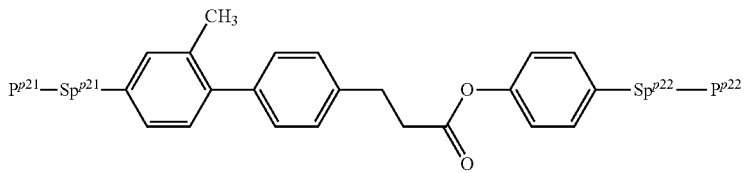
(P-2-5)
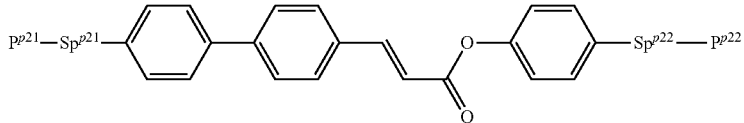
(P-2-6)
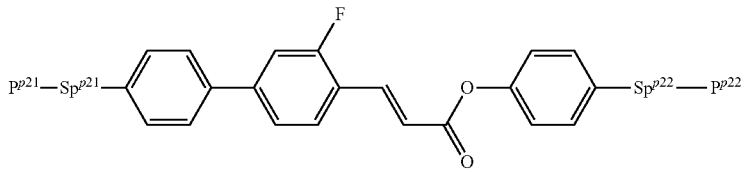
(P-2-7)
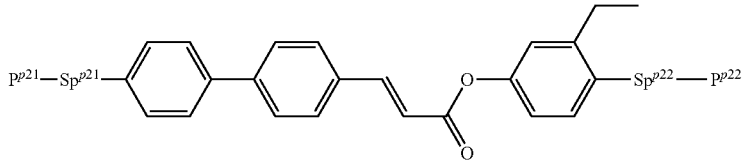
(P-2-8)
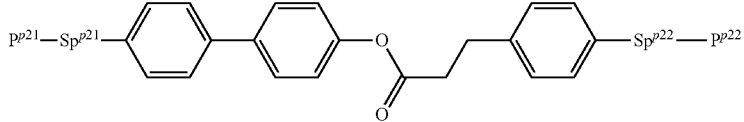
(P-2-9)
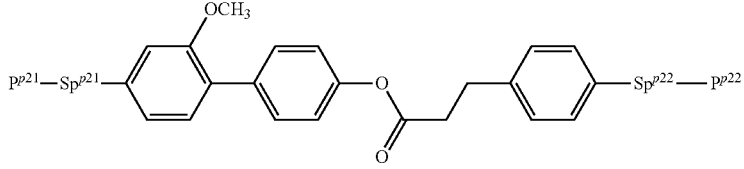
(P-2-10)
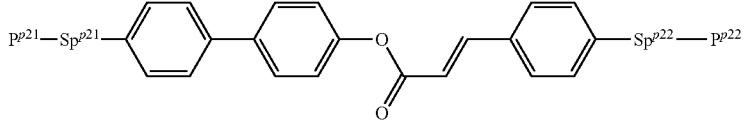
(P-2-11)
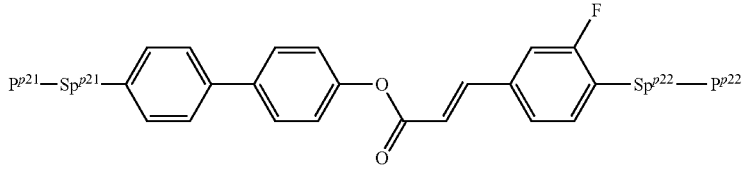
(P-2-12)
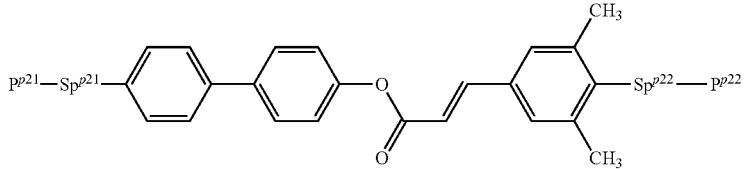

In the above formulas, $P^{p21}$, $P^{p22}$, $Sp^{p21}$, and $Sp^{p22}$ have the same meanings as $P^{p1}$, $P^{p2}$, $Sp^{p1}$, and $Sp^{p2}$, respectively, in general formula (P).

Other preferred examples of the compound represented by general formula (P) include polymerizable compounds represented by the following formula (P-3-1) to formula (P-3-15).

[Chem. 117]

(P-3-1)

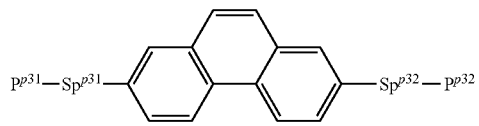

(P-3-2)

(P-3-3)

(P-3-4)

(P-3-5)

(P-3-6)

(P-3-7)

(P-3-8)

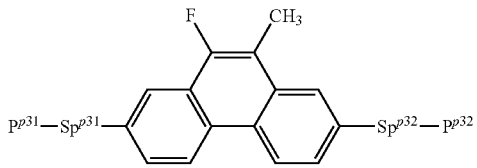

(P-3-9)

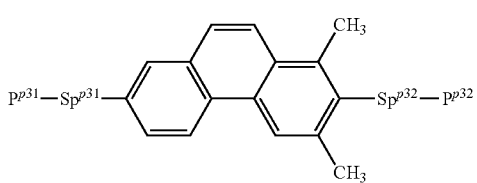

[Chem. 118]

(P-3-11)

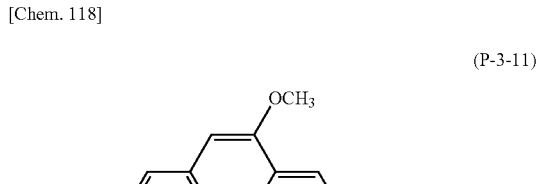

(P-3-12)

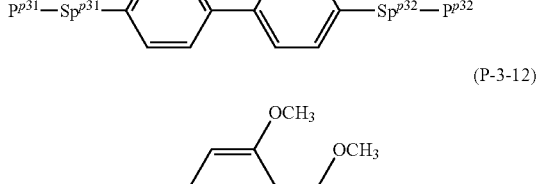

(P-3-13)

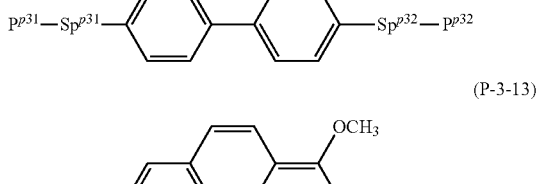

(P-3-14)

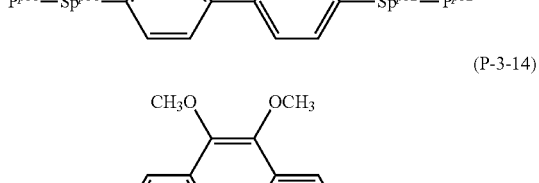

(P-3-15)

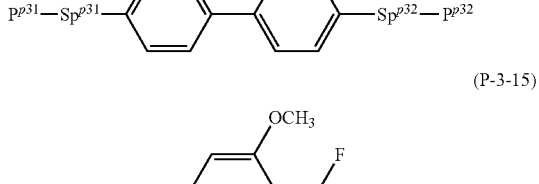

In the above formulas, $P^{p31}$, $P^{p32}$, $Sp^{p31}$, and $Sp^{p32}$ have the same meanings as $P^{p1}$, $P^{p2}$, $Sp^{p1}$, and $Sp^{p2}$, respectively, in general formula (P).

Other preferred examples of the compound represented by general formula (P) include polymerizable compounds represented by the following formula (P-4-1) to formula (P-4-19).

[Chem. 119]
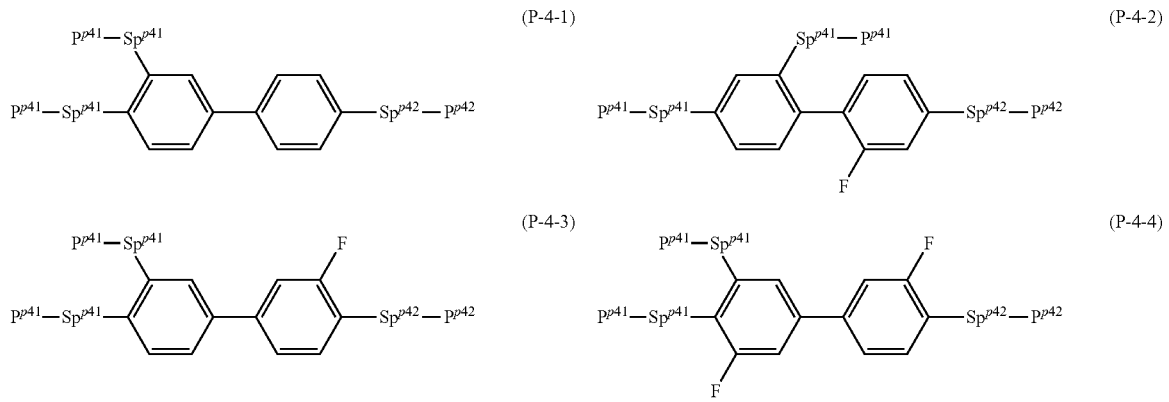
[Chem. 120]
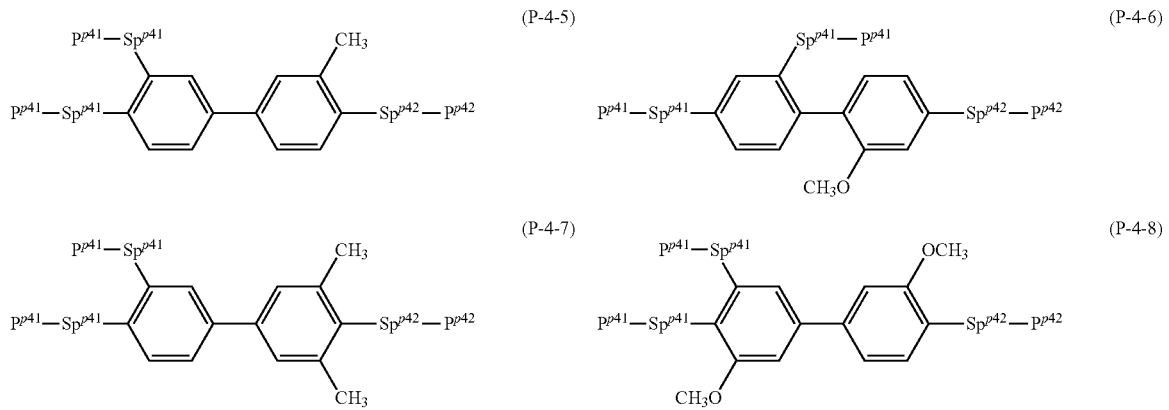
[Chem. 121]
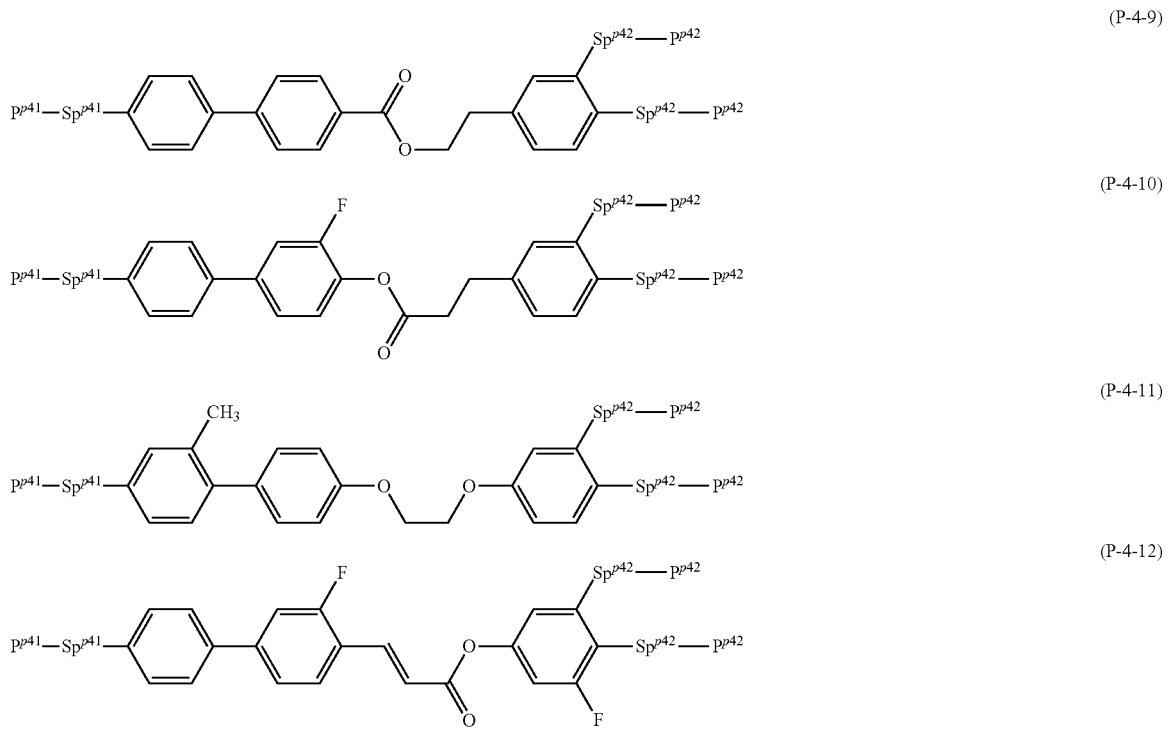

-continued

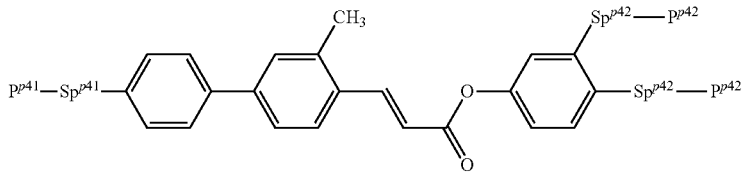
(P-4-13)

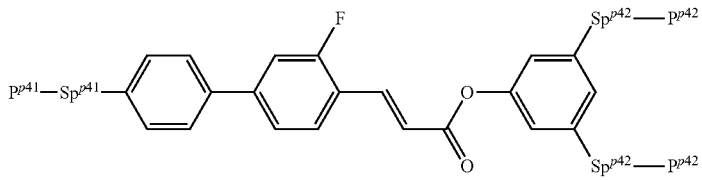
(P-4-14)

[Chem. 122]

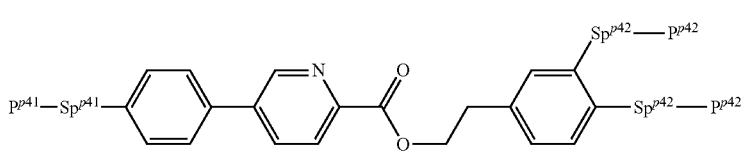
(P-4-15)

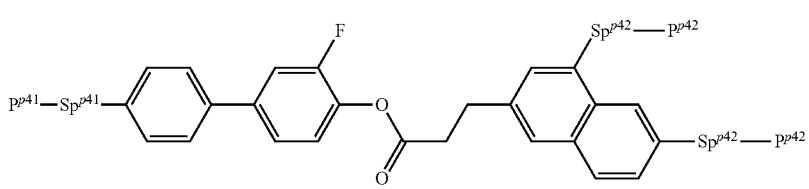
(P-4-16)

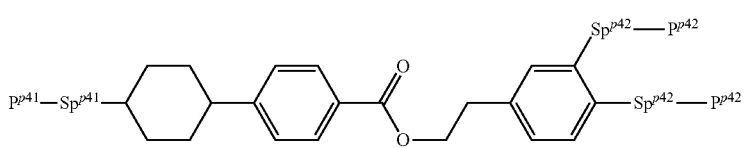
(P-4-17)

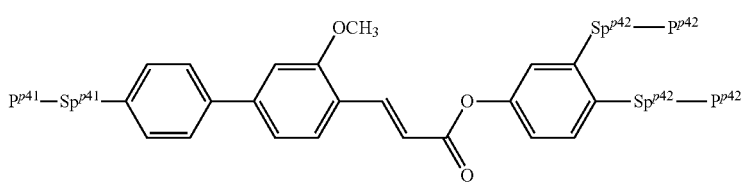
(P-4-18)

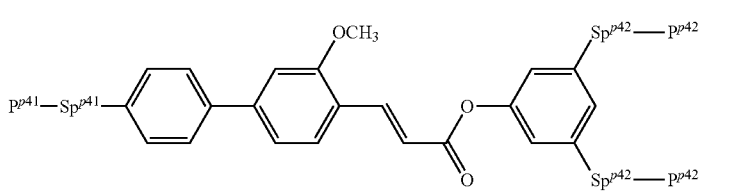
(P-4-19)

In the above formulas, $P^{p41}$, $P^{p42}$, $Sp^{p41}$, and $Sp^{p42}$ have the same meanings as $P^{p1}$, $P^{p2}$, $Sp^{p1}$, and $Sp^{p2}$, respectively, in general formula (P).

When the liquid crystal composition contains the polymerizable compound in addition to the alignment aid, the pretilt angle of the liquid crystal molecules can be formed preferably.

Preferably, the liquid crystal composition does not contain a compound that has, in its molecule, a structure such as a peracid (—CO—OO—) structure in which oxygen atoms are bonded to each other.

When importance is placed on the reliability and long-term stability of the liquid crystal composition, the amount of a compound having a carbonyl group and contained in the liquid crystal composition is preferably 5% by mass or less, more preferably 3% by mass or less, still more preferably 1% by mass or less, and particularly preferably substantially 0% by mass.

When importance is placed on the UV radiation stability of the liquid crystal composition, the amount of a chlorine-substituted compound contained in the liquid crystal composition is preferably 15% by mass or less, more preferably 10% by mass or less, still more preferably 8% by mass or less, yet more preferably 5% by mass or less, even more preferably 3% by mass or less, and particularly preferably substantially 0% by mass.

Preferably, the liquid crystal composition contains an increased amount of a compound in which all ring structures in its molecule are 6-membered rings. Specifically, the amount of such a compound is preferably 80% by mass or more, more preferably 90% by mass or more, still more preferably 95% by mass or more, and particularly preferably substantially 100% by mass.

To prevent deterioration of the liquid crystal composition by oxidation, it is preferable that the liquid crystal composition contains a reduced amount of a compound having a cyclohezenylene group as a ring structure. Specifically, the amount of such a compound is preferably 10% by mass or less, preferably 8% by mass or less, more preferably 5% by mass or less, still more preferably 3% by mass or less, and particularly preferably substantially 0% by mass.

When importance is placed on an improvement in the viscosity of the liquid crystal composition and an improvement in its Tni, it is preferable that the liquid crystal composition contains a reduced amount of a compound having, in its molecule, a 2-methylbenzene-1,4-diyl group in which any hydrogen atom is optionally replaced with a halogen. Specifically, the amount of such a compound is preferably 10% by mass or less, more preferably 8% by mass or less, still more preferably 5% by mass or less, particularly preferably 3% by mass or less, and most preferably substantially 0% by mass.

In the present description, the phrase "the amount of compound X contained in the liquid crystal composition is substantially 0% by mass" means that the amount of compound X unintendedly (inevitably) contained in the liquid crystal composition is allowable.

The lower limit of the average elastic constant ($K_{AVG}$) of the liquid crystal composition is preferably 10, 10.5, 11, 11.5, 12, 12.3, 12.5, 12.8, 13, 13.3, 13.5, 13.8, 14, 14.3, 14.5, 14.8, 15, 15.3, 15.5, 15.8, 16, 16.3, 16.5, 16.8, 17, 17.3, 17.5, 17.8, or 18. The upper limit is preferably 25, 24.5, 24, 23.5, 23, 22.8, 22.5, 22.3, 22, 21.8, 21.5, 21.3, 21, 20.8, 20.5, 20.3, 20, 19.8, 19.5, 19.3, 19, 18.8, 18.5, 18.3, 18, 17.8, 17.5, 17.3, or 17.

When importance is placed on a reduction in the power consumption of the liquid crystal display device, reducing the amount of light from a backlight is effective. Since it is preferable to improve the light transmittance of the liquid crystal display device, it is preferable to set the $K_{AVG}$ value to be low. When importance is placed on an improvement in the response speed of the liquid crystal display device (liquid crystal composition), it is preferable to set the $K_{AVG}$ value to be high.

(Liquid Crystal Display Device)

Next, a description will be given of a liquid crystal display device including a liquid crystal layer formed from the above-described liquid crystal composition.

Figure 2:
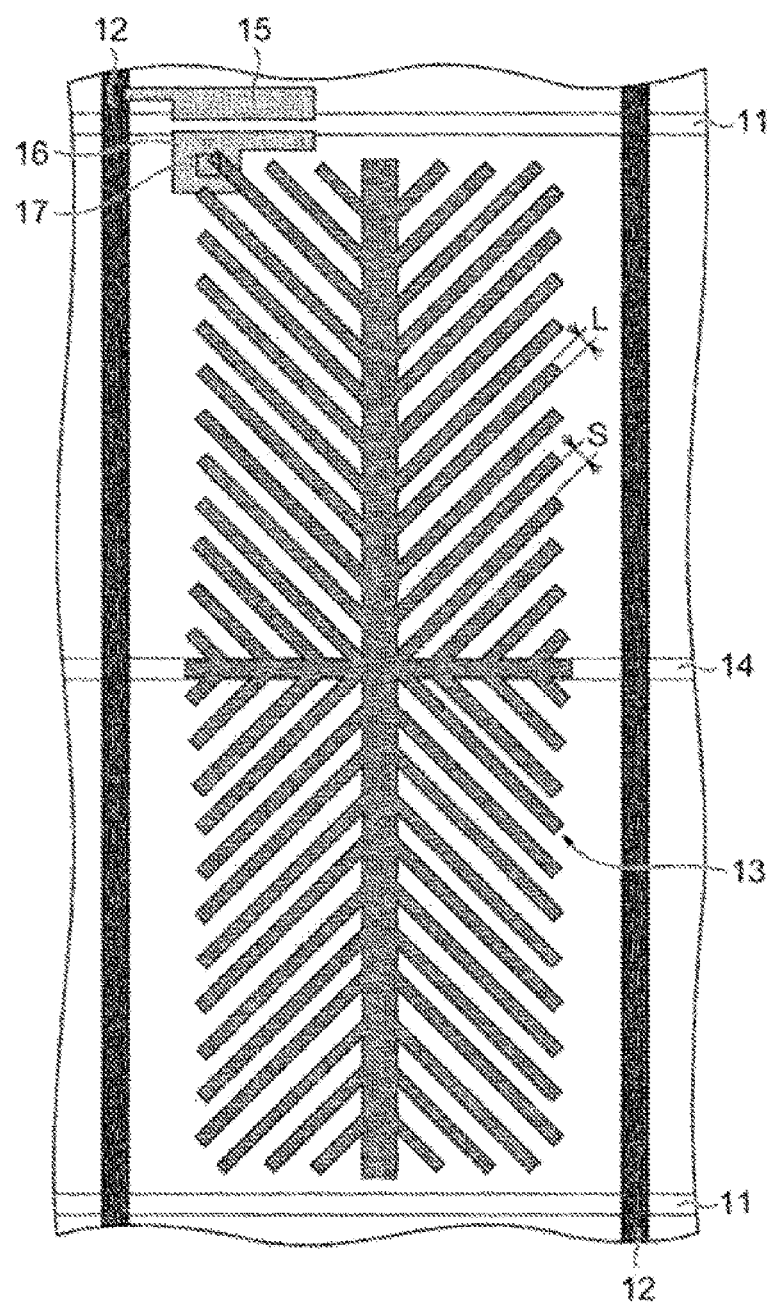
FIG. 2 is an enlarged plan view of a region surrounded by line I in FIG. 1.

FIG. 1 is an exploded perspective view schematically showing one embodiment of the liquid crystal display device, and FIG. 2 is an enlarged plan view of a region surrounded by line I in FIG. 1.

In FIGS. 1 and 2, the dimensions and ratios of components may be exaggerated and may differ from the actual dimensions and ratios for the sake of convenience. Materials, dimensions, etc. described below are examples, and the present invention is not limited thereto. The materials, dimensions, etc. shown below can be appropriately changed so long as the gist of the invention is not changed.

The liquid crystal display device 1 shown in FIG. 1 includes an active matrix substrate AM and a color filter substrate CF that are disposed so as to face each other and further includes a liquid crystal layer 4 sandwiched between the active matrix substrate AM and the color filter substrate CF.

The active matrix substrate AM includes a first substrate 2, a pixel electrode layer 5 disposed on a surface of the first substrate 2 that is located on the liquid crystal layer 4 side, and a first polarizing plate 7 disposed on a surface of the first substrate 2 that is opposite to the liquid crystal layer 4.

The color filter substrate CF includes a second substrate 3, a common electrode layer 6 disposed on the liquid crystal layer 4 side of the second substrate 3, a second polarizing plate 8 disposed on a surface of the second substrate 3 that is opposite to the liquid crystal layer 4, and a color filter 9 disposed between the second substrate 3 and the common electrode layer 6.

Specifically, the liquid crystal display device 1 according to the present embodiment has a structure in which the first polarizing plate 7, the first substrate 2, the pixel electrode layer 5, the liquid crystal layer 4, the common electrode layer 6, the color filter 9, the second substrate 3, and the second polarizing plate 8 are stacked in this order.

The first substrate 2 and the second substrate 3 are formed of a pliable (flexible) material such as a glass material or a plastic material.

The first substrate 2 and the second substrate 3 may both have light-transmitting properties, or only one of them may have light-transmitting properties. In the latter case, the other substrate may be formed from an opaque material such as a metal material or a silicon material.

As shown in FIG. 2, the pixel electrode layer 5 includes a plurality of gate bus lines 11 for supplying scan signals, a plurality of data bus lines 12 for supplying display signals, and a plurality of pixel electrodes 13. Only a pair of gate bus lines 11, 11 and a pair of data bus lines 12, 12 are shown in FIG. 2.

The plurality of gate bus lines 11 and the plurality of data bus lines 12 are disposed so as to intersect with each other in a matrix form, and regions surrounded by these bus lines form unit pixels of the liquid crystal display device 1. One pixel electrode 13 is formed in each unit pixel.

The pixel electrodes 13 each have a structure (a so-called fish-bone structure) including two trunk portions orthogonal to each other and forming a cross shape and a plurality of branch portions branched from the trunk portions and extending outward.

A Cs electrode 14 is disposed between the pair of gate bus lines 11, 11 so as to be substantially parallel to the gate bus lines 11. A thin film transistor including a source electrode 15 and a drain electrode 16 is provided near the intersection of a gate bus line 11 and a data bus line 12. A contact hole 17 is provided in the drain electrode 16.

The gate bus lines 11 and the data bus lines 12 are each formed of preferably, for example, Al, Cu, Au, Ag, Cr, Ta, Ti, Mo, W, Ni, or an alloy containing these elements and more preferably Mo, Al, or an alloy containing these elements.

The pixel electrodes 13 are each formed from a transparent electrode in order to improve light transmittance. The transparent electrode is formed, for example, by sputtering a compound such as ZnO, InGaZnO, SiGe, GaAs, IZO (indium zinc oxide), ITO (indium tin oxide), SnO, TiO, or AZTO (AlZnSnO).

The average thickness of the transparent electrode is preferably about 10 to about 200 nm. To reduce electrical resistance, the transparent electrode may be formed by firing an amorphous ITO film to form a polycrystalline ITO film.

The common electrode layer 6 has disposed thereon, for example, a plurality of stripe-shaped common electrodes (transparent electrodes). These common electrodes can be formed in the same manner as that for the pixel electrodes 13.

The color filter 9 can be produced, for example, by a pigment dispersion method, a printing method, an electrode-position method, or a staining method.

In the pigment dispersion method, a curable coloring composition for the color filter is supplied to the second substrate 3 so as to form a prescribed pattern and then cured by heating or irradiation with light. This procedure is performed for three colors, i.e., red, green, and blue colors, and the color filter 9 can thereby be obtained.

The color filter 9 may be disposed on the first substrate 2 side.

The liquid crystal display device 1 may have a black matrix (not shown) from the viewpoint of preventing light leakage. Preferably, the black matrix is formed in portions corresponding to the thin film transistors.

The black matrix may be disposed, together with the color filter 9, on the second substrate 3 side or may be disposed, together with the color filter 9, on the first substrate 2 side. The black matrix may be disposed on the first substrate 2 side, and the color filter 9 may be disposed on the second substrate 3 side. The black matrix may be formed from overlapping colored portions of the color filter 9 that have reduced transmittance.

The active matrix substrate AM and the color filter substrate CF are bonded to each other at their circumferential edges using a sealing material (sealer) formed from, for example, an epoxy-based heat-curable composition.

A spacer may be disposed between the active matrix substrate AM and the color filter substrate CF in order to maintain a separation distance therebetween. Examples of the spacer include particulate spacers such as glass particles, plastic particles, and alumina particles and resin-made spacer columns formed by photolithography.

The average separation distance between the active matrix substrate AM and the color filter substrate CF (i.e., the average thickness of the liquid crystal layer 4) is preferably about 1 to about 100 μm.

By adjusting the positional relation between the transmission axes of the first polarizing plate 7 and the second polarizing plate 8, a design with a good viewing angle and good contrast can be obtained. Specifically, it is preferable that the first polarizing plate 7 and the second polarizing plate 8 are disposed such that their transmission axes are orthogonal to each other in order for the liquid crystal display device 1 to operate in a normally black mode. In particular, it is preferable that one of the first polarizing plate 7 and the second polarizing plate 8 is disposed such that its transmission axis is parallel to the alignment direction of the liquid crystal molecules when no voltage is applied.

When the first polarizing plate 7 and the second polarizing plate 8 are used, it is preferable that the product of the refractive index anisotropy (Δn) of the liquid crystal layer 4 and the average thickness of the liquid crystal layer 4 is adjusted such that the contrast is maximized. The liquid crystal display device 1 may further include a retardation film in order to increase the viewing angle.

The active matrix substrate AM further includes an insulating film (not shown) that covers part of the pixel electrode layer 5 (the gate bus lines 11, the data bus lines 12, the pixel electrodes 13, the Cs electrodes 14, and the thin film transistors) or the entire pixel electrode layer 5.

The color filter substrate CF further includes an insulating film (not shown) that covers part of the common electrode layer 6 (common electrode) or the entire common electrode layer 6.

Examples of the material forming these insulating films include organic materials such as acrylic resins and epoxy resins and inorganic materials such as silicon nitride (SiNx). One of these materials may be used alone, or a combination of two or more of them may be used. In particular, the insulating films are preferably organic insulating films formed of an organic material and more preferably organic insulating films formed of an acrylic resin or an epoxy resin.

In the present embodiment, since both the active matrix substrate A and the color filter substrate CF are in contact with the liquid crystal layer 4 (liquid crystal composition), each insulating film has a contact surface in contact with the liquid crystal composition.

The present invention is characterized in that the static contact angle of water on the contact surface at 25° C. is 70° or less and/or the surface free energy of the contact surface is 50 mN/m or more. The contact surface having these characteristics is a surface having high water wettability, i.e., a surface having high hydrophilicity. Therefore, the polar group in the alignment aid firmly adheres (is fixed) to the contact surface.

It is only necessary that the static contact angle of the contact surface be 70° or less, and the static contact angle is preferably 60° or less and more preferably about 40 to about 55°.

When an insulating film is disposed so as to cover only part of the pixel electrode layer 5 and therefore the ITO film (metal oxide film) is exposed, the static contact angle of water on the surface (the contact surface for the liquid crystal composition) of the ITO film (metal oxide film) at 25° C. is preferably 30° or less and more preferably about 10 to about 20°.

It is only necessary that the surface free energy of the contact surface be 50 mN/m or more, and the surface free energy is preferably 55 mN/m or more and more preferably about 55 to about 70 mN/m.

When the ITO film (metal oxide film) is exposed, the surface free energy of its surface (the contact surface for the liquid crystal composition) is preferably 70 mN/m or more and more preferably about 75 to about 85 mN/m.

By setting the static contact angle and the surface free energy within the above ranges, the alignment aid can be evenly supplied to substantially the entire inner surfaces of the active matrix substrate AM and the color filter substrate CF, and the alignment aid can more firmly adsorb on (be fixed to) the inner surfaces.

(Method for Manufacturing Liquid Crystal Display Device)

Next, a method for manufacturing the liquid crystal display device 1 will be described.

The method for manufacturing the liquid crystal display device in the embodiment includes a preparation step [1] of preparing the substrates and the liquid crystal composition, a hydrophilization treatment step [2] of subjecting the substrates to hydrophilization treatment, an assembling step [3] of assembling the liquid crystal display device 1, a polymerizing step [4] of polymerizing the alignment aid and/or the polymerizable compound, and a curing step [5] of curing the sealing material.

[1] Preparation Step

First, the active matrix substrate AM, the color filter substrate CF, and the liquid crystal composition described above are prepared.

[2] Hydrophilization Treatment Step (First Step)

Next, a surface of the active matrix substrate AM and a surface of the color filter substrate CF that are to face the liquid crystal layer 4 (i.e., the inner surfaces) are subjected to hydrophilization treatment.

By performing the hydrophilization treatment, the hydrophilicity of the inner surface of the active matrix substrate AM and the hydrophilicity of the inner surface of the color filter substrate CF (these inner surfaces may be hereinafter referred to simply as the "inner surfaces") can be increased, and the static contact angle and/or the surface free energy can be set (adjusted) to the above-described values. This allows the polar groups in the alignment aid contained in the liquid crystal composition to be firmly fixed to the inner surfaces. Moreover, the alignment aid can be disposed (aligned) such that the mesogenic groups are spaced apart from the inner surfaces. In this manner, the liquid crystal molecules aligned vertically can be more reliably held within the liquid crystal layer 4.

Examples of the hydrophilization treatment (polarity improving treatment) include: physical treatment such as ozone treatment, UV treatment, corona treatment, and oxygen plasma treatment; and chemical treatment such as addition of a surfactant, polyethylene glycol, polyvinyl alcohol, etc. and introduction of hydrophilic functional groups. One type of such treatment may be used alone, or two or more types of such treatment may be used in combination.

In particular, the hydrophilization treatment is preferably physical treatment, and ozone treatment or UV treatment is more preferred. With the ozone treatment or the UV treatment, hydroxy groups can be introduced onto the inner surfaces to increase hydrophilicity (polarity). Moreover, the ozone treatment or the UV treatment (physical treatment) has a high cleaning effect, so that impurities (such as resist residues) adhering to the inner surfaces can be removed. Therefore, the polar groups in the alignment aid can more easily adsorb on the inner surfaces.

<Ozone Treatment>

The ozone treatment is a method in which oxygen in air is converted to ozone by irradiation with ultraviolet (UV) rays and surface modification is performed in the ozone-containing atmosphere.

The UV light source is preferably a low-pressure mercury lamp. The low-pressure mercury lamp is known to have light-emission spectra at wavelengths of around 185 nm and around 254 nm. The light with a wavelength of around 185 nm is used to generate ozone, and the light with a wavelength of around 254 nm is used to decompose the ozone to thereby generate active oxygen. Therefore, by using the low-pressure mercury lamp, the inner surfaces can be effectively subjected to hydrophilization treatment.

Any gas containing oxygen can be used as the oxygen source gas, and oxygen gas, dry air, etc. can be used.

The pressure of the atmosphere used for the ozone treatment may be reduced pressure or may be atmospheric pressure.

No particular limitation is imposed on the time for the ozone treatment (the UV irradiation time). The ozone treatment time is preferably about 10 to about 100 seconds and more preferably about 20 to about 60 seconds.

<UV Treatment>

The UV treatment (photo surface treatment) is a surface modification method in which the inner surfaces are irradiated directly with UV rays with a wavelength of 254 nm.

The UV light source used is a low-pressure mercury lamp using synthesized quartz having high transmittance for short wavelength UV rays. To prevent the generation of ozone, it is preferable to cut off UV rays with a wavelength of 185 nm.

The atmosphere for the UV treatment is preferably a nitrogen atmosphere or a reduced pressure atmosphere (vacuum pressure).

No particular limitation is imposed on the time for the UV treatment, and the UV treatment time is preferably about 10 to about 100 seconds and more preferably about 20 to about 60 seconds.

<Corona Treatment>

The corona treatment is a surface modification method that uses a corona discharge excited by a high AC voltage applied to a pair of electrodes at atmospheric pressure.

<Oxygen Plasma Treatment>

The oxygen plasma treatment is a method in which a treatment gas containing oxygen gas is ionized by an arc discharge and surface modification is performed using oxygen plasma generated by the ionization of the treatment gas.

The treatment gas used may be a gas mixture of oxygen gas and an inert gas such as nitrogen gas, argon gas, or helium gas.

The amount of the oxygen gas supplied is preferably about 0.5 to about 50 sccm, and the pressure of the atmosphere is preferably about 0.1 to about 50 Pa.

The electric power applied from the power source during the arc discharge is preferably about 10 to about 500 W, and the frequency of the power source is preferably about 1 to 50 kHz.

When the value of the static contact angle on the inner surfaces and/or the value of the surface free energy of the inner surfaces before the hydrophilization treatment is within the target range, the hydrophilization treatment may be omitted.

[3] Assembling Step (Second Step)

Next, the sealing material is applied along edges of at least one of the active matrix substrate AM and the color filter substrate CF using a dispenser so as to form a closed loop ridge.

Then a predetermined amount of the liquid crystal composition is added dropwise to the inner side of the sealing material under reduced pressure, and the active matrix substrate AM and the color filter substrate CF are disposed in contact with the liquid crystal composition so as to face each other.

In the above ODF (one drop fill) method, it is necessary that an optimal amount of the liquid crystal composition that depends on the size of the liquid crystal display device 1 be injected dropwise. The liquid crystal composition described above is less susceptible to, for example, shock and an abrupt change in the pressure inside the dropwise addition device during dropwise addition and can be added dropwise stably for a long time. Therefore, the yield of the liquid crystal display device 1 can be kept high.

In particular, since the optimal amount of the liquid crystal composition injected into a small-size liquid crystal display device frequently used for smartphones is small, it is difficult to control variations in the injection amount within a given range. However, with the liquid crystal composition described above, the optimal amount of the liquid crystal composition can be correctly injected dropwise even into a small-size liquid crystal display device in a stable manner.

Moreover, with the ODF method, the occurrence of droplet marks when the liquid crystal composition is added dropwise onto the substrates can be prevented. The droplet marks refer to a phenomenon in which white droplet marks of the droplets of the liquid crystal composition added appear in a black display mode.

[4] Polymerizing Step (Third Step)

When the alignment aid includes a polymerizable group and/or the liquid crystal composition includes a polymerizable compound, the liquid crystal composition is irradiated with active energy rays such as UV rays or an electron beam to polymerize the alignment aid and/or the polymerizable compound.

The liquid crystal layer 4 is thereby formed, and the liquid crystal display device 1 is obtained. In this case, since the alignment aid is fixed to the two substrates AM and CF, the polymerized product of the alignment aid and/or the polymerized product of the polymerizable compound is segregated on the substrate AM and CF sides within the liquid crystal layer 4.

To obtain good alignment of the liquid crystal molecules, it is preferable to use an appropriate polymerization speed. It is therefore preferable that, during polymerization, one type of active energy rays is used for the irradiation or different types of active energy rays are used for the irradiation simultaneously or sequentially. When UV rays are used, a polarized light source may be used, or an unpolarized light source may be used.

In the present embodiment, the liquid crystal composition is subjected to polymerization with the two substrates facing each other so as to be in contact with the liquid crystal composition. In this case, it is necessary that at least the substrate located on the irradiation surface side have appropriate transmittance for the active energy rays.

The polymerization may be performed in a plurality of steps as follows. Specifically, first, a mask is used to polymerize the alignment aid and/or the polymerizable compound present only in a specific region in the liquid crystal composition. Then conditions such as an electric field, a magnetic field, or temperature are controlled to change the alignment state of the liquid crystal molecules in the non-polymerized region. The liquid crystal composition in this state is irradiated with the active energy rays to polymerize the alignment aid and/or the polymerizable compound present in the non-polymerized region.

In particular, when UV rays are used, it is preferable that the liquid crystal composition is irradiated with the UV rays while an AC electric field is applied to the liquid crystal composition.

The frequency of the AC current applied is preferably about 10 Hz to about 10 kHz and more preferably about 60 Hz to about 10 kHz.

The voltage of the AC current applied is selected depending on the desired pretilt angle of the liquid crystal display device 1. Specifically, by adjusting the voltage of the AC current applied, the pretilt angle of the liquid crystal display device 1 can be controlled.

In a horizontal electric field MVA mode liquid crystal display device, it is preferable from the viewpoint of alignment stability and contrast that the pretilt angle is controlled to 80 to 89.9°.

The temperature during irradiation with UV rays is preferably in a temperature range in which the liquid crystal state of the liquid crystal composition is maintained. The specific temperature is preferably a temperature close to room temperature, typically about 15 to about 35° C.

The lamp used to generate the UV rays may be a metal halide lamp, a high-pressure mercury lamp, or an ultrahigh-pressure mercury lamp.

The UV rays applied are preferably UV rays having a wavelength outside the absorption wavelength range of the liquid crystal composition. It is more preferable that prescribed wavelengths of the UV rays used are cut off if necessary.

The intensity of the UV rays applied is preferably about 0.1 mW/cm$^2$ to about 100 W/cm$^2$ and more preferably about 2 mW/cm$^2$ to about 50 W/cm$^2$. The UV rays may be applied while the intensity of the UV rays is changed.

The energy amount of the UV rays applied can be appropriately adjusted and is preferably about 10 mJ/cm$^2$ to about 500 J/cm$^2$ and more preferably about 100 mJ/cm$^2$ to about 200 J/cm$^2$.

The time of irradiation with the UV rays is appropriately selected according to their intensity and is preferably about 10 to about 3600 seconds and more preferably about 10 to about 600 seconds.

In the liquid crystal composition described above, since the alignment aid does not inhibit the polymerization reaction of the polymerizable compound, the polymerizable compound is suitably polymerized, and the amount of the unreacted polymerizable compound remaining in the liquid crystal composition can be reduced.

In assembling step [3], a vacuum infusion method may be used instead of the one drop fill (ODF) method. For example, in the vacuum infusion method, first, a sealing material is applied along edges of at least one of the active matrix substrate AM and the color filter substrate CF by screen printing such that an injection hole remains unsealed. Then, the two substrates AM and CF are laminated, and the sealing material is heated to heat-cure it. Next, the injection hole is sealed, and the polymerizing step [4] is performed.

The thus-obtained liquid crystal display device 1 is preferably a PSA, PSVA, VA, IPS, FFS, or ECB mode liquid crystal display device and more preferably a PSA mode liquid crystal display device.

The substrate of the present invention and the liquid crystal display device of the present invention have been described. However, the present invention is not limited to the embodiments described above.

For example, part of the structure of each of the substrate of the present invention and the liquid crystal display device of the present invention may be replaced with another structure having the same function, and any other structure may be added.

In the liquid crystal display device in the preceding embodiment, both the active matrix substrate AM and the color filter substrate CF are in direct contact with the liquid crystal layer 4 with no polyimide (PI) alignment film interposed therebetween. However, a PI alignment film may be disposed on one of them. In this case, the surface of the PI alignment film may be or may not be subjected to the hydrophilization treatment.

In consideration of the influence of heat during the formation of the PI alignment film, it is preferable that the PI alignment film is disposed on the color filter substrate CF. In other words, when only one of the substrates is subjected to the hydrophilization treatment, it is preferable that the active matrix substrate AM (the substrate having the pixel electrodes 13) is subjected to the hydrophilization treatment.

EXAMPLES

The present invention will be described by way of Examples. However, the present invention is not limited to these Examples.

The following characteristics of each liquid crystal composition were measured.

Tni: Nematic phase-isotropic liquid phase transition temperature (° C.)
Δn: Refractive index anisotropy at 293 K
Δε: Dielectric anisotropy at 293 K
γ1: Rotational viscosity (mPa·s) at 293 K
K11: Splay elastic constant (pN) at 293 K
K33: Bend elastic constant (pN) at 293 K The following abbreviations are used for compounds used in the Examples and Comparative Examples. n in each abbreviation is a natural number.
(Side Chains)
   -n —$C_nH_{2n+1}$: linear alkyl group having n carbon atoms
   n- $C_nH_{2n+1}$—: linear alkyl group having n carbon atoms
   —On —$OC_nH_{2n+1}$: linear alkoxy group having n carbon atoms
   —V1 —CH=CH—$CH_3$: propenyl group
   V- $CH_2$=CH—: vinyl group
   lV2- $CH_3$—CH=CH—$CH_2$—$CH_2$—: pentenyl group
(Linking Structure)
   -nO— —$C_nH_{2n}O$—
(Ring Structures)

[Chem. 123]

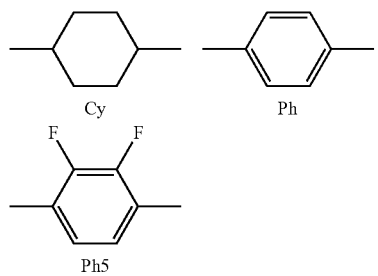

The compositions and physical properties of liquid crystal mixtures LC-1 and LC-2 are shown in Table 1 below.

TABLE 1

|  |  | LC-1 | LC-2 |
|---|---|---|---|
| Liquid crystal compound [% by mass] | 3-Cy-Cy-2 | 16.5 | 16.5 |
|  | 3-Cy-Cy-4 | 3 | 4.5 |
|  | 3-Cy-Cy-V1 |  | 8.5 |
|  | 3-Cy-Ph-O1 | 15 | 4.5 |
|  | 3-Ph-Ph-1 | 9 |  |
|  | 3-Cy-Ph-Ph-2 | 8 | 6.5 |
|  | 1V2-Ph-Ph-1 |  | 6 |
|  | 3-Cy-1O-Ph5-O1 | 8.5 |  |
|  | 3-Cy-Cy-1O-Ph5-O2 | 17 |  |
|  | 3-Cy-Ph5-O2 |  | 15.5 |
|  | 3-Ph-Ph5-O2 |  | 6.5 |
|  | 3-Cy-Cy-Ph5-O1 |  | 3.5 |
|  | 3-Cy-Cy-Ph5-O2 |  | 12.5 |
|  | 2-Cy-Ph-Ph5-O2 | 6.5 | 5.5 |
|  | 3-Cy-Ph-Ph5-O2 | 8 | 10 |
|  | 3-Cy-Ph-Ph5-O4 | 8.5 |  |
|  | Total | 100 | 100 |
| Physical properties | Tni[° C.] | 75 | 74 |
|  | Δn | 0.112 | 0.104 |
|  | Δε | −3.0 | −2.8 |
|  | $Y_1$[mPa · s] | 122 | 107 |
|  | $K_{11}$[pN] | 14.1 | 14.7 |
|  | $K_{33}$[pN] | 13.9 | 14.2 |

The following alignment aids (A) to (E) were used.

[Chem. 124]

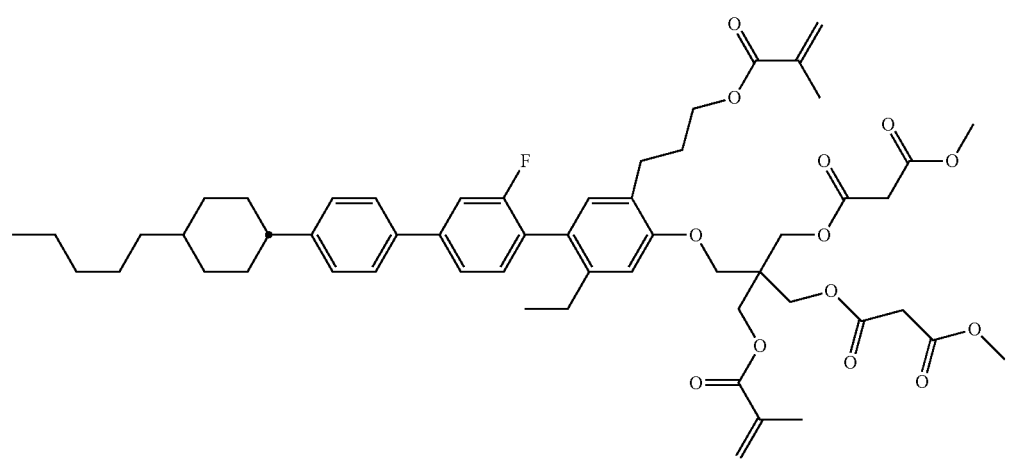

Alignment aid (A)

-continued
[Chem. 125]
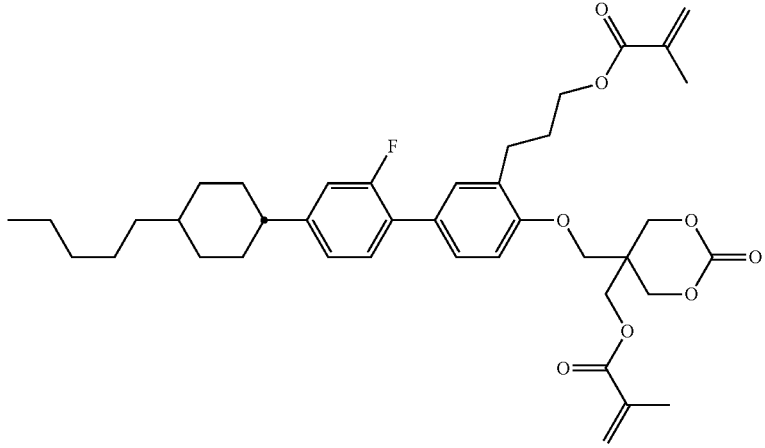
Alignment aid (B)
[Chem. 126]
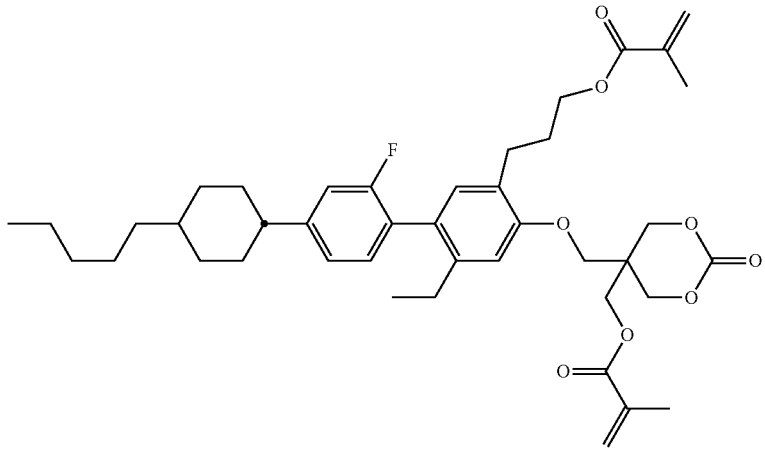
Alignment (C)
[Chem. 127]
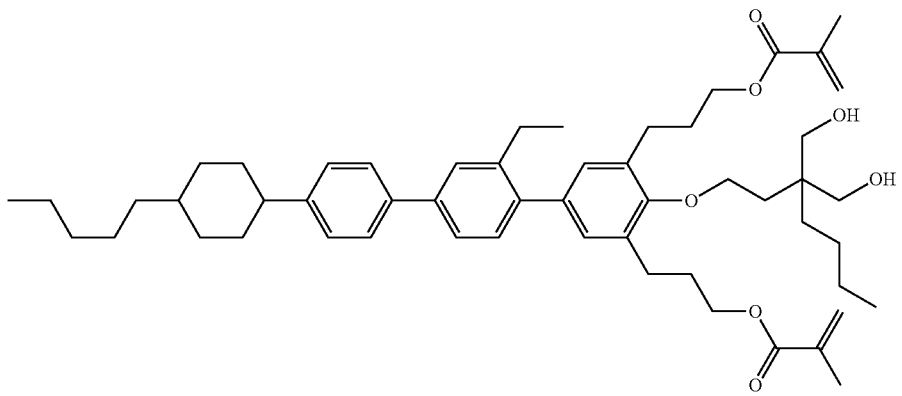
Alignment aid (D)

[Chem 128]

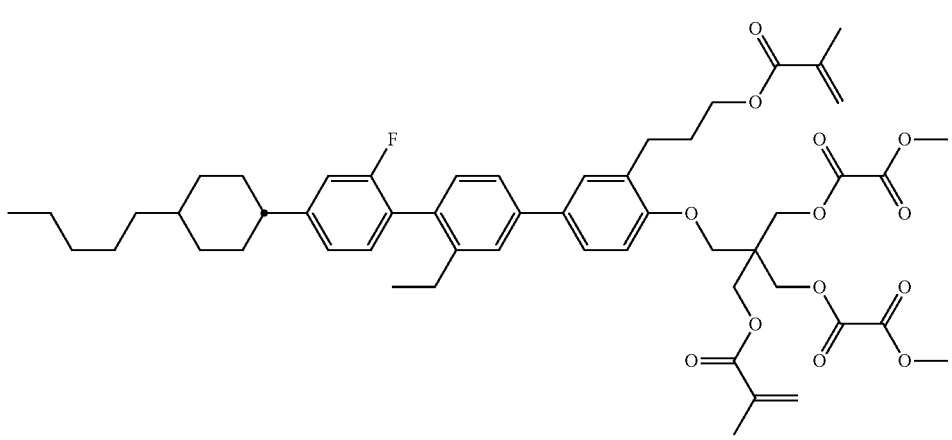

Alignment aid (E)

The following polymerizable compounds (A) to (C) were used.

[Chem. 129]

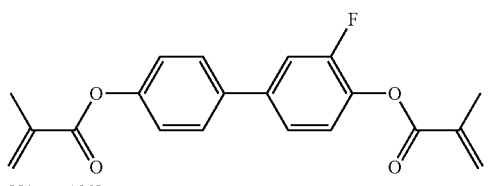

Polymerizable compound (A)

[Chem. 130]

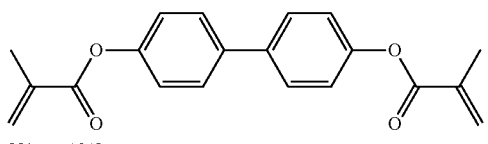

Polymerizable compound (B)

[Chem. 131]

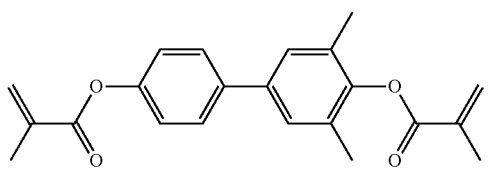

Polymerizable compound (C)

1. Production of Samples

Example 1

First, a first substrate including an ITO film and a second substrate including an ITO film and an organic insulating film formed on the ITO film and made of an acrylic resin ("OPTMER" manufactured by JSR Corporation) were prepared.

The surface of the ITO film of the first substrate and the surface of the organic insulating film of the second substrate were subjected to ozone treatment using a UV ozone cleaner ("SSP17-110" manufactured by SEN LIGHTS Corporation).

The surface of the ITO film was subjected to the ozone treatment for 30 seconds, and the surface of the organic insulating film was subjected to the ozone treatment for 60 seconds.

Next, a sealing material was applied along the edges of the first substrate using a dispenser so as to form a closed loop ridge.

Then a prescribed amount of a liquid crystal composition was added dropwise to the inner side of the sealing material under reduced pressure, and the first substrate and the second substrate were disposed so as to face each other such that the substrates are in contact with the liquid crystal composition.

In Example 1, the liquid crystal composition used contains liquid crystal mixture LC-1, alignment aid (A), and polymerizable compound (A). The amount of alignment aid (A) contained in the liquid crystal composition was 1.0% by mass, and the amount of polymerizable compound (A) was 0.3% by mass.

Next, only the sealing material was irradiated with UV rays, and the annealing was performed at 120° C. for 1 hour to thereby obtain a liquid crystal cell.

Then the liquid crystal cell was sandwiched between a pair of polarizing plates disposed such that their transmission axes were orthogonal to each other to thereby obtain a sample.

Example 2

A sample was produced in the same manner as in Example 1 except that the type of liquid crystal composition was changed.

In Example 2, a liquid crystal composition containing liquid crystal mixture LC-1, alignment aids (B) and (C), and polymerizable compound (A) was used. The amount of alignment aid (B) contained in the liquid crystal composition was 0.2% by mass, and the amount of alignment aid (C) was 0.4% by mass. The amount of polymerizable compound (A) was 0.3% by mass.

Example 3

A sample was produced in the same manner as in Example 1 except that the type of liquid crystal composition was changed.

In Example 3, a liquid crystal composition containing liquid crystal mixture LC-2, alignment aid (D), and polymerizable compound (B) was used. The amount of alignment aid (D) contained in the liquid crystal composition was 0.6% by mass, and the amount of polymerizable compound (B) was 0.3% by mass.

Example 4

A sample was produced in the same manner as in Example 1 except that the type of liquid crystal composition was changed.

In Example 4, a liquid crystal composition containing liquid crystal mixture LC-1, alignment aid (E), and polymerizable compound (A) was used. The amount of alignment aid (E) contained in the liquid crystal composition was 0.4% by mass, and the amount of polymerizable compound (A) was 0.3% by mass.

Example 5

A sample was produced in the same manner as in Example 1 except that the type of liquid crystal composition was changed.

In Example 5, a liquid crystal composition containing liquid crystal mixture LC-1, alignment aids (C) and (E), and polymerizable compounds (A) and (C) was used. The amount of alignment aid (C) contained in the liquid crystal composition was 0.2% by mass, and the amount of alignment aid (E) was 0.4% by mass. The amount of polymerizable compound (A) was 0.3% by mass, and the amount of polymerizable compound (C) was 0.3% by mass.

Examples 6 to 10

Samples were produced in the same manner as in Examples 1 to 5 except that the surface of the ITO film was subjected to the ozone treatment for 10 seconds and that the surface of the organic insulating film was subjected to the ozone treatment for 10 seconds.

Comparative Examples 1 to 5

Samples were produced in the same manner as in Examples 1 to 5 except that the ozone treatment was omitted.

2. Measurement and Evaluation 2-1. Measurement of Static Contact Angle

A water droplet of 1 μL was placed on each of the surface of the ITO film and the surface of the organic insulating film, and the static contact angle of each water droplet at 25° C. was measured using a contact angle meter (DMo-501).

2-2. Measurement of Surface Free Energy

Water and 1-bromonaphthalene were used to measure their static contact angles in the same manner as described above, and the surface free energy of the surface of the ITO film and the surface free energy of the organic insulating film were determined using the measurement results.

2-3. Evaluation of Degree of Light Transmission

Light was caused to pass through each of the samples obtained in the Examples and Comparative Examples, and the degree of light transmission (brightness unevenness) was evaluated according to the following three-level criteria.

<Evaluation Criteria> x (poor): Almost the entire surface of a sample did not appear black.

Δ (fair): Only a region around the portion of a sample to which the liquid crystal composition was added dropwise appeared black.

O (good): Almost the entire surface of a sample appeared black.

Figure 3:
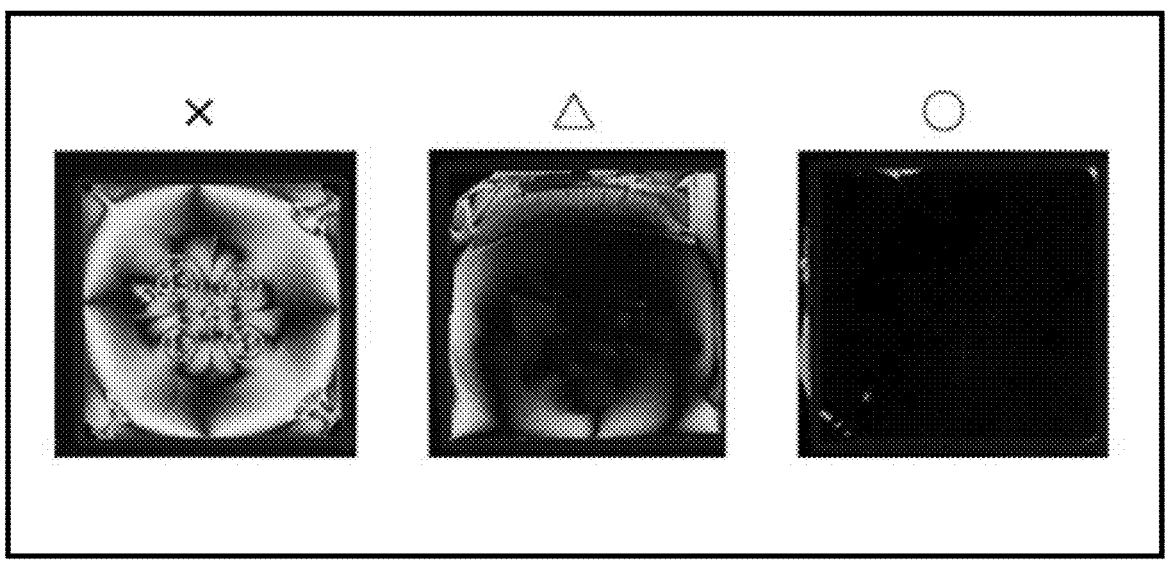
FIG. 3 is the results of the evaluation of degree of light transmission.

The results of the evaluation of degree of the light transmission are shown in FIG. 3.

The measurement and evaluation results are shown in Table 2.

TABLE 2

| | Liquid crystal composition | | | | | Contact angle with water [°] | | Surface free energy [mN/m] | | Degree Of light transmission |
|---|---|---|---|---|---|---|---|---|---|---|
| | Liquid crystal mixture | Alignment aid [% by mass] | | Polymerizable compound [% by mass] | | ITO film | Organic insulating film | ITO film | Organic insulating film | |
| Example 1 | LC-1 | A: 1.0 | — | A: 0,3 | — | 17 | 41 | 76 | 65 | o |
| Example 2 | LC-1 | B: 0.2 | C: 0.4 | A: 0.3 | — | 17 | 41 | 76 | 65 | o |
| Example 3 | LC-2 | D: 0.6 | — | B: 0.3 | — | 17 | 41 | 76 | 65 | o |
| Example 4 | LC-1 | E: 0.4 | — | A: 0.3 | — | 17 | 41 | 76 | 65 | o |
| Example 5 | LC-1 | C: 0.2 | E: 0.4 | A: 0.3 | C: 0.3 | 17 | 41 | 76 | 65 | o |
| Example 6 | LC-1 | A: 1.0 | — | A: 0.3 | — | 28 | 61 | 71 | 54 | Δ |
| Example 7 | LC-1 | B: 0.2 | C: 0.4 | A: 0.3 | — | 28 | 61 | 71 | 54 | Δ |
| Example 8 | LC-2 | D: 0.6 | — | B: 0.3 | — | 28 | 61 | 71 | 54 | Δ |
| Example 9 | LC-1 | E: 0.4 | — | A: 0.3 | — | 28 | 61 | 71 | 54 | Δ |
| Example 10 | LC-1 | C: 0.2 | E: 0.4 | A: 0.3 | C: 0.3 | 28 | 61 | 71 | 54 | Δ |
| Comparative Example 1 | LC-1 | A: 1.0 | — | E: 0.3 | — | 44 | 76 | 62 | 46 | x |
| Comparative Example 2 | LC-1 | B: 0.2 | C: 0.4 | E: 0.3 | — | 44 | 76 | 62 | 46 | x |
| Comparative Example 3 | LC-2 | D: 0.6 | — | F: 0.3 | — | 44 | 76 | 62 | 46 | x |
| Comparative Example 4 | LC-1 | E: 0.4 | — | A: 0.3 | — | 44 | 76 | 62 | 46 | x |
| Comparative Example 5 | LC-1 | C: 0.2 | E: 0.4 | A: 0.3 | C: 0.3 | 44 | 76 | 62 | 46 | x |

In each of the Examples, since the hydrophilization treatment was performed, the alignment aid was firmly fixed to the substrates, and the anchoring force for causing the liquid crystal molecules to be aligned vertically was exerted sufficiently. By changing the treatment conditions, the effect of the hydrophilization treatment was improved. However, in each of the Comparative Examples, since the hydrophilization treatment was omitted, the above effect was not obtained.

REFERENCE SIGNS LIST

1 liquid crystal display device
AM active matrix substrate
CF color filter substrate
2 first substrate
3 second substrate
4 liquid crystal layer
5 pixel electrode layer
6 common electrode layer
7 first polarizing plate
8 second polarizing plate
9 color filter
11 gate bus line
12 data bus line
13 pixel electrode
14 Cs electrode
15 source electrode
16 drain electrode
17 contact hole

The invention claimed is:

1. A substrate to be used in contact with a liquid crystal composition containing liquid crystal molecules and an alignment aid having a polar group and having the function of causing the liquid crystal molecules to be aligned spontaneously,
   wherein the substrate comprises an insulating film having a contact surface to be in contact with the liquid crystal composition, and
   wherein the static contact angle of water on the contact surface at 25° C. is 70° or less and the surface free energy of the contact surface is 50 mN/m or more.

2. The substrate according to claim 1, wherein the substrate is a substrate in direct contact with the liquid crystal composition with no alignment film therebetween.

3. The substrate according to claim 1, wherein the substrate is a substrate comprising a pixel electrode.

4. The substrate according to claim 1, wherein the substrate is a substrate comprising a color filter.

5. The substrate according to claim 1, wherein the insulating film is an organic insulating film.

6. A liquid crystal display device comprising: two substrates; and a liquid crystal layer that is sandwiched between the two substrates and formed of a liquid crystal composition containing liquid crystal molecules and an alignment aid having a polar group and having the function of causing the liquid crystal molecules to be aligned spontaneously,
   wherein at least one of the two substrates is the substrate according to claim 1.

7. The liquid crystal display device according to claim 6, wherein the alignment aid has a polymerizable group that can be polymerized by irradiation with active energy rays, and
   wherein the liquid crystal layer contains a polymerized product of the alignment aid.

8. The liquid crystal display device according to claim 7, wherein the liquid crystal composition further contains a polymerizable compound that can be polymerized by irradiation with the active energy rays, and
   wherein the liquid crystal layer contains a polymerized product of the polymerizable compound and/or the polymerized product of the alignment aid.

9. The liquid crystal display device according to claim 6, wherein the liquid crystal display device is a PSA, PSVA, VA, IPS, FFS, or ECB mode liquid crystal display device.

* * * * *